US009640023B2

(12) United States Patent
Itagaki et al.

(10) Patent No.: US 9,640,023 B2
(45) Date of Patent: May 2, 2017

(54) GAMING MACHINE

(71) Applicants: Universal Entertainment Corporation, Koto-ku, Tokyo (JP); Aruze Gaming America, Inc., Las Vegas, NV (US)

(72) Inventors: Takehisa Itagaki, Tokyo (JP); Yuji Miyagawa, Tokyo (JP); Naoki Terada, Tokyo (JP)

(73) Assignees: Universal Entertainment Corporation, Tokyo (JP); Aruze Gaming America, Inc., Las Vegas, NV (US)

( * ) Notice: Subject to any disclaimer, the term of this patent is extended or adjusted under 35 U.S.C. 154(b) by 217 days.

(21) Appl. No.: 14/569,572

(22) Filed: Dec. 12, 2014

(65) Prior Publication Data

US 2015/0206382 A1 Jul. 23, 2015

(30) Foreign Application Priority Data

Jan. 17, 2014 (JP) ................................ 2014-006812

(51) Int. Cl.
*G06F 19/00* (2011.01)
*G07F 17/32* (2006.01)
*G07F 17/34* (2006.01)

(52) U.S. Cl.
CPC ...... *G07F 17/3213* (2013.01); *G07F 17/3267* (2013.01); *G07F 17/34* (2013.01)

(58) Field of Classification Search
None
See application file for complete search history.

(56) References Cited

U.S. PATENT DOCUMENTS

2002/0045482 A1* 4/2002 Poole .................. G07F 17/3211 463/31
2002/0082075 A1* 6/2002 Meyer ................. G07F 17/3244 463/20
2006/0052152 A1* 3/2006 Tedsen ................ G07F 17/3211 463/16
2006/0205479 A1* 9/2006 Schultz ................... G07F 17/32 463/20
2007/0149277 A1* 6/2007 Ghaly ................. G07F 17/3262 463/20
2007/0178959 A1* 8/2007 Halprin ................... G07F 17/34 463/20
2009/0137311 A1* 5/2009 Iverson ............... G07F 17/3213 463/20
2010/0285861 A1* 11/2010 Gowin ................ G07F 17/3202 463/20

(Continued)

FOREIGN PATENT DOCUMENTS

JP 2007020954 2/2007

*Primary Examiner* — Paul A D'Agostino
(74) *Attorney, Agent, or Firm* — KMF Patent Services, PLLC; Kenneth Fagin; Stanley Konzel

(57) ABSTRACT

Provided is a gaming machine that is able to offer a variety of gaming patterns with avoidance of monotony during a free game that is a game played in a bonus game. A gaming machine, when a free game trigger is established, performs a control of shifting a game from a base game to a free game. In the free game, symbols are displayed in rotation and stopped in a symbol display region 4 in accordance with a result of a symbol lottery. When a top symbol is displayed in rotation in the symbol display region 4, the top symbol is scrolled at a speed lower than the other symbols.

8 Claims, 62 Drawing Sheets

(56) References Cited

U.S. PATENT DOCUMENTS

2011/0263309 A1* 10/2011 Gowin ................ G07F 17/3204
463/16
2012/0258785 A1* 10/2012 Suda ................... G07F 17/3265
463/20
2013/0079109 A1* 3/2013 Lafky ................. G07F 17/3272
463/25
2013/0260858 A1* 10/2013 Hirato ..................... G07F 17/34
463/20
2013/0310138 A1* 11/2013 Kitamura ............ G07F 17/3213
463/20
2014/0066164 A1* 3/2014 Okada ................. G07F 17/3211
463/20

* cited by examiner

FIG. 4A

| CODE No. | FIRST REEL | SECOND REEL | THIRD REEL | FOURTH REEL | FIFTH REEL |
|---|---|---|---|---|---|
| 0 | GOLD | RED | BLUE | GREEN | WHITE |
| 1 | GOLD | RED | BLUE | GREEN | WHITE |
| 2 | GOLD | RED | BLUE | GREEN | WHITE |
| 3 | GOLD | RED | BLUE | GREEN | WHITE |
| 4 | ACE | RED | BLUE | GREEN | WHITE |
| 5 | ACE | RED | BLUE | GREEN | WHITE |
| 6 | ACE | RED | BLUE | GREEN | WHITE |
| 7 | ACE | RED | BLUE | GREEN | WHITE |
| 8 | RED | RED | BLUE | GREEN | WHITE |
| 9 | RED | RED | BLUE | GREEN | WHITE |
| 10 | RED | FEATURE | FEATURE | FEATURE | WILD |
| 11 | RED | ACE | TEN | QUEEN | ACE |
| 12 | RED | ACE | TEN | QUEEN | ACE |
| 13 | RED | ACE | TEN | QUEEN | ACE |
| 14 | RED | ACE | TEN | QUEEN | ACE |
| 15 | RED | WILD | WILD | WILD | WILD |
| 16 | RED | NINE | ACE | JACK | RED |
| 17 | RED | NINE | ACE | JACK | RED |
| 18 | KING | NINE | ACE | JACK | RED |
| 19 | KING | NINE | ACE | JACK | RED |
| 20 | KING | FEATURE | FEATURE | FEATURE | RED |
| 21 | KING | KING | KING | ACE | RED |
| 22 | QUEEN | KING | KING | ACE | RED |
| 23 | QUEEN | KING | KING | ACE | RED |
| 24 | QUEEN | KING | KING | ACE | RED |
| 25 | QUEEN | WILD | WILD | WILD | RED |
| 26 | BLUE | WHITE | GREEN | BLUE | WILD |
| 27 | BLUE | WHITE | GREEN | BLUE | ACE |
| 28 | BLUE | WHITE | GREEN | BLUE | ACE |
| 29 | BLUE | WHITE | GREEN | BLUE | ACE |

FIG. 4B

| CODE No. | FIRST REEL | SECOND REEL | THIRD REEL | FOURTH REEL | FIFTH REEL |
|---|---|---|---|---|---|
| 30 | BLUE | WHITE | GREEN | BLUE | ACE |
| 31 | BLUE | WHITE | GREEN | BLUE | WILD |
| 32 | BLUE | WHITE | GREEN | BLUE | QUEEN |
| 33 | BLUE | WHITE | GREEN | BLUE | QUEEN |
| 34 | BLUE | WHITE | GREEN | BLUE | QUEEN |
| 35 | BLUE | WHITE | GREEN | BLUE | QUEEN |
| 36 | JACK | FEATURE | FEATURE | FEATURE | WILD |
| 37 | JACK | KING | KING | ACE | BLUE |
| 38 | JACK | KING | KING | ACE | BLUE |
| 39 | JACK | KING | KING | ACE | BLUE |
| 40 | GREEN | KING | KING | ACE | BLUE |
| 41 | GREEN | WILD | WILD | WILD | BLUE |
| 42 | GREEN | ACE | QUEEN | KING | BLUE |
| 43 | GREEN | ACE | QUEEN | KING | BLUE |
| 44 | GREEN | ACE | QUEEN | KING | BLUE |
| 45 | GREEN | ACE | QUEEN | KING | BLUE |
| 46 | GREEN | FEATURE | FEATURE | FEATURE | BLUE |
| 47 | GREEN | QUEEN | NINE | NINE | WILD |
| 48 | GREEN | QUEEN | NINE | NINE | NINE |
| 49 | GREEN | QUEEN | NINE | NINE | NINE |
| 50 | TEN | QUEEN | NINE | NINE | NINE |
| 51 | TEN | WILD | WILD | WILD | NINE |
| 52 | TEN | GREEN | RED | WHITE | WILD |
| 53 | TEN | GREEN | RED | WHITE | JACK |
| 54 | NINE | GREEN | RED | WHITE | JACK |
| 55 | NINE | GREEN | RED | WHITE | JACK |
| 56 | NINE | GREEN | RED | WHITE | JACK |
| 57 | NINE | GREEN | RED | WHITE | WILD |
| 58 | WHITE | GREEN | RED | WHITE | GREEN |
| 59 | WHITE | GREEN | RED | WHITE | GREEN |

FIG. 4C

| CODE No. | FIRST REEL | SECOND REEL | THIRD REEL | FOURTH REEL | FIFTH REEL |
|---|---|---|---|---|---|
| 60 | WHITE | GREEN | RED | WHITE | GREEN |
| 61 | WHITE | GREEN | RED | WHITE | GREEN |
| 62 | WHITE | FEATURE | FEATURE | FEATURE | GREEN |
| 63 | WHITE | QUEEN | TEN | TEN | GREEN |
| 64 | WHITE | QUEEN | TEN | TEN | GREEN |
| 65 | WHITE | QUEEN | TEN | TEN | GREEN |
| 66 | WHITE | QUEEN | TEN | TEN | GREEN |
| 67 | WHITE | WILD | WILD | RED | GREEN |
| 68 | NINE | NINE | ACE | RED | WILD |
| 69 | NINE | NINE | ACE | RED | TEN |
| 70 | NINE | NINE | ACE | RED | TEN |
| 71 | NINE | NINE | ACE | RED | TEN |
| 72 | TEN | JACK | WILD | RED | TEN |
| 73 | TEN | JACK | JACK | RED | KING |
| 74 | TEN | JACK | JACK | RED | KING |
| 75 | TEN | JACK | JACK | RED | KING |
| 76 | GOLD | WILD | JACK | RED | KING |
| 77 | GOLD | BLUE | WHITE | FEATURE | WILD |
| 78 | GOLD | BLUE | WHITE | KING | WILD |
| 79 | GOLD | BLUE | WHITE | KING | WILD |
| 80 | GOLD | BLUE | WHITE | KING | WILD |
| 81 | GOLD | BLUE | WHITE | KING | GOLD |
| 82 |  | BLUE | WHITE | WILD | GOLD |
| 83 |  | BLUE | WHITE | WILD | GOLD |
| 84 |  | BLUE | WHITE | WILD | GOLD |
| 85 |  | BLUE | WHITE | WILD | GOLD |
| 86 |  | BLUE | WHITE | GOLD | GOLD |
| 87 |  | FEATURE | JACK | GOLD | GOLD |
| 88 |  | JACK | JACK | GOLD | GOLD |
| 89 |  | JACK | JACK | GOLD | GOLD |

FIG. 4D

| CODE No. | FIRST REEL | SECOND REEL | THIRD REEL | FOURTH REEL | FIFTH REEL |
|---|---|---|---|---|---|
| 90 | | JACK | JACK | GOLD | GOLD |
| 91 | | JACK | WILD | GOLD | WILD |
| 92 | | WILD | QUEEN | GOLD | KING |
| 93 | | TEN | QUEEN | GOLD | KING |
| 94 | | TEN | QUEEN | GOLD | KING |
| 95 | | TEN | QUEEN | GOLD | KING |
| 96 | | TEN | WILD | WILD | QUEEN |
| 97 | | WILD | WILD | QUEEN | QUEEN |
| 98 | | WILD | WILD | QUEEN | QUEEN |
| 99 | | WILD | WILD | QUEEN | QUEEN |
| 100 | | WILD | GOLD | QUEEN | |
| 101 | | GOLD | GOLD | | |
| 102 | | GOLD | GOLD | | |
| 103 | | GOLD | GOLD | | |
| 104 | | GOLD | GOLD | | |
| 105 | | GOLD | GOLD | | |
| 106 | | GOLD | GOLD | | |
| 107 | | GOLD | GOLD | | |
| 108 | | GOLD | GOLD | | |
| 109 | | GOLD | GOLD | | |
| 110 | | GOLD | WILD | | |
| 111 | | WILD | NINE | | |
| 112 | | TEN | NINE | | |
| 113 | | TEN | NINE | | |
| 114 | | TEN | NINE | | |
| 115 | | TEN | | | |

FIG. 5A

| CODE No. | FIRST REEL | SECOND REEL | THIRD REEL | FOURTH REEL | FIFTH REEL |
|---|---|---|---|---|---|
| 0 | GOLD1 | GOLD1 | GOLD1 | GOLD1 | GOLD1 |
| 1 | GOLD2 | GOLD2 | GOLD2 | GOLD2 | GOLD2 |
| 2 | GOLD3 | GOLD3 | GOLD3 | GOLD3 | GOLD3 |
| 3 | GOLD4 | GOLD4 | GOLD4 | GOLD4 | GOLD4 |
| 4 | GOLD5 | GOLD5 | GOLD5 | GOLD5 | GOLD5 |
| 5 | GOLD6 | GOLD6 | GOLD6 | GOLD6 | GOLD6 |
| 6 | GOLD5 | GOLD5 | GOLD5 | GOLD5 | GOLD5 |
| 7 | GOLD6 | GOLD6 | GOLD6 | GOLD6 | GOLD6 |
| 8 | GOLD5 | GOLD5 | GOLD5 | GOLD5 | GOLD5 |
| 9 | GOLD6 | GOLD6 | GOLD6 | GOLD6 | GOLD6 |
| 10 | GOLD5 | GOLD5 | GOLD5 | GOLD5 | GOLD5 |
| 11 | GOLD6 | GOLD6 | GOLD6 | GOLD6 | GOLD6 |
| 12 | GOLD5 | GOLD5 | GOLD5 | GOLD5 | GOLD5 |
| 13 | GOLD6 | GOLD6 | GOLD6 | GOLD6 | GOLD6 |
| 14 | GOLD5 | GOLD5 | GOLD5 | GOLD5 | GOLD5 |
| 15 | GOLD6 | GOLD6 | GOLD6 | GOLD6 | GOLD6 |
| 16 | GOLD5 | GOLD5 | GOLD5 | GOLD5 | GOLD5 |
| 17 | GOLD6 | GOLD6 | GOLD6 | GOLD6 | GOLD6 |
| 18 | GOLD5 | GOLD5 | GOLD5 | GOLD5 | GOLD5 |
| 19 | GOLD6 | GOLD6 | GOLD6 | GOLD6 | GOLD6 |
| 20 | GOLD5 | GOLD5 | GOLD5 | GOLD5 | GOLD5 |
| 21 | GOLD6 | GOLD6 | GOLD6 | GOLD6 | GOLD6 |
| 22 | GOLD5 | GOLD5 | GOLD5 | GOLD5 | GOLD5 |
| 23 | GOLD6 | GOLD6 | GOLD6 | GOLD6 | GOLD6 |
| 24 | GOLD5 | GOLD5 | GOLD5 | GOLD5 | GOLD5 |
| 25 | GOLD6 | GOLD6 | GOLD6 | GOLD6 | GOLD6 |
| 26 | GOLD7 | GOLD7 | GOLD7 | GOLD7 | GOLD7 |
| 27 | GOLD8 | GOLD8 | GOLD8 | GOLD8 | GOLD8 |
| 28 | GOLD9 | GOLD9 | GOLD9 | GOLD9 | GOLD9 |
| 29 | GOLD10 | GOLD10 | GOLD10 | GOLD10 | GOLD10 |

FIG. 5B

| CODE No. | FIRST REEL | SECOND REEL | THIRD REEL | FOURTH REEL | FIFTH REEL |
|---|---|---|---|---|---|
| 30 | NINE | NINE | NINE | NINE | NINE |
| 31 | NINE | NINE | NINE | NINE | NINE |
| 32 | NINE | NINE | NINE | NINE | NINE |
| 33 | NINE | NINE | NINE | NINE | NINE |
| 34 | TEN | WILD | WILD | WILD | WILD |
| 35 | TEN | TEN | TEN | TEN | TEN |
| 36 | TEN | TEN | TEN | TEN | TEN |
| 37 | TEN | TEN | TEN | TEN | TEN |
| 38 | NINE | TEN | TEN | TEN | TEN |
| 39 | NINE | FEATURE | FEATURE | FEATURE | JACK |
| 40 | NINE | JACK | JACK | JACK | JACK |
| 41 | NINE | JACK | JACK | JACK | JACK |
| 42 | TEN | JACK | JACK | JACK | JACK |
| 43 | TEN | JACK | JACK | JACK | WILD |
| 44 | TEN | WILD | WILD | WILD | QUEEN |
| 45 | TEN | QUEEN | QUEEN | QUEEN | QUEEN |
| 46 | JACK | QUEEN | QUEEN | QUEEN | QUEEN |
| 47 | JACK | QUEEN | QUEEN | QUEEN | QUEEN |
| 48 | JACK | QUEEN | QUEEN | QUEEN | KING |
| 49 | JACK | FEATURE | FEATURE | FEATURE | KING |
| 50 | QUEEN | KING | KING | KING | KING |
| 51 | QUEEN | KING | KING | KING | KING |
| 52 | QUEEN | KING | KING | KING | WILD |
| 53 | QUEEN | KING | KING | KING | ACE |
| 54 | KING | WILD | WILD | WILD | ACE |
| 55 | KING | ACE | ACE | ACE | ACE |
| 56 | KING | ACE | ACE | ACE | ACE |
| 57 | KING | ACE | ACE | ACE | NINE |
| 58 | ACE | ACE | ACE | ACE | NINE |
| 59 | ACE | FEATURE | FEATURE | FEATURE | NINE |

FIG. 5C

| CODE No. | FIRST REEL | SECOND REEL | THIRD REEL | FOURTH REEL | FIFTH REEL |
|---|---|---|---|---|---|
| 60 | ACE | NINE | NINE | NINE | NINE |
| 61 | ACE | NINE | NINE | NINE | WILD |
| 62 | | NINE | NINE | NINE | TEN |
| 63 | | NINE | NINE | NINE | TEN |
| 64 | | WILD | WILD | WILD | TEN |
| 65 | | TEN | TEN | TEN | TEN |
| 66 | | TEN | TEN | TEN | JACK |
| 67 | | TEN | TEN | TEN | JACK |
| 68 | | TEN | TEN | TEN | JACK |
| 69 | | FEATURE | FEATURE | FEATURE | JACK |
| 70 | | JACK | JACK | JACK | WILD |
| 71 | | JACK | JACK | JACK | QUEEN |
| 72 | | JACK | JACK | JACK | QUEEN |
| 73 | | JACK | JACK | JACK | QUEEN |
| 74 | | WILD | WILD | WILD | QUEEN |
| 75 | | QUEEN | QUEEN | QUEEN | KING |
| 76 | | QUEEN | QUEEN | QUEEN | KING |
| 77 | | QUEEN | QUEEN | QUEEN | KING |
| 78 | | QUEEN | QUEEN | QUEEN | KING |
| 79 | | FEATURE | KING | KING | WILD |
| 80 | | KING | KING | KING | ACE |
| 81 | | KING | KING | KING | ACE |
| 82 | | KING | KING | KING | ACE |
| 83 | | KING | WILD | WILD | ACE |
| 84 | | WILD | ACE | ACE | |
| 85 | | ACE | ACE | ACE | |
| 86 | | ACE | ACE | ACE | |
| 87 | | ACE | ACE | ACE | |
| 88 | | ACE | | | |

WINNING LINE PATTERN (No. 1)

FIG. 7B

WINNING LINE DEFINITION TABLE

| No. | FIRST REEL | SECOND REEL | THIRD REEL | FOURTH REEL | FIFTH REEL |
|---|---|---|---|---|---|
| 1 | 0 | 0 | 0 | 0 | 0 |
| 2 | 0 | 0 | 0 | 1 | 0 |
| 3 | 0 | 0 | 0 | 1 | 2 |
| 4 | 0 | 0 | 1 | 1 | 1 |
| 5 | 0 | 1 | 0 | 0 | 0 |
| 6 | 0 | 1 | 2 | 3 | 2 |
| 7 | 0 | 0 | 1 | 0 | 0 |
| 8 | 0 | 1 | 2 | 1 | 0 |
| 9 | 0 | 1 | 0 | 1 | 0 |
| 10 | 0 | 1 | 1 | 1 | 0 |
| 11 | 0 | 0 | 1 | 1 | 0 |
| 12 | 0 | 1 | 1 | 0 | 0 |
| 13 | 1 | 1 | 1 | 1 | 1 |
| 14 | 1 | 1 | 1 | 0 | 1 |
| 15 | 1 | 1 | 1 | 2 | 1 |
| 16 | 1 | 0 | 1 | 1 | 1 |
| 17 | 1 | 2 | 1 | 1 | 1 |
| 18 | 1 | 0 | 1 | 2 | 3 |
| 19 | 1 | 1 | 2 | 1 | 1 |
| 20 | 1 | 1 | 0 | 1 | 1 |
| 21 | 1 | 0 | 0 | 0 | 1 |
| 22 | 1 | 0 | 1 | 0 | 1 |
| 23 | 1 | 2 | 2 | 2 | 1 |
| 24 | 1 | 2 | 1 | 2 | 1 |
| 25 | 1 | 2 | 3 | 2 | 1 |
| 26 | 2 | 2 | 2 | 2 | 2 |
| 27 | 2 | 2 | 2 | 1 | 2 |
| 28 | 2 | 2 | 2 | 3 | 2 |
| 29 | 2 | 1 | 2 | 2 | 2 |
| 30 | 2 | 2 | 1 | 2 | 2 |
| 31 | 2 | 3 | 2 | 1 | 0 |
| 32 | 2 | 3 | 2 | 2 | 2 |
| 33 | 2 | 2 | 3 | 2 | 2 |
| 34 | 2 | 1 | 1 | 1 | 2 |
| 35 | 2 | 1 | 2 | 1 | 2 |
| 36 | 2 | 1 | 0 | 1 | 2 |
| 37 | 2 | 3 | 2 | 3 | 2 |
| 38 | 2 | 3 | 3 | 3 | 2 |
| 39 | 3 | 3 | 3 | 3 | 3 |
| 40 | 3 | 3 | 3 | 2 | 1 |
| 41 | 3 | 3 | 3 | 2 | 3 |
| 42 | 3 | 2 | 3 | 3 | 3 |
| 43 | 3 | 3 | 2 | 2 | 2 |
| 44 | 3 | 2 | 1 | 0 | 1 |
| 45 | 3 | 2 | 2 | 3 | 3 |
| 46 | 3 | 3 | 2 | 2 | 3 |
| 47 | 3 | 3 | 2 | 3 | 3 |
| 48 | 3 | 2 | 1 | 2 | 3 |
| 49 | 3 | 2 | 2 | 2 | 3 |
| 50 | 3 | 2 | 3 | 2 | 3 |

FIG. 8A

PAYOUT TABLE

| NUMBER OF SYMBOLS | 1 | 2 | 3 | 4 | 5 |
|---|---|---|---|---|---|
| WILD | 0 | 0 | 0 | 0 | 0 |
| GOLD | 0 | 2 | 25 | 50 | 100 |
| RED | 0 | 1 | 20 | 40 | 80 |
| BLUE | 0 | 1 | 20 | 40 | 80 |
| GREEN | 0 | 1 | 10 | 20 | 40 |
| WHITE | 0 | 1 | 10 | 20 | 40 |
| ACE | 0 | 0 | 5 | 10 | 15 |
| KING | 0 | 0 | 4 | 9 | 14 |
| QUEEN | 0 | 0 | 3 | 8 | 13 |
| JACK | 0 | 0 | 2 | 7 | 12 |
| TEN | 0 | 0 | 1 | 6 | 11 |
| NINE | 0 | 0 | 1 | 6 | 11 |
| FEATURE | 0 | 0 | 2 | 0 | 0 |

FIG. 8B

SYMBOL DEFINITION TABLE

| SYMBOL | GRAPHICAL PRESENTATION FILE | EFFECT CONTENT DEFINITION FILE |
|---|---|---|
| WILD | — | — |
| GOLD | GOLD DRAGON | 001 |
| RED | RED DRAGON | 002 |
| BLUE | BLUE DRAGON | 003 |
| GREEN | GREEN DRAGON | 004 |
| WHITE | WHITE DRAGON | 005 |
| ACE | A | 006 |
| KING | K | 007 |
| QUEEN | Q | 008 |
| JACK | J | 009 |
| TEN | 10 | 010 |
| NINE | 9 | 011 |
| FEATURE | ORB | 012 |

(SCREEN IS CHANGED WITH FADE-IN/FADE-OUT EFFECTS)

| SYMBOL | WINNING LINE | DETAILS OF LINE | NUMBER OF SYMBOLS ARRANGED | PAYOUT |
|---|---|---|---|---|
| ★ (GOLD) | 10 | (0, 1, 1, 1, 0) | 4 | 50 |
| | 12 | (0, 1, 1, 0, 0) | 3 | 25 |
| | 13 | (1, 1, 1, 1, 1) | 3 | 25 |
| | 34 | (2, 1, 1, 1, 2) | 3 | 25 |
| | 4 | (0, 0, 1, 1, 1) | 3 | 25 |
| | 5 | (0, 1, 0, 0, 0) | 2 | 2 |
| | 6 | (0, 1, 2, 3, 2) | 2 | 2 |
| | 9 | (0, 1, 0, 1, 0) | 3 | 25 |
| | 11 | (0, 0, 1, 1, 0) | 3 | 25 |
| | 14 | (1, 1, 1, 0, 1) | 2 | 2 |
| | 15 | (1, 1, 1, 2, 1) | 2 | 2 |
| | 16 | (1, 0, 1, 1, 1) | 2 | 2 |
| | 17 | (1, 2, 1, 1, 1) | 2 | 2 |
| A (A) | 26 | (2, 2, 2, 2, 2) | 3 | 5 |
| | 27 | (2, 2, 2, 1, 2) | 3 | 5 |
| | 28 | (2, 2, 2, 3, 2) | 3 | 5 |
| J (J) | 39 | (3, 3, 3, 3, 3) | 3 | 2 |
| | 40 | (3, 3, 3, 2, 1) | 3 | 2 |
| | 41 | (3, 3, 3, 2, 3) | 3 | 2 |

FIG. 30A
| TOTAL WIN OBTAINED BY SPIN | EFFECT OF DISPLAY OF WIN SIGNBOARD |
|---|---|
| LESS THAN 20 TIMES TOTAL BET | SILVER SIGNBOARD |
| EQUAL TO OR MORE THAN 20 TIMES TOTAL BET AND LESS THAN 50 TIMES TOTAL BET | GOLD SIGNBOARD + COINS |
| EQUAL TO OR MORE THAN 50 TIMES TOTAL BET | GOLD SIGNBOARD + COINS + BILLS |
FIG. 30B
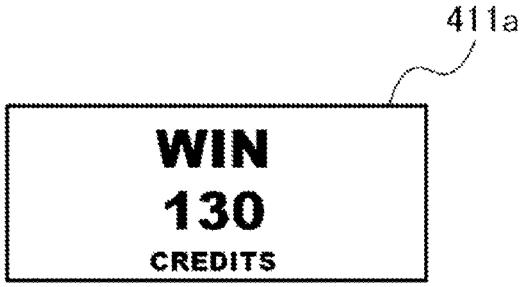
FIG. 30C

FIG. 31

INCREMENTAL RATE MANAGEMENT TABLE

| WIN CLASS | CRITERION (TOTAL BET) | | TIME LENGTH OF INCREMENT (SECONDS) |
|---|---|---|---|
| | ≥ | < | |
| win_1 | — | 0. 1 | 0. 50 |
| win_2 | 0. 1 | 0. 2 | 0. 60 |
| win_3 | 0. 2 | 0. 3 | 0. 70 |
| win_4 | 0. 3 | 0. 4 | 0. 90 |
| win_5 | 0. 4 | 0. 5 | 0. 90 |
| win_6 | 0. 5 | 0. 75 | 1. 50 |
| win_7 | 0. 75 | 1 | 2. 00 |
| win_8 | 1 | 1. 25 | 2. 50 |
| win_9 | 1. 25 | 1. 5 | 2. 70 |
| win_10 | 1. 5 | 2 | 3. 90 |
| win_11 | 2 | 3 | 5. 60 |
| win_12 | 3 | 4 | 6. 10 |
| win_13 | 4 | 5 | 9. 90 |
| win_14 | 5 | 6 | 9. 90 |
| win_15 | 6 | 7 | 9. 90 |
| win_16 | 7 | 8 | 11. 90 |
| win_17 | 8 | 10 | 19. 60 |
| win_18 | 10 | 12 | 19. 70 |
| win_19 | 12 | 15 | 23. 80 |
| win_20 | 15 | 20 | 30. 30 |
| win_21 | 20 | 30 | 34. 60 |
| win_22 | 30 | 40 | 43. 00 |
| win_23 | 40 | 50 | 50. 00 |
| win_24 | 50 | — | 72. 00 |

FIG. 35
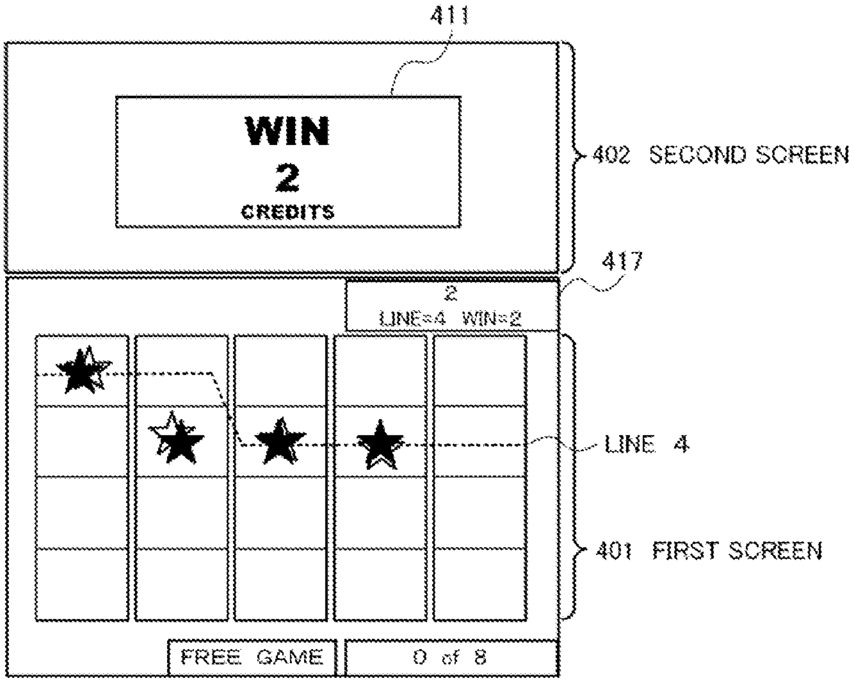

FIG. 40A
| TOTAL OBTAINED CREDIT | EFFECT OF DISPLAY OF TOTAL WIN SIGNBOARD | DISPLAY TIME (SECONDS) |
|---|---|---|
| LESS THAN 20 TIMES TOTAL BET | SILVER SIGNBOARD | 3. 6 |
| EQUAL TO OR MORE THAN 20 TIMES TOTAL BET AND LESS THAN 50 TIMES TOTAL BET | GOLD SIGNBOARD + COINS | 6 |
| EQUAL TO OR MORE THAN 50 TIMES TOTAL BET | GOLD SIGNBOARD + COINS + BILLS | 10 |
FIG. 40B
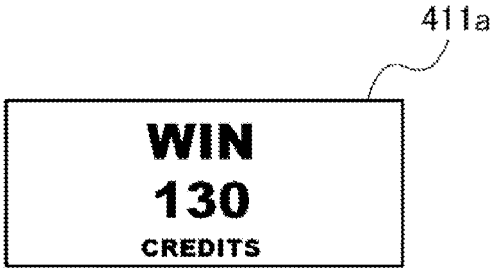
FIG. 40C

FIG. 43
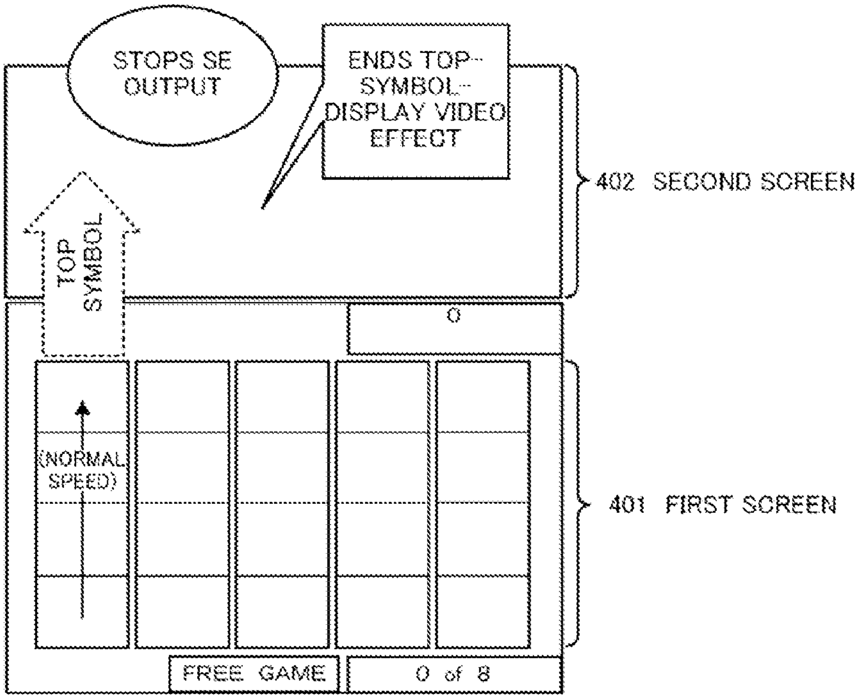

FIG. 46A FIRST REEL DATA
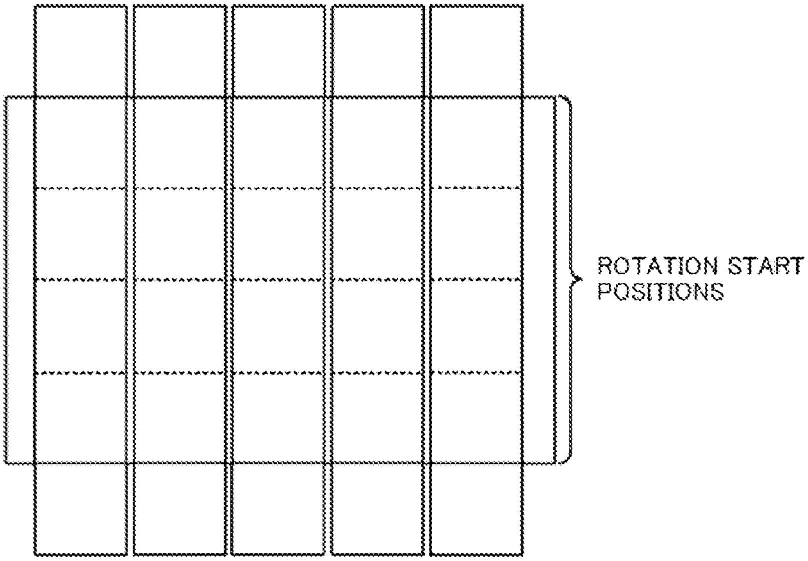
FIG. 46B
| FIRST REEL | SECOND REEL | THIRD REEL | FOURTH REEL | FIFTH REEL |
|---|---|---|---|---|
| QUEEN | FEATURE | WILD | FEATURE | NINE |
| QUEEN | JACK | TEN | JACK | WILD |
| KING | JACK | TEN | JACK | TEN |
| KING | JACK | TEN | JACK | TEN |
| KING | JACK | TEN | JACK | TEN |
| KING | WILD | FEATURE | WILD | TEN |
FIG. 46C LAST REEL DATA
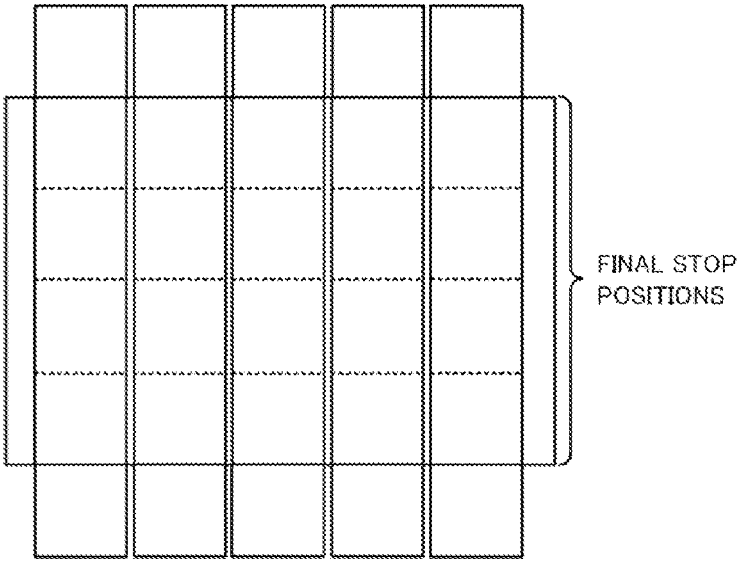

FIG. 48A

| FIRST REEL | | SECOND REEL | | THIRD REEL | | FOURTH REEL | | FIFTH REEL | |
|---|---|---|---|---|---|---|---|---|---|
| 33 | NINE | 50 | KING | 39 | FEATURE | 39 | FEATURE | 75 | KING |
| 34 | TEN | 51 | KING | 40 | JACK | 40 | JACK | 76 | KING |
| 35 | TEN | 52 | KING | 41 | JACK | 41 | JACK | 77 | KING |
| 36 | TEN | 53 | KING | 42 | JACK | 42 | JACK | 78 | KING |
| 37 | TEN | 54 | WILD | 43 | JACK | 43 | JACK | 79 | WILD |
| — | 1 | 55 | ACE | 44 | WILD | — | 1 | 80 | ACE |
| — | 2 | 56 | ACE | 45 | QUEEN | — | 2 | 81 | ACE |
| — | 3 | 57 | ACE | — | 1 | — | 3 | 82 | ACE |
| — | 4 | 58 | ACE | — | 2 | — | 4 | 83 | ACE |
| — | 5 | — | 1 | — | 3 | — | 5 | 0 | GOLD1 |
| — | 6 | — | 2 | — | 4 | — | 6 | 1 | GOLD2 |
| — | 7 | — | 3 | — | 5 | — | 7 | 2 | GOLD3 |
| — | 8 | — | 4 | — | 6 | — | 8 | 3 | GOLD4 |
| — | 9 | — | 5 | — | 7 | — | 9 | 4 | GOLD5 |
| — | 10 | — | 6 | — | [illegible] | — | [illegible] | [illegible] | [illegible] |

FINAL STOP POSITIONS IN PREVIOUS SPIN

FIRST REWRITING POSITION

SECOND REWRITING POSITION

THIRD REWRITING POSITION

FIG. 48B

REWRITING POSITION LOTTERY TABLE

| FIRST REEL | SECOND REEL | THIRD REEL | FOURTH REEL | FIFTH REEL | WEIGHT |
|---|---|---|---|---|---|
| 2 | 2 | 2 | 2 | 2 | 1 |
| 4 | 4 | 4 | 4 | 4 | 1 |
| 6 | 6 | 6 | 6 | 6 | 1 |
| −1 | −1 | −1 | −1 | −1 | 6 |

501
502
512
513
MIDDLE REEL DATA
LAST REEL DATA
CONSTANT TIME Tx
t
31 NINE
32 NINE
33 NINE
34 TEN
35 TEN
36 TEN
37 TEN
38 NINE
39 NINE
40 NINE
55 KING
56 KING
57 KING
58 ACE
59 ACE
60 ACE
61 ACE
0 GOLD1
1 GOLD2
2 GOLD3
3 GOLD4
4 GOLD5
5 GOLD6
16 GOLD5
17 GOLD6
18 GOLD5
19 GOLD6
20 GOLD5
21 GOLD6
22 GOLD5
23 GOLD6
24 GOLD5
25 GOLD6
26 GOLD7
27 GOLD8
28 GOLD9
29 GOLD10
30 NINE
31 NINE
32 NINE
33 NINE
34 TEN
35 TEN
36 TEN
37 TEN
38 NINE
51 QUEEN
52 QUEEN
53 QUEEN
54 KING
55 KING
56 KING
57 KING
58 ACE
59 ACE 561
562
571
572
573
FIRST REEL DATA
MIDDLE REEL DATA
LAST REEL DATA
CONSTANT TIME Tx
t
31 NINE
32 NINE
33 NINE
34 TEN
35 TEN
36 TEN
37 TEN
38 NINE
39 NINE
40 NINE
55 KING
56 KING
57 KING
58 ACE
59 ACE
60 ACE
61 ACE
0 GOLD1
1 GOLD2
2 GOLD3
3 GOLD4
4 GOLD5
5 GOLD6
14 GOLD5
15 GOLD6
16 GOLD5
17 GOLD6
18 GOLD5
19 GOLD6
20 GOLD5
21 GOLD6
22 GOLD5
23 GOLD6
24 GOLD5
25 GOLD6
26 GOLD7
27 GOLD8
28 GOLD9
29 GOLD10
30 NINE
31 NINE
32 NINE
51 QUEEN
52 QUEEN
53 QUEEN
54 KING
55 KING
56 KING
57 KING
58 ACE
59 ACE
60 ACE
61 ACE
0 GOLD1
1 GOLD2

FIG.55

Rewritten frame definition table

| First reel | | Second reel | | Third reel | | Fourth reel | | Fifth reel | |
|---|---|---|---|---|---|---|---|---|---|
| To-be stopped symbol code No. | Rewritten frame | To-be stopped symbol code No. | Rewritten frame | To-be stopped symbol code No. | Rewritten frame | To-be stopped symbol code No. | Rewritten frame | To-be stopped symbol code No. | Rewritten frame |
| 0 | 33 | 0 | 61 | 0 | 89 | 0 | 117 | 0 | 144 |
| 1 | 27 | 1 | 55 | 1 | 83 | 1 | 110 | 1 | 138 |
| 2 | 20 | 2 | 49 | 2 | 77 | 2 | 104 | 2 | 144 |
| 3 | 282 | 3 | 49 | 3 | 71 | 3 | 110 | 3 | 138 |
| 4 | 276 | 4 | 49 | 4 | 64 | 4 | 104 | 4 | 389 |
| 5 | 271 | 5 | 331 | 5 | 58 | 5 | 387 | 5 | 383 |
| 6 | 265 | 6 | 318 | 6 | 52 | 6 | 366 | 6 | 377 |
| 7 | 259 | 7 | 310 | 7 | 46 | 7 | 360 | 7 | 371 |
| 8 | 253 | 8 | 304 | 8 | 332 | 8 | 355 | 8 | 365 |
| 9 | 248 | 9 | 299 | 9 | 327 | 9 | 349 | 9 | 383 |
| 10 | 241 | 10 | 293 | 10 | 321 | 10 | 343 | 10 | 377 |
| 11 | 235 | 11 | 287 | 11 | 315 | 11 | 337 | 11 | 371 |
| 12 | 229 | 12 | 281 | 12 | 309 | 12 | 331 | 12 | 365 |
| 13 | 223 | 13 | 276 | 13 | 304 | 13 | 325 | 13 | 359 |
| 14 | 211 | 14 | 270 | 14 | 298 | 14 | 319 | 14 | 353 |
| 15 | 211 | 15 | 264 | 15 | 291 | 15 | 313 | 15 | 346 |
| 16 | 205 | 16 | [illegible] | 16 | [illegible] | [illegible] | [illegible] | [illegible] | [illegible] |

GAMING MACHINE

CROSS-REFERENCE TO RELATED APPLICATION

This application claims the benefit of Japanese Patent Application No. 2014-006812 filed on Jan. 17, 2014, which application is incorporated herein by reference in its entirety.

FIELD OF THE INVENTION

The present invention relates generally to a gaming machine that repeatedly runs a unit game.

BACKGROUND OF THE INVENTION

A conventionally known gaming machine is configured such that: upon insertion of a game medium such as a coin and pressing of a spin button by a player, random values for symbol determination are extracted to determine symbols that are to be displayed to the player at a time of stopping of a plurality of video reels on a display; scrolling of a symbol array in each video reel is started; the scrolling is stopped for symbol rearrangement so that the determined symbols are displayed to the player; whether or not a combination of displayed symbols is a winning combination is determined; and if it is a winning combination, benefits according to the combination of symbols is awarded to the player.

In this type of gaming machine, triggered by winning of BB which is related to bonus activation, a number of payable game media that can be paid out in a bonus game is determined and set (for example, see Japanese Patent Application Laid-Open No. 2007-20954). This gaming machine allows the player to play the bonus game until the number of payable game media that has been set is reached.

In this type of gaming machine, however, after the BB related to bonus activation is won, the player does nothing other than keep playing a game until the determined number of payable medals are paid out. That is, during the bonus activation, the player merely consumes payable game media, the number of which has been determined in advance. Thus, a variety of gaming patterns cannot be offered to the player in the bonus game.

Therefore, an object of the present invention is to provide a gaming machine that is able to offer a variety of gaming patterns with avoidance of monotony during a free game that is a game played in a bonus game, by performing such a control as to rotate video reels in a manner different from the manner of rotation in a base game.

BRIEF SUMMARY OF THE INVENTION

A first aspect of the present invention provides a gaming machine that determines a payout based on symbols rearranged, the gaming machine comprising:

a plurality of reels (for example, five video reels 3_a_ to 3_e_ displayed in a symbol display region 4) each having a plurality of symbols provided on an outer surface thereof; and a controller (for example, a main CPU 71, a body PCB 110, etc.) that controls a first game (for example, a base game) in which the plurality of reels are rotated and stopped to rearrange the plurality of symbols in a display region (for example, the symbol display region 4) of a first display (for example, a lower image display panel 141), the controller programmed to execute the following processing of (1-1) to (1-4).

The processing of (1-1) is processing of determining symbols to be rearranged, by a first lottery (for example, a lottery concerning symbol arrays for the base game shown in FIGS. 4A to 4D).

The processing of (1-2) is processing of, when the rearranged symbol satisfy a first condition (for example, when "FEATURE" symbols are stopped in second, third, and fourth reels), performing a control of starting a second game (for example, a free game).

The processing of (1-3) is processing of, in the second game, determining symbols to be rearranged, by a second lottery (for example, a lottery concerning symbol arrays for the free game shown in FIGS. 5A to 5C).

The processing of (1-4) is processing of, in the second game, rotating and stopping the plurality of reels, and when a particular symbol (for example, a top symbol such as symbols of "GOLD1" to "GOLD10") moves through the display region, performing a control of making the particular symbol move at a speed lower than the other symbols (for example, a control of making the particular symbol move at a speed of 6 dots/fps while making the other symbols move at a speed of 15 dots/fps (here, fps is 1/60 seconds)).

In the configuration provided by the above-mentioned aspect of the present invention, in the second game, the particular symbol moves at a speed lower than the other symbols. Accordingly, the particular symbol (for example, the top symbol that is advantageous to the player) can be presented at a slower pace to the player, which emphasizes the presence of this symbol.

In a second aspect of the present invention, the above-described first aspect is configured such that the processing of (1-4) includes the processing of (1-4-1) regardless of a symbol array preset for each reel, consecutively displaying the particular symbols (for example, a series of twenty top symbols) in rotation in the display region, and performing such a control as to make to-be stopped symbols stopped in the display region within a predetermined time period by selecting symbols to be displayed in rotation (for example, by selecting the top symbols which are displayed in rotation at a lower speed of movement and the other symbols which are displayed in rotation at a higher speed of movement by counting back symbols based on rotation stop positions and a time).

In the configuration provided by the above-mentioned aspect of the present invention, immediately after the rotation of the reels is started in the second game, the particular symbols (for example, the top symbols that are advantageous to the player) are consecutively displayed in rotation, and after elapse of a certain time length, symbols are stopped in the reels. This can enhance the player's expectation about the second game, and can give variety to effects.

In a third aspect of the present invention, the above-described second aspect is configured such that the processing of (1-4-1) includes the processing of:

(1-4-1-1) generating a plurality of data domains (for example, first reel data, middle reel data, and last reel data shown in FIGS. 50A to 50C) based on which symbols to be displayed in the display region are managed, and performing such a control as to avoid the consecutive particular symbols being managed in different data domains; and (1-4-1-2) when rotating the plurality of reels, coupling the plurality of data domains sequentially.

In the configuration provided by the above-mentioned aspect of the present invention, a series of symbols is managed based on the plurality of data domains, and consecutive picture symbols are managed in a single data domain. Accordingly, symbols can be displayed in rotation in the display region of the first display with a simple procedure.

In a fourth aspect of the present invention, the above-described second aspect is configured such that, the processing of (1-4-1) includes the processing of (1-4-1-3) after starting rotation of the plurality of reels, performing such a control as to display a predetermined number of symbols included in the symbol array and then displaying the particular symbols, and determining the value of the predetermined number by lottery for each reel.

In the configuration provided by the above-mentioned aspect of the present invention, immediately after the rotation of the reels is started in the second game, the particular symbols (for example, the top symbols that are advantageous to the player) are consecutively displayed in rotation, and additionally a control is performed so as to prevent those particular symbols from being aligned in a horizontal line during the rotation display. This can give the player expectation about the second game and an attractive effect.

The gaming machine according to the present invention is able to offer a variety of gaming patterns with avoidance of monotony during a free game.

These and other aspects, features and advantages of the present invention will become readily apparent to those having ordinary skill in the art upon a reading of the following detailed description of the invention in view of the drawings and claims.

BRIEF DESCRIPTION OF THE DRAWINGS

The nature and mode of operation of the present invention will now be more fully described in the following detailed description of the invention taken with the accompanying drawing figures, in which:

FIGS. 4A to 4D show an arrangement of symbols provided on peripheral surfaces of reels during a base game in the gaming machine;

FIGS. 5A to 5C show an arrangement of symbols provided on peripheral surfaces of reels during a free game in the gaming machine;

FIGS. 7A and 7B show a pattern of a winning line and a winning line definition table for the gaming machine;

FIGS. 8A and 8B show a payout table and a symbol definition table for the gaming machine;

FIGS. 30A to 30D are diagrams for explanation of effects produced on a WIN signboard;

FIG. 31 shows an incremental rate management table for the gaming machine;

FIG. 35 is a diagram for explanation of the effects produced when the line payout associated with the top symbol is established;

FIGS. 40A to 40D are diagrams for explanation of effects for display in a total WIN signboard after the free game ends;

FIG. 43 is a diagram for explanation of effects produced when a top symbol appears;

FIGS. 46A to 46C are diagrams for explanation of generation of reel data;

FIGS. 48A and 48B are diagrams for explanation of the appeal rewriting processing;

FIG. 55 shows a rewritten frame definition table for the gaming machine;

DETAILED DESCRIPTION OF THE PREFERRED EMBODIMENT

Explanation of Function Flow Diagram

Figure 1:
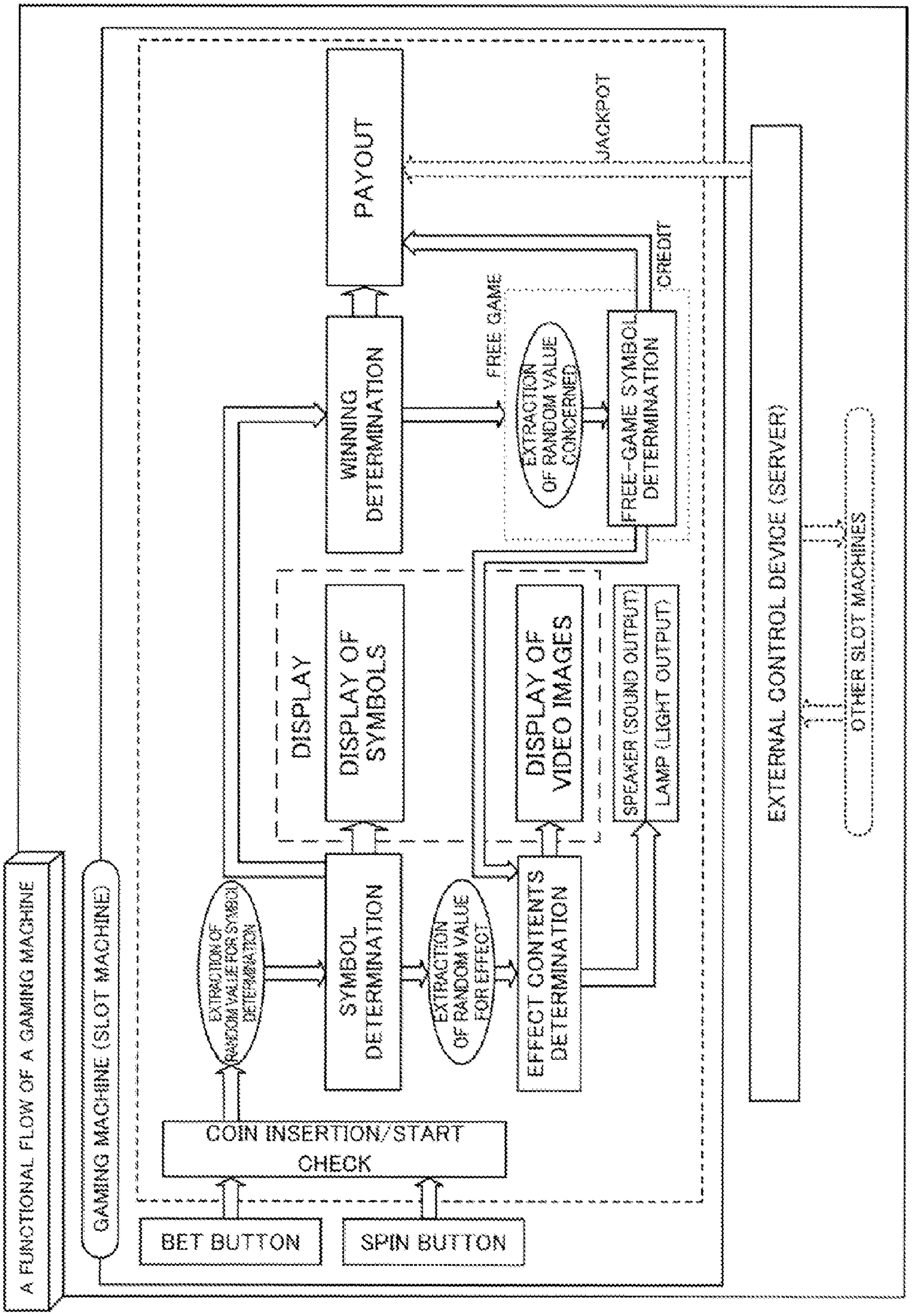
FIG. 1 is a diagram illustrating a function flow of a gaming machine.

With reference to FIG. 1, basic functions of a gaming machine according to the present embodiment are described. FIG. 1 is a diagram illustrating a function flow of the gaming machine according to an embodiment of the present invention.

<Coin-Insertion/Start-Check>

First, the gaming machine checks whether or not a coin has been inserted by a player or checks that a number-of-credit counter does not indicate zero, then checks whether or not a BET button has been pressed by the player, and subsequently checks whether or not a spin button has been pressed by the player.

<Symbol Determination>

Next, when the spin button is pressed by the player, the gaming machine extracts random values for symbol determination, and determines symbols to be displayed to the player at the time of stopping scrolling of symbol arrays, for a plurality of respective video reels displayed on a display.

<Symbol Display>

Next, the gaming machine starts scrolling of the symbol array of each of the video reels and then stops the scrolling for symbol rearrangement so that the determined symbols are displayed to the player.

<Winning Determination>

After scrolling of the symbol array of each video reel is stopped, the gaming machine determines whether or not a combination of symbols displayed to the player is a winning combination.

<Payout>

If the combination of symbols displayed to the player is a combination related to winning, the gaming machine offers benefits according to the combination to the player. For example, if a combination of symbols related to a payout of coins is displayed, the gaming machine pays out coins the number of which corresponds to the combination of symbols to the player.

<Free Game>

Further, if a combination of symbols related to a free game trigger is displayed, the gaming machine starts a free game including a predetermined number of games. The free game is a game in which a lottery concerning symbol determination is held without consumption of coins.

In the free game, when the spin button is pressed by the player, the gaming machine extracts random values for free-game symbol determination, and determines symbols to be displayed to the player at the time of stopping scrolling of symbol arrays, for a plurality of respective video reels displayed on the display. Next, the gaming machine starts scrolling of the symbol array of each of the video reels in the direction reverse to the scrolling direction employed in the base game, and then stops the scrolling for symbol rearrangement so that the determined symbols are displayed to the player. Then, similarly to in the base game, the gaming machine performs a winning determination and a payout.

In the free game, if a combination of symbols related to a free game trigger is further displayed, the number of games included in the free game is increased. When the number of games included in the free game reaches zero, the free game ends and the processing is returned to the base game.

The gaming machine is also configured to run a jackpot game. In the jackpot game, when a predetermined level is won, coins corresponding to the amount of jackpot are paid out to the player. The jackpot means a function that accumulates parts of coins consumed by players at the respective gaming machines as the amount of jackpot and that, when a predetermined level of jackpot is won, provides a payout whose amount corresponds to the level. Every time a game is run, the gaming machine calculates an amount (accumulation amount) to be accumulated into the amount of jackpot and accumulates the calculated amount into the amount of jackpot.

The gaming machine of the present invention is applicable to a stand-alone type gaming machine in which a single gaming machine is used for the jackpot and coins consumed at the single gaming machine are partially accumulated as the amount of jackpot. The gaming machine of the present invention is also applicable to a networked configuration in which the gaming machine is connected to other gaming machines (slot machines) placed in the same game arcade or in different game arcades to share the jackpot among them and the accumulation amount is transmitted via an external control device.

In the network, coins consumed by the player at each gaming machine are partially transmitted as an amount of jackpot to the external control device. The external control device accumulates the received amount of jackpot, which is shared among the respective gaming machines. When a predetermined level of jackpot is won, the external control device transmits the amount of jackpot to the winning gaming machine.

<Determination of Effects>

The gaming machine produces effects by displaying images to the display, outputting the light from lamps, and outputting sounds from speakers. The gaming machine extracts a random value for effect and determines contents of the effects based on the symbols and the like determined by lottery. In the free game, contents of effects are selected in accordance with, for example, a status of the free game, and the contents of effects are conducted.

[Overall Game System]

Figure 2:
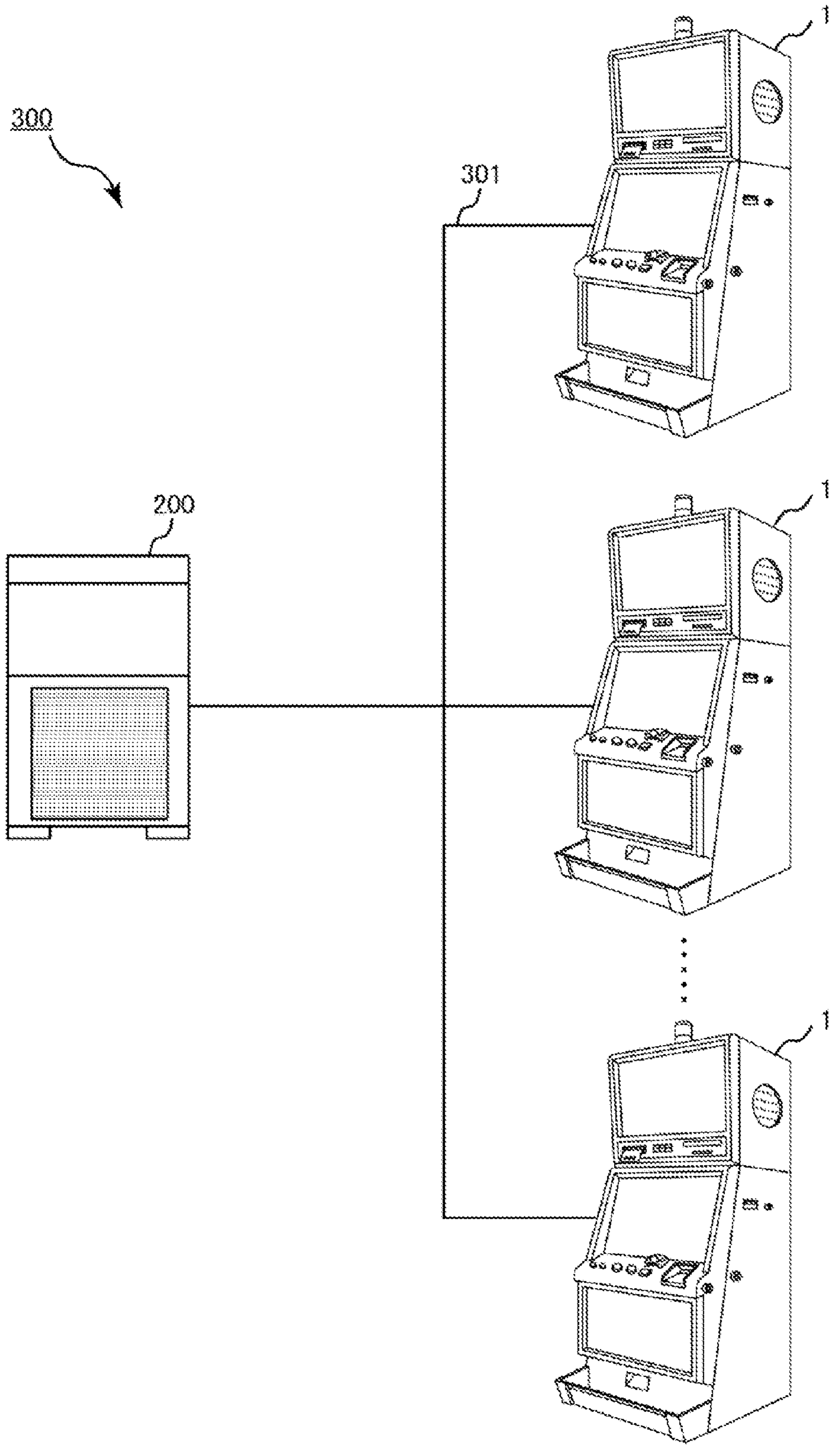
FIG. 2 is a diagram illustrating a game system including the gaming machine.

Next, with reference to FIG. 2, a game system including the gaming machine is described. FIG. 2 is a diagram illustrating the game system including the gaming machine according to the embodiment of the present invention.

A game system 300 includes a plurality of gaming machines 1, and an external control device 200 that is connected to each of the gaming machines 1 through a communication line 301.

The external control device 200 is for controlling the plurality of gaming machines 1. In the present embodiment, the external control device 200 is a so-called hall server which is installed in a game facility having the plurality of gaming machines 1. Each of the gaming machines 1 is provided with a unique identification number, and the external control device 200 identifies transmission sources of data transmitted from the respective gaming machines 1 by using the identification numbers. Also in the case where the external control device 200 transmits data to a gaming machine 1, the identification numbers are used for specifying the transmission destination.

It is to be noted that the game system 300 may be constructed within a single game facility where various games can be conducted, such as a casino, or may be constructed among a plurality of game facilities. Further, in a case where the game system 300 is constructed in a single game facility, the game system 300 may be constructed in each floor or section of the game facility. The communication line 301 may be a wired or wireless line, and can adopt a dedicated line, an exchange line or the like.

[Overall Configuration of Gaming Machine]

Figure 3:
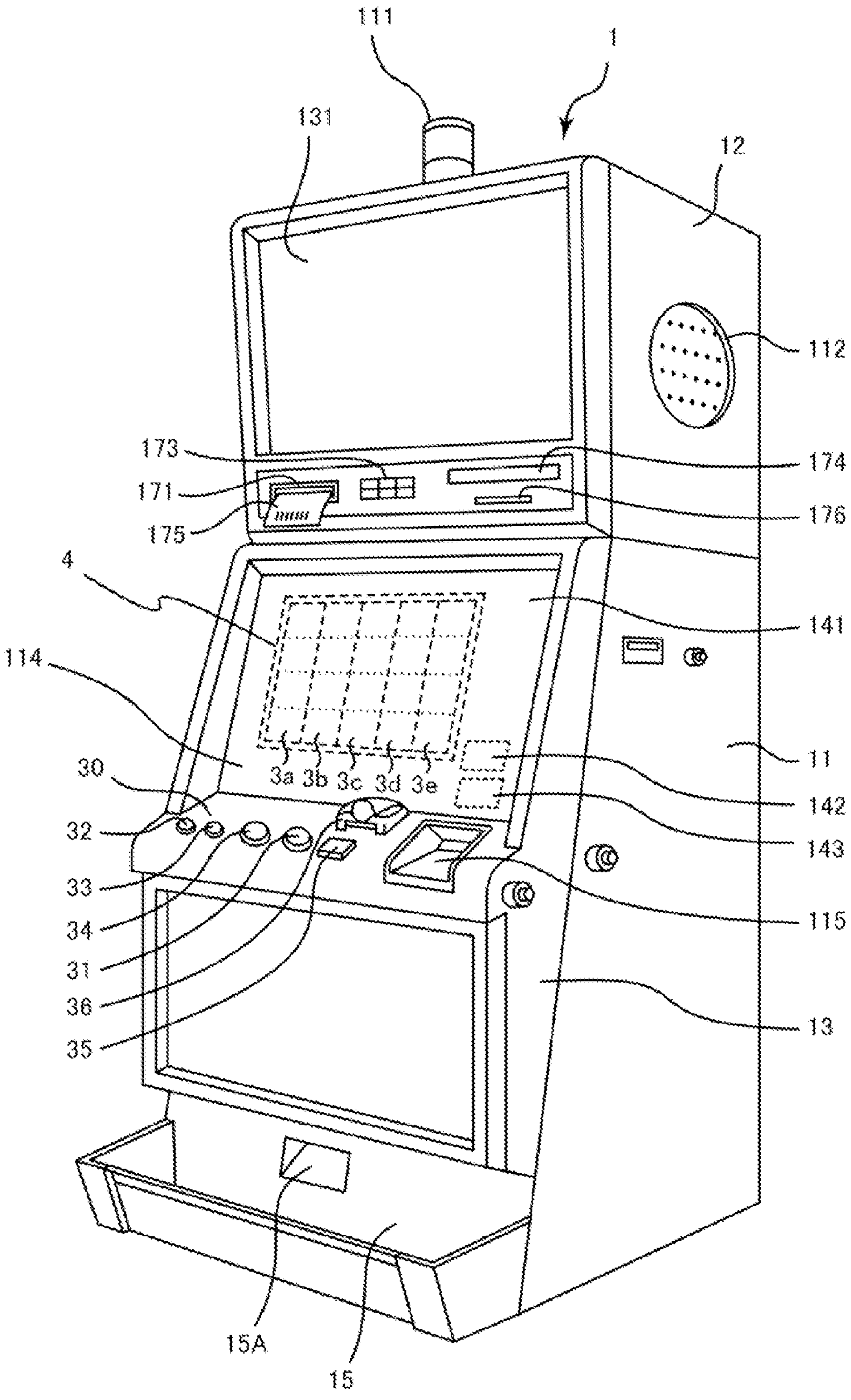
FIG. 3 is a diagram illustrating an overall configuration of the gaming machine.

Next, with reference to FIG. 3, an overall configuration of the gaming machine 1 is described. FIG. 3 is a diagram illustrating the overall configuration of the gaming machine according to the embodiment of the present invention.

A coin, a bill, or electrically valuable information corresponding to these is used as a game medium in the gaming machine 1. Further, in the present embodiment, a later-described ticket with a barcode is also used. It is to be noted that the game medium is not limited to these, and for example a medal, a token, electric money or the like can be adopted.

The gaming machine 1 includes a cabinet 11, a top box 12 installed on the upper side of the cabinet 11, and a main door 13 provided at the front face of the cabinet 11.

A lower image display panel 141 is provided at the center of the main door 13. The lower image display panel 141 includes a liquid crystal panel, and forms the display. The lower image display panel 141 has a symbol display region 4. In the symbol display region 4, five video reels 3 (3*a*, 3*b*, 3*c*, 3*d*, 3*e*) are displayed. In the present embodiment, a video reel depicts through videos the rotational and stop motions of a mechanical reel having a plurality of symbols drawn on the peripheral surface thereof. To each of the video reels 3, a symbol array comprised of a previously determined plurality of symbols is assigned (see FIGS. 4A to 5C which are described later).

In the symbol display region 4, the symbol arrays assigned to the respective video reels 3 are separately scrolled, and are stopped after predetermined time has elapsed. As a result, a part (four consecutive symbols in the present embodiment) of each of the symbol arrays is displayed to the player. The symbol display region 4 has four regions, namely an upper region, an upper central region, a lower central region, and a lower region, for each video reel 3, and a single symbol is to be displayed in each region. That is, twenty symbols (=5 columns×4 symbols) are to be displayed in the symbol display region 4.

In the present embodiment, a line formed by selecting one of the aforementioned four regions for each of the video reels 3 and connecting the respective regions is referred to as a winning line. It is to be noted that any desired shape of the winning line can be adopted, and examples of the shape of the winning line may include a straight line formed by connecting the upper central regions for the respective video reels 3, a V-shaped line, and a bent line. Also, any desired number of winning lines can be adopted, and the number can be for example fifty. A specific description of an exemplary winning line will be given later with reference to FIGS. 7A and 7B.

Further, the lower image display panel 141 has a number-of-credits display region 142 and a number-of-payouts display region 143. The number-of-credits display region 142 displays the number of coins (hereinafter also referred to as "the number of credits") owned by the player and retained inside the gaming machine 1. The number-of-payouts display region 143 displays the number of coins (hereinafter also referred to as "the number of payouts") to be paid out to the player when winning is established.

The lower image display panel 141 has a built-in touch panel 114. The player can input various commands by touching the lower image display panel 141.

On the lower side of the lower image display panel 141, there are arranged various buttons set in a control panel 30, and various devices to be operated by the player.

A spin button 31 is used when starting scrolling of the symbol arrays of the respective video reels 3. A change button 32 is used when requesting a game facility staff member to exchange money. A CASHOUT button 33 is used when paying out the coins retained inside the gaming machine 1 to a coin tray 15.

A 1-BET button 34 and a maximum BET button 35 are used for determining the number of coins (hereinafter also referred to as "the number of BETs") to be used in the game from the coins retained inside the gaming machine 1. The 1-BET button 34 is used when determining one coin at a time for the aforementioned number of BETs. The maximum BET button 35 is used when setting the aforementioned number of BETs to a defined upper limit number.

A coin accepting slot 36 is provided to accept coins. A bill validator 115 is provided to accept bills. The bill validator 115 validates a bill, and accepts a valid bill into the cabinet 11. It is to be noted that the bill validator 115 may be configured so as to be capable of reading a later-described ticket 175 with a barcode.

An upper image display panel 131 is provided at the front face of the top box 12. The upper image display panel 131 includes a liquid crystal panel, and forms the display. The upper image display panel 131 displays images related to effects, and a WIN signboard (a display part announcing that winning is established and showing the number of obtained credits by producing effects) related to a free game which is described later. The upper image display panel 131 also displays images showing introduction of the game contents and explanation of the game rules. Further, the top box 12 is provided with a speaker 112 and a lamp 111. The gaming machine 1 produces effects by displaying images on the lower image display panel 141 and the upper image display panel 131, outputting sounds, and outputting the light.

A ticket printer 171, a card slot 176, a data display 174, and a keypad 173 are provided on the lower side of the upper image display panel 131.

The ticket printer 171 prints on a ticket a barcode representing encoded data of the number of credits, date, the identification number of the gaming machine 1, and the like, and outputs the ticket as the ticket 175 with a barcode. The player can make a gaming machine read the ticket 175 with a barcode so as to play a game thereon, and can also exchange the ticket 175 with a barcode with a bill or the like at a predetermined place (e.g. a cashier in a casino) in the game facility.

The card slot 176 is for inserting a card in which predetermined data is stored. For example, the card stores data for identifying the player, and data about the history of games played by the player. After the card is inserted into the card slot 176, a later-described card reader 172 reads data from the card or writes data into the card. It is to be noted that the card may store data corresponding to a coin, a bill or a credit.

The data display 174 includes a fluorescent display, LEDs and the like, and displays the data read by the card reader 172 or the data inputted by the player via the keypad 173, for example. The keypad 173 is for inputting a command and data related to ticket issuance or the like.

The gaming machine according to the embodiment of the present invention is, herein, configured to control display of video reels on a display, but alternatively the gaming machine according to the embodiment of the present invention may be a gaming machine of a different type configured to display symbols to the player by driving mechanical reels with stepping motors, for example. In this description, moreover, the gaming machine 1 having the above-described configuration is illustrated for the purpose of description of the subject matter of the present invention. The present invention, however, is not limited to the above-described configuration. The present invention can be implemented as various gaming machines having other configurations.

[Symbol Arrays of Video Reels]

Next, a configuration of symbol arrays included in the video reels 3 of the gaming machine 1 is described with reference to FIGS. 4A to 5C. FIGS. 4A to 4D show an arrangement of symbols provided on the peripheral surfaces of the reels during the base game in the gaming machine according to the embodiment of the present invention. FIGS. 5A to 5C show an arrangement of symbols provided on the peripheral surfaces of the reels during the free game in the gaming machine according to the embodiment of the present invention.

Among the symbol arrays for the base game shown in FIGS. 4A to 4D, a symbol array including 82 symbols corresponding to code numbers 0 to 81, respectively, is assigned to a first reel (first video reel 3*a*); a symbol array including 116 symbols corresponding to code numbers 0 to 115, respectively, is assigned to a second reel (second video reel 3*b*); a symbol array including 115 symbols corresponding to code numbers 0 to 114, respectively, is assigned to a third reel (third video reel 3*c*); a symbol array including 101 symbols corresponding to code numbers 0 to 100, respectively, is assigned to a fourth reel (fourth video reel 3*d*); and a symbol array including 100 symbols corresponding to code numbers 0 to 99, respectively, is assigned to a fifth reel (fifth video reel 3*e*).

Types of the symbols include "WILD", "GOLD", "RED", "BLUE", "GREEN", "WHITE", "ACE", "KING", "QUEEN", "JACK", "TEN", "NINE", and "FEATURE". Symbols of these types are displayed on the video reels. The "WILD" symbol, which functions as a wild card, is a symbol substitutable for any symbol required in determination of a winning combination on the winning line. The "GOLD" symbol is a top symbol that provides the highest payout. The "FEATURE" symbol provides a predetermined benefit to the player on the condition that a predetermined number of "FEATURE" symbols are displayed in the symbol display region 4 including twenty symbols (5 columns×4 symbols) regardless of the winning line.

In the gaming machine according to the embodiment of the present invention, the base game and the free game have different symbol arrays displayed on the video reels. The symbol arrays shown in FIGS. 5A to 5C are symbol arrays for the free game, which are different from the symbol arrays for the base game shown in FIGS. 4A to 4D. In the symbol arrays for the free game shown in FIGS. 5A to 5C, a symbol array including 62 symbols corresponding to code numbers 0 to 61, respectively, is assigned to the first reel (first video reel 3*a*); a symbol array including 89 symbols corresponding to code numbers 0 to 88, respectively, is assigned to the second reel (second video reel 3*b*); a symbol array including 88 symbols corresponding to code numbers 0 to 87, respectively, is assigned to the third reel (third video reel 3*c*); a symbol array including 88 symbols corresponding to code numbers 0 to 87, respectively, is assigned to the fourth reel (fourth video reel 3*d*); and a symbol array including 84 symbols corresponding to code numbers 0 to 83, respectively, is assigned to the fifth reel (fifth video reel 3*e*).

To be specific, the symbol arrays for the free game shown in FIGS. 5A to 5C are set such that, for every video reel, the symbol array includes a smaller number of symbols and a larger number (percentage) of the top symbols, that is, "GOLD" symbols ("GOLD1" to "GOLD10" in FIGS. 5A to 5C), as compared with the symbol arrays for the base game shown in FIGS. 4A to 4D.

[Configuration of Circuit Included in Gaming Machine]

Figure 6:
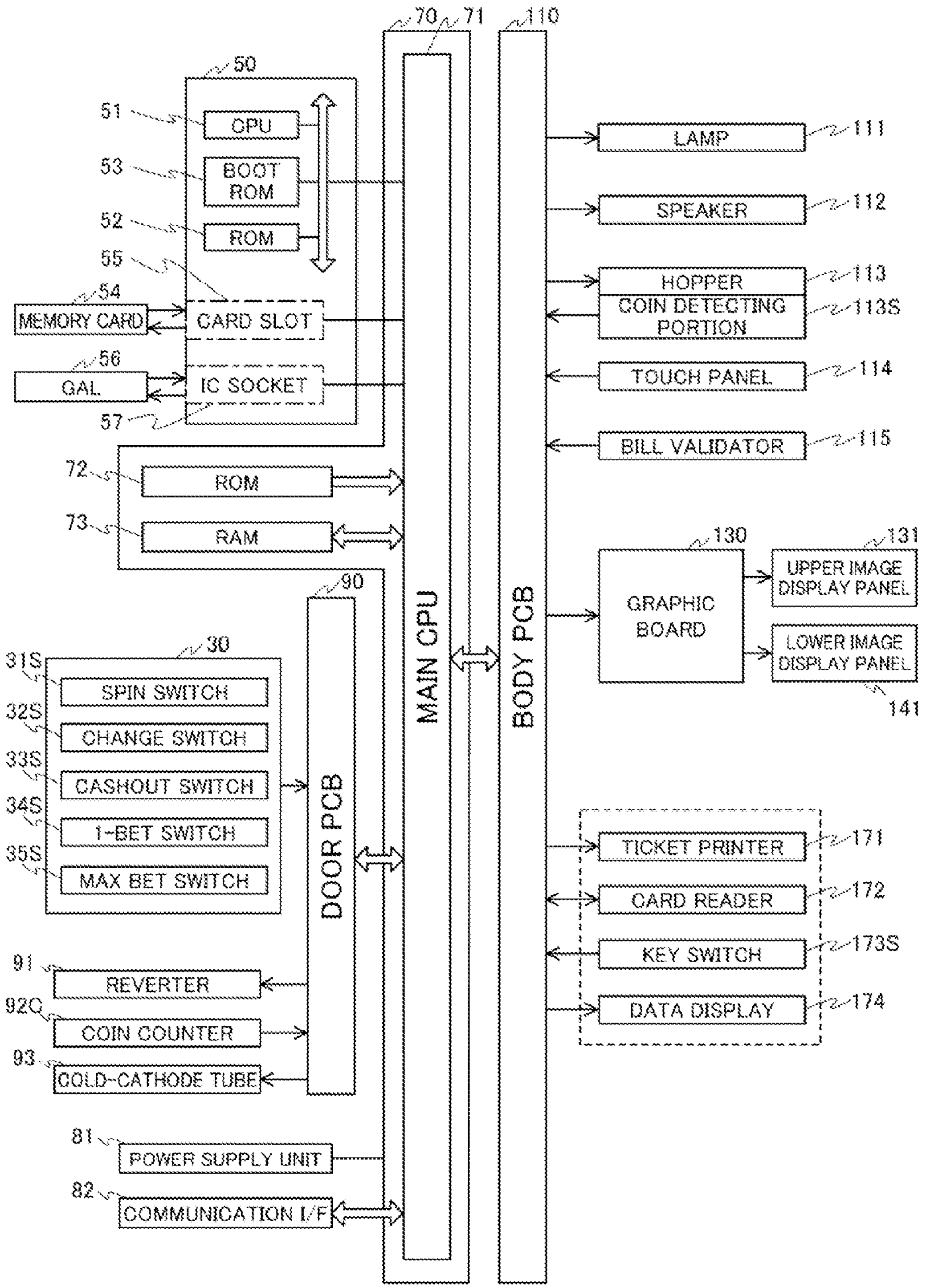
FIG. 6 is a block diagram illustrating an internal configuration of the gaming machine.

Next, with reference to FIG. 6, a configuration of a circuit included in the gaming machine 1 is described.

FIG. 6 is a block diagram illustrating an internal configuration of the gaming machine according to the embodiment of the present invention.

A gaming board 50 is provided with: a CPU 51, a ROM 52, and a boot ROM 53, which are mutually connected by an internal bus; a card slot 55 corresponding to a memory card 54; and an IC socket 57 corresponding to a GAL (Generic Array Logic) 56.

The memory card 54 includes a non-volatile memory, and stores a game program and a game system program. The game program includes a program related to game progression, a lottery program, and a program for producing effects by images and sounds (e.g. see FIGS. 10 to 18 which are described later). Further, the aforementioned game program includes data (see FIGS. 4A to 5C) specifying the configuration of the symbol array assigned to each video reel 3.

The lottery program is a program for determining to-be stopped symbol of each video reel 3 by lottery. The to-be stopped symbol is data for determining four symbols to be displayed in the symbol display region 4 out of the plurality of symbols forming each symbol array. The gaming machine 1 of the present embodiment determines as the to-be stopped symbol the symbol to be displayed in a predetermined region (e.g. the upper region) out of the four regions provided for each of the video reels 3 of the symbol display region 4.

The aforementioned lottery program includes symbol determination data. The symbol determination data is data that specifies random values so that each of the plurality of symbols forming the symbol array is determined at an equal probability, for each video reel 3. The probabilities of the respective symbols being determined are basically equal. However, as shown in FIGS. 4A to 5C, the numbers of the respective types of symbols included in the plurality of symbols vary, and thus the probabilities of the respective types of symbols being determined vary (i.e. different weights on the probabilities are generated). For example, with reference to FIGS. 4A to 4D, the symbol array of the first reel (first video reel 3*a*) includes four "ACE" symbols, and includes ten "GREEN" symbols. Hence, the former is determined at a probability of "4/82", whereas the latter is determined at a probability of "10/82". It may be acceptable that different winning probabilities are set depending on the types of symbols, the combinations of symbols, and the positions of symbols (code numbers).

It is to be noted that, although the data specifies that different numbers of symbols be provided to form the symbol arrays of the respective video reels 3 in the present embodiment, equal numbers of symbols may form the symbol arrays of the respective video reels 3. For example, each of the symbol arrays of the first reel (first video reel 3*a*) to the fifth reel (fifth video reel 3*e*) may consist of twenty symbols.

Further, the card slot 55 is configured so that the memory card 54 can be inserted thereinto and removed therefrom, and is connected to a motherboard 70 by an IDE bus.

The GAL 56 is a type of PLD (Programmable Logic Device) having a fixed OR array structure. The GAL 56 is provided with a plurality of input ports and output ports, and predetermined input into the input port causes output of the corresponding data from the output port.

Further, the IC socket 57 is configured so that the GAL 56 can be inserted thereinto and removed therefrom, and is connected to the motherboard 70 by a PCI bus. The contents of the game to be played on the gaming machine 1 can be changed by replacing the memory card 54 with another memory card 54 having another program written therein or by rewriting the program written into the memory card 54 as another program.

The CPU 51, the ROM 52 and the boot ROM 53 mutually connected by the internal bus are connected to the motherboard 70 by a PCI bus. The PCI bus enables a signal transmission between the motherboard 70 and the gaming board 50, and power supply from the motherboard 70 to the gaming board 50.

The ROM 52 stores an authentication program. The boot ROM 53 stores a pre-authentication program, a program (boot code) to be used by the CPU 51 for activating the pre-authentication program, and the like. The authentication program is a program (tamper check program) for authenticating the game program and the game system program. The pre-authentication program is a program for authenticating the aforementioned authentication program. The authentication program and the pre-authentication program are written along a procedure (authentication procedure) for proving that the program to be the subject has not been tampered.

The motherboard 70 is provided with a main CPU 71, a ROM 72, a RAM 73, and a communication interface 82.

The ROM 72 includes a memory device such as a flash memory, and stores a program such as BIOS to be executed by the main CPU 71, and permanent data. When the BIOS is executed by the main CPU 71, processing for initializing predetermined peripheral devices is conducted; further, through the gaming board 50, processing of loading the game program and the game system program stored in the memory card 54 is started.

The RAM 73 stores data and programs which are used in operation of the main CPU 71. For example, when the processing of loading the aforementioned game program, game system program or authentication program is conducted, the RAM 73 can store the program. The RAM 73 is provided with working areas used for operations in execution of these programs. Examples of the areas include: an area that stores the number of games, the number of BETs, the number of payouts, the number of credits and the like; and an area that stores symbols (code numbers) determined by lottery.

The communication interface 82 is for communicating with the external control device 200 such as a server, through the communication line 301. Further, the motherboard 70 is connected with a later-described door PCB (Printed Circuit Board) 90 and a body PCB 110 by respective USBs. The motherboard 70 is also connected with a power supply unit 81. When the power is supplied from the power supply unit 81 to the motherboard 70, the main CPU 71 of the motherboard 70 is activated, and then the power is supplied to the gaming board 50 through the PCI bus so as to activate the CPU 51.

The door PCB 90 and the body PCB 110 are connected with input devices such as a switch and a sensor, and peripheral devices the operations of which are controlled by the main CPU 71. The door PCB 90 is connected with a control panel 30, a reverter 91, a coin counter 92C and a cold cathode tube 93.

The control panel 30 is provided with a spin switch 31S, a change switch 32S, a CASHOUT switch 33S, a 1-BET switch 34S and a maximum BET switch 35S which correspond to the aforementioned respective buttons. Each of the switches outputs a signal to the main CPU 71 upon detection of press of the button corresponding thereto by the player.

The coin counter 92C validates a coin inserted into the coin accepting slot 36 based on its material, shape and the like, and outputs a signal to the main CPU 71 upon detection of a valid coin. Invalid coins are discharged from a coin payout exit 15A.

The reverter 91 operates based on a control signal outputted from the main CPU 71, and distributes valid coins validated by the coin counter 92C into a hopper 113 or a cash box (not illustrated). That is, coins are distributed into the hopper 113 when the hopper 113 is not filled with coins, while coins are distributed into the cash box when the hopper 113 is filled with coins.

The cold cathode tube 93 functions as a backlight installed on the rear face sides of the upper image display panel 131 and the lower image display panel 141, and lights up based on a control signal outputted from the main CPU 71.

The body PCB 110 is connected with the lamp 111, the speaker 112, the hopper 113, a coin detecting portion 113S, the touch panel 114, the bill validator 115, a graphic board 130, the ticket printer 171, the card reader 172, a key switch 173S and the data display 174.

The lamp 111 lights up based on a control signal outputted from the main CPU 71. The speaker 112 outputs sounds such as SE (Sound Effect) and BGM, based on a control signal outputted from the main CPU 71.

The hopper 113 operates based on a control signal outputted from the main CPU 71, and pays out coins of the specified number of payouts from the coin payout exit 15A to the coin tray 15. The coin detecting portion 113S outputs a signal to the main CPU 71 upon detection of coins paid out by the hopper 113.

The touch panel 114 detects a place on the lower image display panel touched by the player's finger or the like, and outputs to the main CPU 71 a signal corresponding to the detected place. The upper image display panel 131 may also be configured as a touch panel. Upon acceptance of a valid bill, the bill validator 115 outputs to the main CPU 71 a signal corresponding to the face amount of the bill.

The graphic board 130 controls display of images conducted by the respective upper image display panel 131 and lower image display panel 141, based on a control signal outputted from the main CPU 71. The symbol display region 4 of the lower image display panel 141 displays the five video reels 3 by which the scrolling and stop motions of the symbol arrays included in the respective video reels 3 are displayed. The number-of-credits display region 142 of the lower image display panel 141 displays the number of credits stored in the RAM 73. The number-of-payouts display region 143 of the lower image display panel 141 displays the number of payouts of coins.

The graphic board 130 is provided with the VDP (Video Display Processor) generating image data based on a control signal outputted from the main CPU 71, the video RAM temporarily storing the image data generated by the VDP, and the like. It is to be noted that the image data used in generation of image data by the VDP is included in the game program that has been read from the memory card 54 and stored into the RAM 73.

Based on a control signal outputted from the main CPU 71, the ticket printer 171 prints on a ticket a barcode representing encoded data of the number of credits stored in the RAM 73, date, the identification number of the gaming machine 1, and the like, and then outputs the ticket as the ticket 175 with a barcode.

The card reader 172 reads data stored in a card inserted into the card slot 176 and transmits the data to the main CPU 71, or writes data into the card based on a control signal outputted from the main CPU 71.

The key switch 173S is provided in the keypad 173, and outputs a predetermined signal to the main CPU 71 if the keypad 173 is operated by the player.

The data display 174 displays data read by the card reader 172 and data inputted by the player through the keypad 173, based on a control signal outputted from the main CPU 71.

[Patterns of Winning Line]

Figure 7A:
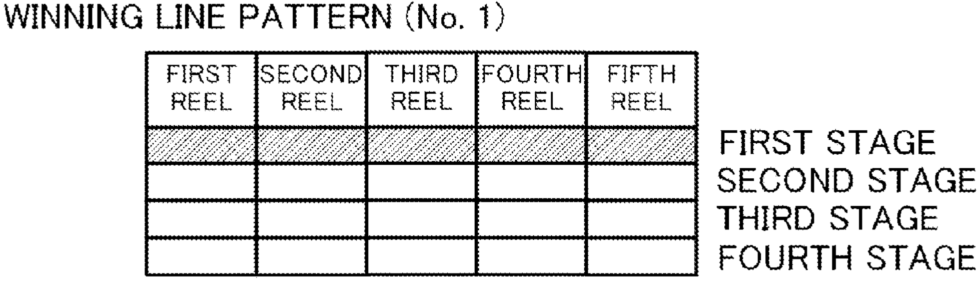

Next, with reference to FIG. 7A, the winning line in the free game will be described. FIG. 7A shows a winning line according to a pattern 1. This winning line is a line connecting a first-stage region of the first reel (first video reel 3*a*), a first-stage region of the second reel (second video reel 3*b*), a first-stage region of the third reel (third video reel 3*c*), a first-stage region of the fourth reel (fourth video reel 3*d*), and a first-stage region of the fifth reel (fifth video reel 3*e*).

The fifty lines set in the embodiment of the present invention are as shown in a winning line definition table of FIG. 7B, where the first-stage region, a second-stage region, a third-stage region, and a fourth-stage region of each reel are represented by "0", "1", "2", and "3", respectively. For example, in the pattern 1 shown in FIG. 7A, all of the first to fifth reels are "0". In the pattern 2, the first to third reels and the fifth reel are "0" while the fourth reel is "1".

Although the winning line definition table for the free game is described herein, a winning line is set for the base game, too. Patterns of the winning line and the number of the patterns can be different from those of the free game.

[Configuration of Payout Table]

Next, with reference to FIG. 8A, a payout table specifying a payout in the free game is described. In the embodiment of the present invention, a payout is determined based on the number of identical symbols displayed along each of the lines that are defined in the winning line definition table shown in FIG. 7B. The payout thus obtained is multiplied by the number of BETs designated by the player, and a resultant is added as the number of payouts to a number-of-payout counter.

For example, two "GOLD" symbols existing on any winning line make a win that provides a payout of "2", and five "GOLD" symbols existing on any winning line make a win that provides a payout of "100". It is possible that two "GOLD" symbols and three "RED" symbols are arranged on a single winning line. In such a case, two wins are concurrently achieved for the single winning line, resulting in a payout of "22" which is the sum of the payouts for these wins.

As described above, a win is determined for one winning line, and such a determination is made for each of the fifty winning lines set in the symbol display region 4 including the twenty symbols (5 columns×4 symbols). Accordingly, in some cases, a plurality of wins may be made in a single winning line, and moreover a win may be made in each of a plurality of winning lines.

Although the payout table and the winning determination for the free game are described herein, a payout table is also set for the base game and the winning determination is similarly made for the base game, too. It may be acceptable that a payout table and a winning determination for the base game are different from those for the free game.

[Configuration of Symbol Definition Table]

Next, with reference to FIG. 8B, a description is given of graphical presentation of symbols in the free game and a symbol definition table that defines contents of effects. In the embodiment of the present invention, symbols are displayed in the symbol array of each video reel 3 in accordance with contents of a corresponding graphical presentation file that is defined in a symbol definition table. For example, for the "GOLD" symbol, a graphical presentation file of "gold dragon" is used so that a gold-colored dragon is displayed. For the "RED" symbol, a graphical presentation file of "red dragon" is used so that a red-colored dragon is displayed. For the "JACK" symbol, a graphical presentation file of "J" is used so that the figure of the character "J" is displayed. Data defined as a graphical presentation file corresponding to each symbol indicates the name of image data used for displaying the symbol, the name of a folder storing the image data, and the like. Display of the symbol may be display of either a still image or a moving image (animation). In this example, the dragon symbols, namely, "gold dragon", "red dragon", "blue dragon", "green dragon", "white dragon", and the like, are picture symbols each of which is displayed in the form of an animation under a predetermined condition.

In the symbol definition table, an effect content definition file indicates the name of data that defines a content of an effect for a corresponding symbol, the name of a folder storing, for example, a file that defines the content of the effect, and the like.

In a case where animation display is made in a single region including a plurality of symbol display regions coupled together, a graphical presentation file and an effect content definition file for such a coupled region are prepared, as described later. For example, one normal symbol that is to be displayed in a single display region, two consecutive symbols that are to be displayed in a region including two coupled display regions, three consecutive symbols that are to be displayed in a region including three coupled display regions, and four consecutive symbols that are to be displayed in a four coupled display regions, can be individually associated with graphical presentation files and effect content definition files, respectively.

[Game Flow]

Figure 9:
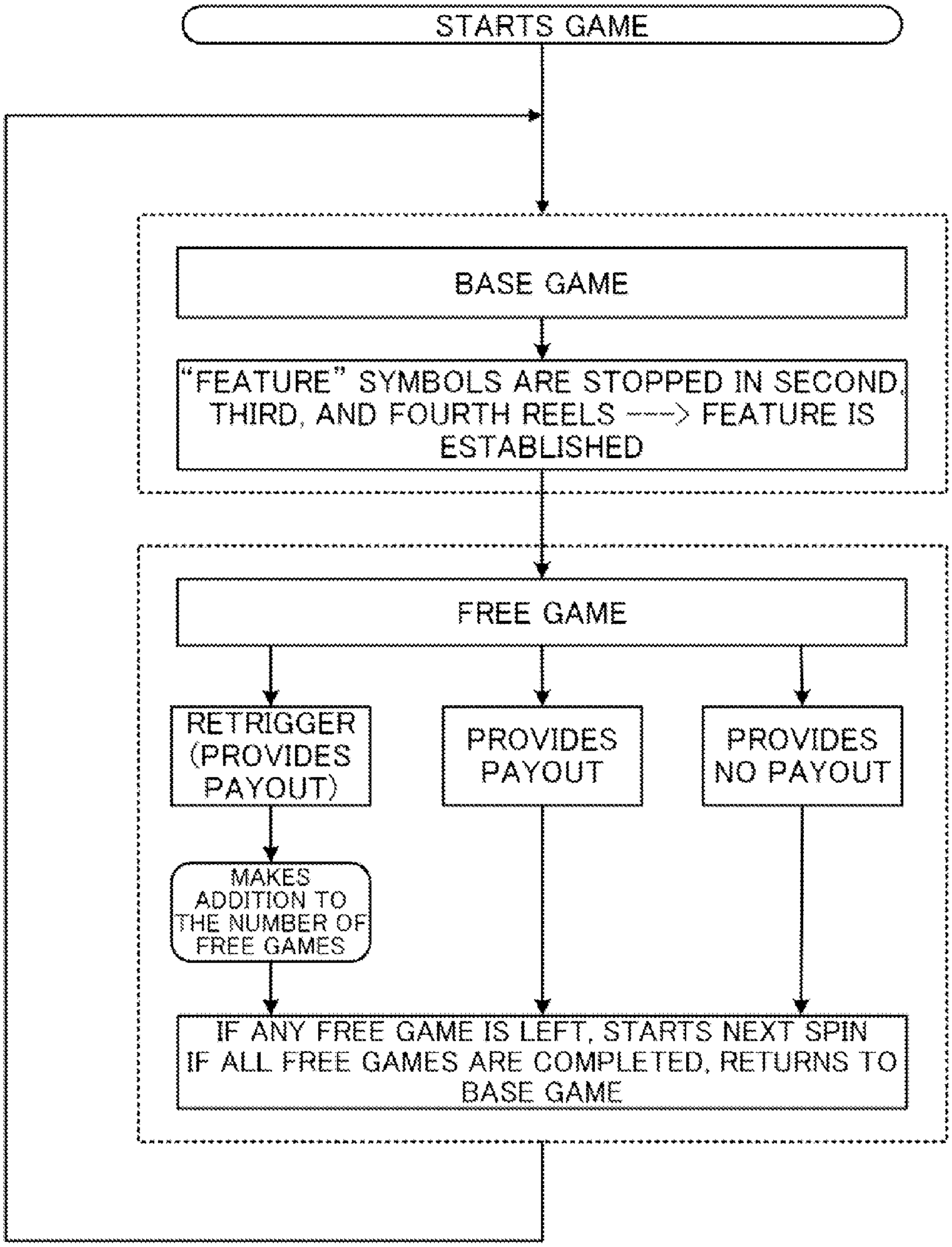
FIG. 9 is a diagram illustrating shifting between the base game and the free game in the gaming machine.

Next, with reference to FIG. 9, a flow of a game run by the gaming machine according to the embodiment of the present invention is described. First, the player inserts a coin, presses the BET button, and then presses the spin button to start a game. Thus, the base game is started. In the base game, in accordance with the player's pressing the spin button, symbols are determined and scrolling of the symbol arrays is stopped so as to display the determined symbols to the player.

In the base game, the symbol arrays for the base game are set for the respective video reels 3. For example, images of five types of "dragon" symbols corresponding to the "GOLD" symbol, the "RED" symbol, the "BLUE" symbol, the "GREEN" symbol, and the "WHITE" symbol, are displayed. In addition, images corresponding to the "ACE" symbol, the "KING" symbol, the "QUEEN" symbol, the "JACK" symbol, the "TEN" symbol, the "NINE" symbol, and the "FEATURE" symbol, are displayed.

If the "FEATURE" symbols are stopped on the second, third, and fourth reels, a feature is established so that the free game is started. In the free game, the symbol arrays for the free game are employed. In the present embodiment, the symbol arrays for the free game are set so as not to display an image of any "dragon" symbol except the "gold dragon" which corresponds to the "GOLD" symbol. Additionally, the number of symbols included in the symbol array of each reel is reduced as compared with the base game.

In the free game, the player is allowed to play a free game eight times without newly inserting any coin (without using any credit). In the free game as well as the base game, a payout is determined based on the winning lines and the symbols that have been stopped, and the number of payouts for a winning combination is calculated based on the determined payout and the number of BETs.

If, during the free game, the "FEATURE" symbols are further stopped on the second, third, and fourth reels, the number of free games are increased by eight (retrigger). When the number of remaining free games reaches zero, the free game ends and the processing is returned to the base game.

[Contents of Program]

Next, with reference to FIGS. 10 to 18, the program to be executed by the gaming machine 1 is described.

<Main Control Processing>

Figure 10:
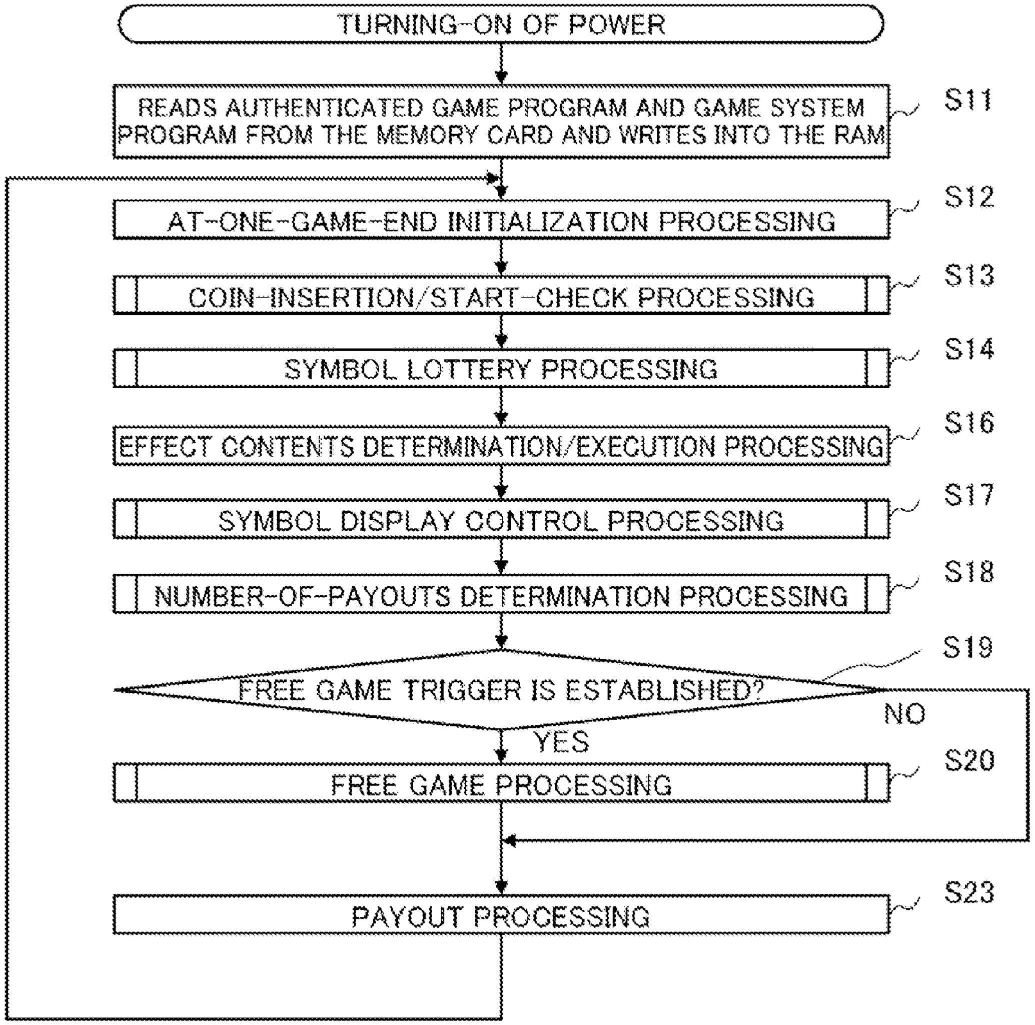
FIG. 10 shows a flowchart of main control processing for the gaming machine.

First, with reference to FIG. 10, main control processing is described. FIG. 10 shows a flowchart of the main control processing for the gaming machine according to the embodiment of the present invention.

First, upon supply of power to the gaming machine 1, the main CPU 71 reads the authenticated game program and game system program from the memory card 54 through the gaming board 50, and writes the programs into the RAM 73 (step S11).

Next, the main CPU 71 conducts at-one-game-end initialization processing (step S12). For example, data that becomes unnecessary after each game in the working areas of the RAM 73, such as the number of BETs and the symbols determined by lottery, is cleared.

The main CPU 71 conducts coin-insertion/start-check processing which is described later with reference to FIG. 11 (step S13). In the processing, input from the BET switch and the spin switch is checked.

The main CPU 71 then conducts symbol lottery processing which is described later with reference to FIG. 13 (step S14). In the processing, to-be stopped symbols are determined based on the random values for symbol determination.

Next, the main CPU 71 conducts effect contents execution processing (step S16). The main CPU 71 extracts a random value for effect, determines any of the effect contents from the preset plurality of effect contents by lottery, and executes the determined effect content. For example, the main CPU 71 selects by lottery one of the plurality of files for producing effect contents that have been prepared in advance, and produces an effect in accordance with the selected file. The main CPU 71 controls production of the effect in the base game which is described later.

The main CPU 71 then conducts symbol display control processing which is described later with reference to FIG. 14 (step S17). In the processing, scrolling of the symbol array of each video reel 3 is started, and the to-be stopped symbol determined in the symbol lottery processing of step S14 is stopped at a predetermined position (e.g. the upper region in the symbol display region 4). That is, four symbols including the to-be stopped symbol are displayed in the symbol display region 4. For example, when the to-be stopped symbol is the symbol associated with the code number "10" and it is to be displayed in the upper region, the symbols associated with the respective code numbers "11", "12" and "13" are to be displayed in the respective upper central region, lower central region and lower region in the symbol display region 4.

Next, the main CPU 71 conducts number-of-payouts determination processing which is described later with reference to FIG. 15 (step S18). In the processing, the number of payouts is determined based on the number and the combination of symbols displayed along the winning line, and is stored into a number-of-payouts storage area provided in the RAM 73. Here, number-of-payouts determination processing for free game processing is separately executed during the free game processing which is described later with reference to FIG. 16.

The main CPU 71 then determines whether or not the free game trigger has been established (step S19). If the main CPU 71 determines that the free game trigger has been established (for example, when the "FEATURE" symbols are stopped on the second, third, and fourth reels), the main CPU 71 conducts free game processing which is described later with reference to FIG. 16 (step S20).

The main CPU 71 conducts payout processing (step S23). The main CPU 71 adds the value stored in the number-of-payouts storage area to a value stored in a number-of-credits storage area provided in the RAM 73. It is to be noted that operations of the hopper 113 may be controlled based on input from the CASHOUT switch 33S, and coins of the number corresponding to the value stored in the number-of-payouts storage area may be discharged from the coin payout exit 15A. Further, operations of the ticket printer 171 may be controlled and a ticket with a barcode may be issued on which a value stored in the number-of-payouts storage area is recorded. After this processing, the processing is shifted to step S12.

<Coin-Insertion/Start-Check Processing>

Figure 11:
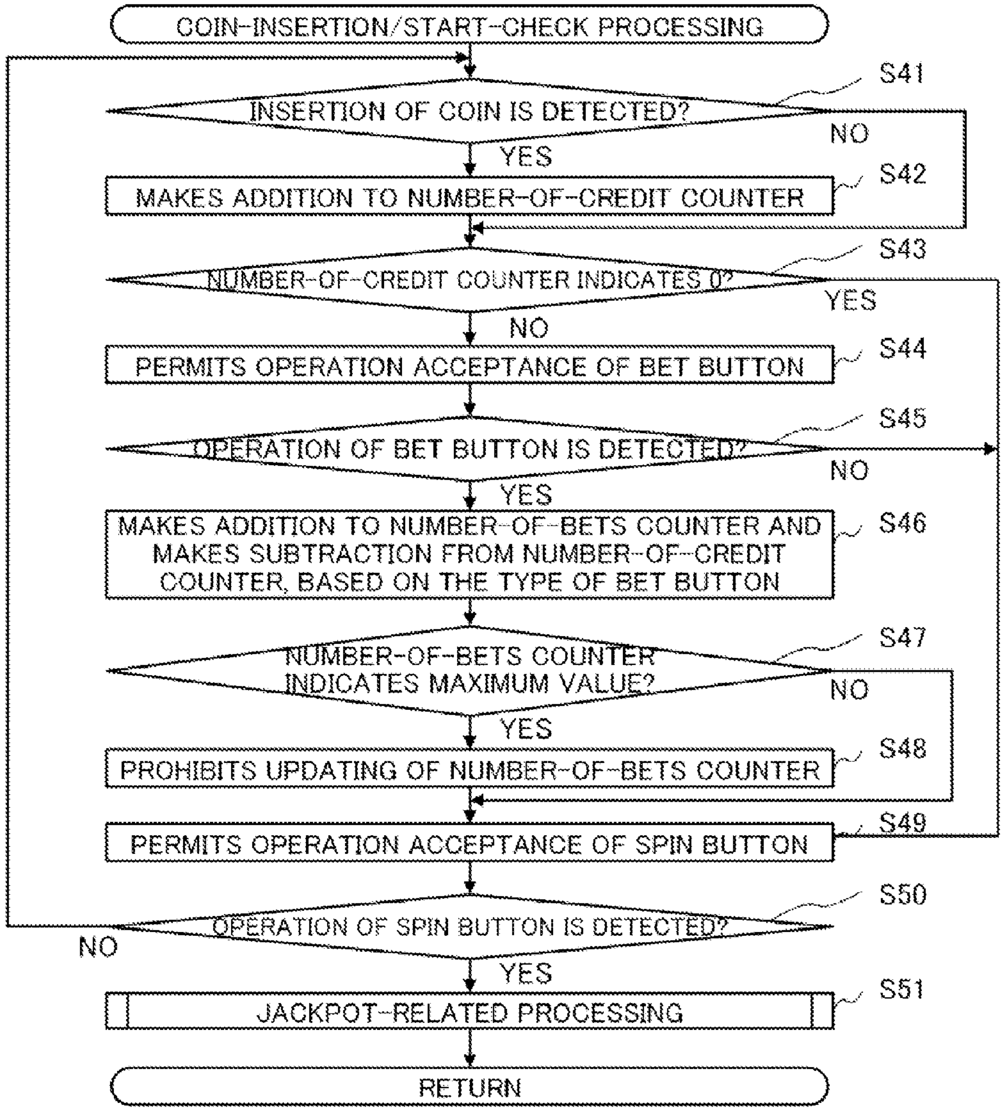
FIG. 11 shows a flowchart of coin-insertion/start-check processing for the gaming machine.

Next, with reference to FIG. 11, coin-insertion/start-check processing is described. FIG. 11 shows a flowchart of the coin-insertion/start-check processing for the gaming machine according to the embodiment of the present invention.

First, the main CPU 71 determines whether or not insertion of a coin has been detected by the coin counter 92C (step S41). Upon determining that the insertion of a coin has been detected by the coin counter 92C, the main CPU 71 makes an addition to the value (number-of-credit counter) stored in the number-of-credits storage area (step S42). It is to be noted that, in addition to the insertion of a coin, the main CPU 71 may determine whether or not insertion of a bill has been detected by the bill validator 115, and upon determining that the insertion of a bill has been detected, the main CPU 71 may add a value according to the bill to the value stored in the number-of-credits storage area.

After step S42 or upon determining in step S41 that the insertion of a coin has not been detected, the main CPU 71 determines whether or not the value stored in the number-of-credits storage area is zero (step S43). If the main CPU 71 determines that the value stored in the number-of-credits storage area is not zero, the main CPU 71 permits operation acceptance of the BET buttons (step S44).

Next, the main CPU 71 determines whether or not operation of any of the BET buttons has been detected (step S45). If the main CPU 71 determines that the BET switch has detected press of the BET button by the player, the main CPU 71 makes an addition to a value stored in a number-of-BETs storage area provided in the RAM 73 and makes a subtraction from the value stored in the number-of-credits storage area, based on the type of the BET button (step S46).

The main CPU 71 then determines whether or not the value stored in the number-of-BETs storage area is at its maximum (step S47). If the main CPU 71 determines that the value stored in the number-of-BETs storage area is at its maximum, the main CPU 71 prohibits updating of the value stored in the number-of-BETs storage area (step S48). After step S48 or upon determining in step S47 that the value stored in the number-of-BETs storage area is not at its maximum, the main CPU 71 permits operation acceptance of the spin button (step S49).

After step S49 or upon determining in step S45 that the operation of any of the BET buttons has not been detected, or upon determining in step S43 that the value stored in the number-of-credits storage area is zero, the main CPU 71 determines whether or not operation of the spin button has been detected (step S50). If the main CPU 71 determines that the operation of the spin button has not been detected, the processing is shifted to step S41.

If the main CPU 71 determines that the operation of the spin button has been detected, the main CPU 71 conducts jackpot-related processing which is described later with reference to FIG. 12 (step S51). In the processing, the amount (accumulation amount) to be accumulated into the amount of jackpot is calculated, and a result of adding of the accumulation amount into the amount of jackpot is stored in an amount-of-jackpot storage area. After this processing, the coin-insertion/start-check processing is completed.

<Jackpot-Related Processing>

Figure 12:
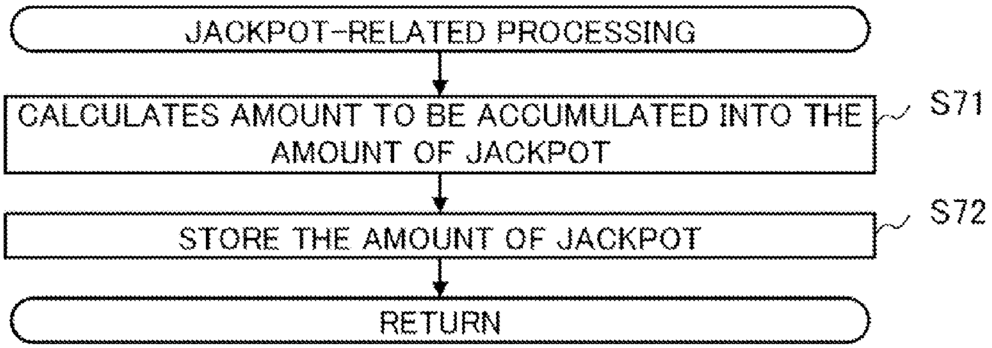
FIG. 12 shows a flowchart of jackpot-related processing for the gaming machine.

Now, with reference to FIG. 12, the jackpot-related processing is described. FIG. 12 shows a flowchart of the jackpot-related processing for the gaming machine according to the embodiment of the present invention.

First, the main CPU 71 calculates the amount to be accumulated into the amount of jackpot (step S71). The main CPU 71 obtains the product of the value stored in the number-of-BETs storage area and a preset accumulation ratio, so that the amount to be accumulated into the amount of jackpot is calculated.

Next, by the main CPU 71, the calculated amount to be accumulated into the amount of jackpot is added to the amount of jackpot, and stores a resultant to the amount-of-jackpot storage area (step S72). After this processing, the jackpot-related processing is completed. In a case where the jackpot is a networked jackpot, the amount to be accumulated into the amount of jackpot is transmitted to the external control device 200 and, upon reception of the amount to be accumulated into the amount of jackpot, the external control device 200 updates the amount of jackpot.

<Symbol Lottery Processing>

Figure 13:
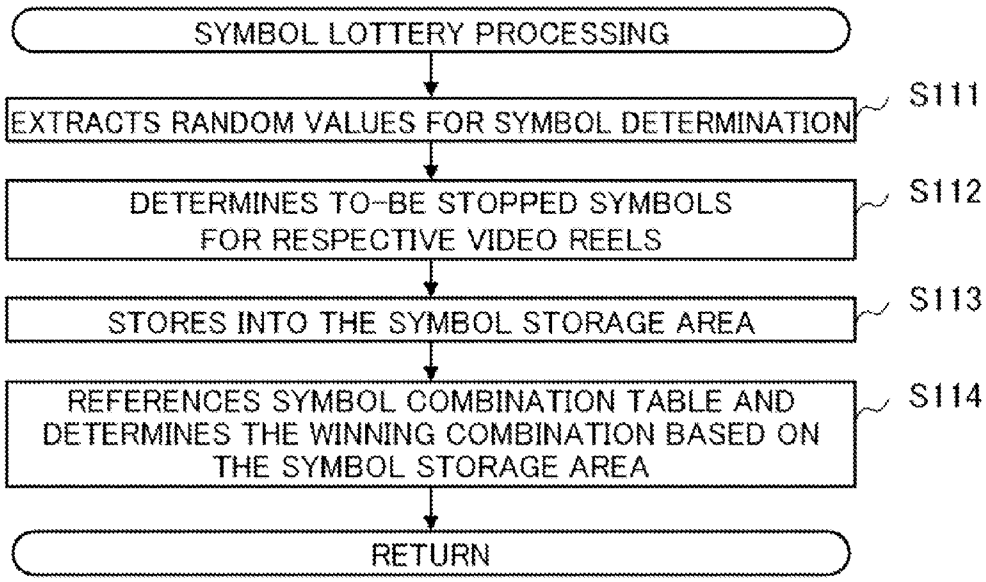
FIG. 13 shows a flowchart of symbol lottery processing for the gaming machine.

Next, with reference to FIG. 13, the symbol lottery processing is described. FIG. 13 shows a flowchart of the symbol lottery processing for the gaming machine according to the embodiment of the present invention.

First, the main CPU 71 extracts random values for symbol determination (step S111). The main CPU 71 then determines to-be stopped symbols for the respective video reels 3 by lottery (step S112). The main CPU 71 holds a lottery for each video reel 3, and determines any one of the plurality of symbols as a to-be stopped symbol. At this time, in the first reel for example, each of the 82 symbols (code numbers 0 to 81) is determined at an equal probability (i.e. 1/82).

The main CPU 71 then stores the determined to-be stopped symbols for the respective video reels 3 into a symbol storage area provided in the RAM 73 (step S113). Next, the main CPU 71 refers to the winning line definition table and the payout table, and determines a payout (winning combination) based on the symbol storage area (step S114). The main CPU 71 determines the payout (winning combination) based on the number of symbols displayed along the winning line by the respective video reels 3. After this processing, the symbol lottery processing is completed.

<Symbol Display Control Processing>

Figure 14:
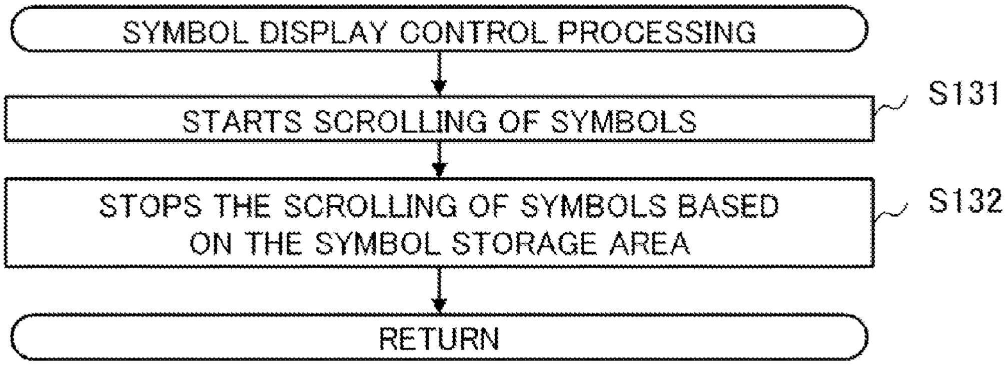
FIG. 14 shows a flowchart of symbol display control processing for the gaming machine.

Next, with reference to FIG. 14, the symbol display control processing is described. FIG. 14 shows a flowchart of the symbol display control processing for the gaming machine according to the embodiment of the present invention.

First, the main CPU 71 starts scrolling of the symbol arrays of the respective video reels 3 that are displayed in the symbol display region 4 of the lower image display panel 141 (step S131). The main CPU 71 then stops the scrolling of the symbol arrays of the respective video reels 3, based on the aforementioned symbol storage area (step S132). After this processing, the symbol display control processing is completed.

<Number-of-Payouts Determination Processing>

Figure 15:
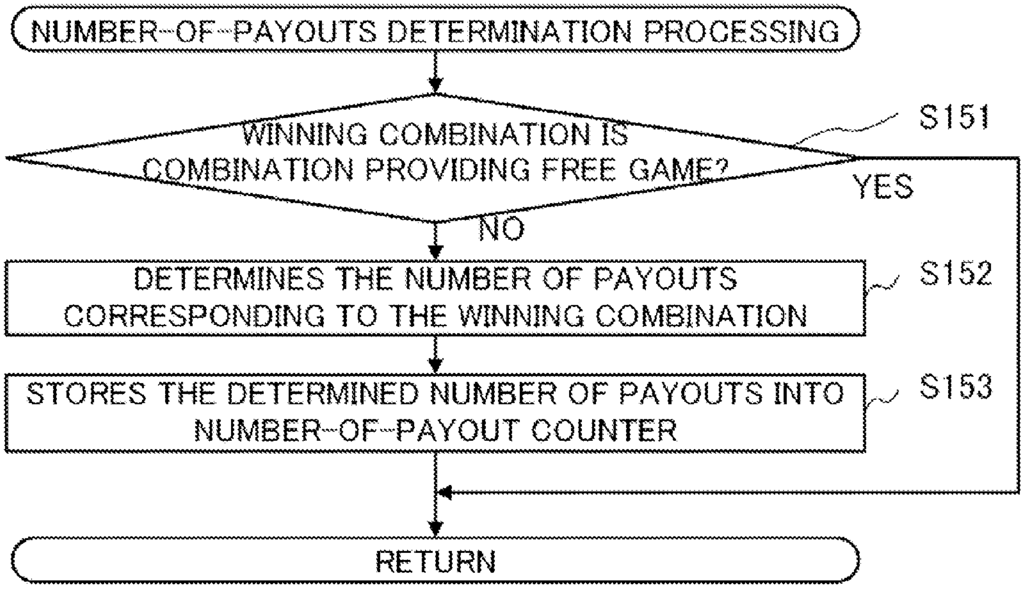
FIG. 15 shows a flowchart of number-of-payouts determination processing for the gaming machine.

Next, with reference to FIG. 15, the number-of-payouts determination processing is described. FIG. 15 shows a flowchart of the number-of-payouts determination processing for the gaming machine according to the embodiment of the present invention.

The main CPU 71 first determines whether or not the winning combination is a combination that provides a free game (step S151). If the main CPU 71 determines that the winning combination is not a combination that provides a free game, the main CPU 71 determines the number of payouts corresponding to the winning combination (step S152). For example, when a predetermined number of predetermined symbols (as defined in the payout table) are displayed along the winning line, the main CPU 71 determines a corresponding payout defined in the payout table, and determines the number of payouts based on the payout and the number of BETs. It is to be noted that the main CPU 71 determines "0" as the number of payouts in the case where the game is lost. Next, the main CPU 71 stores the determined number of payouts into the number-of-payouts storage area (step S153). After this processing, the number-of-payouts determination processing is completed.

<Free Game Processing>

Figure 16:
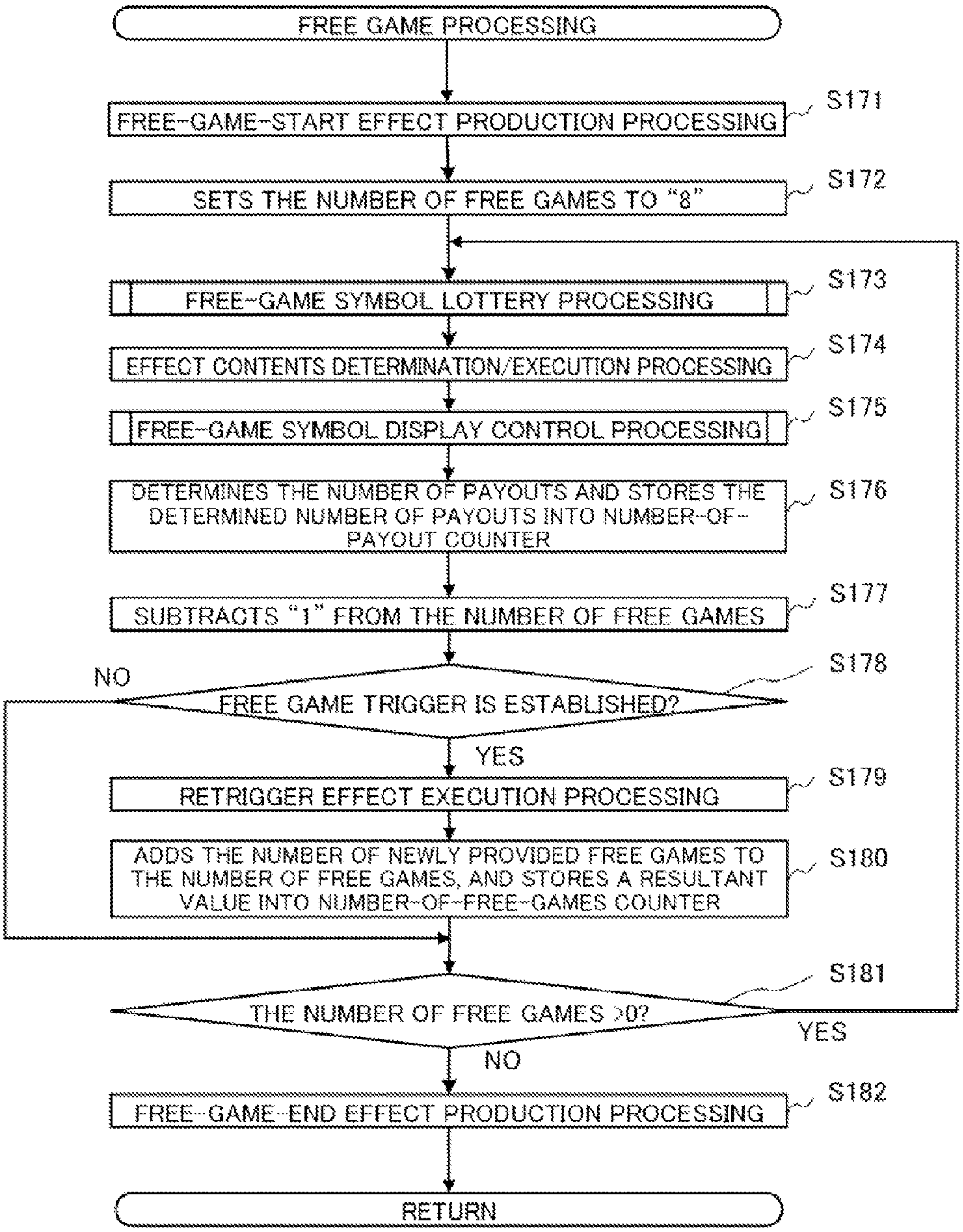
FIG. 16 shows a flowchart of free game processing for the gaming machine.
Figure 17:
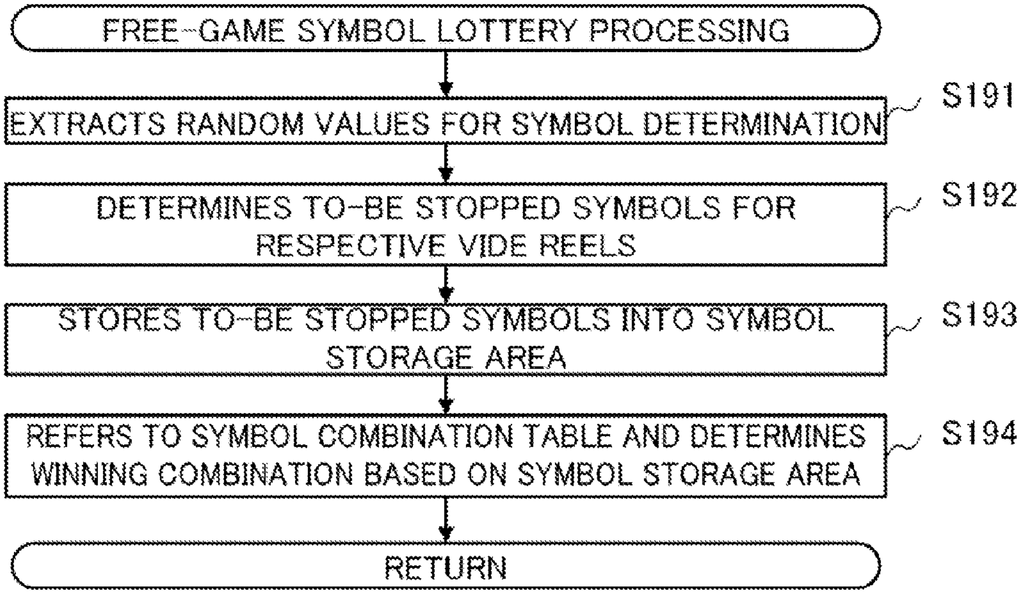
FIG. 17 shows a flowchart of free-game symbol lottery processing for the gaming machine.
Figure 18:
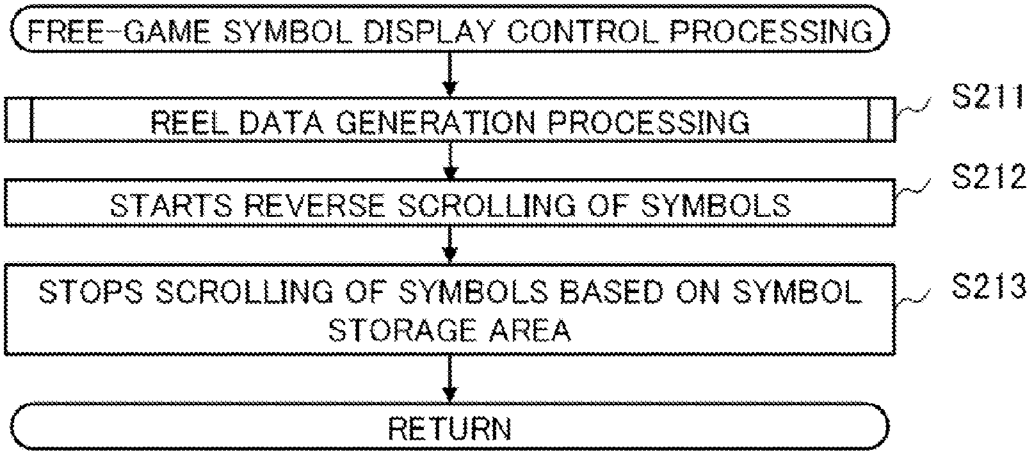
FIG. 18 shows a flowchart of free-game symbol display control processing for the gaming machine.

Next, with reference to FIGS. 16 to 18, the free game processing is described. FIG. 16 shows a flowchart of the free game processing for the gaming machine according to the embodiment of the present invention.

The main CPU 71 conducts free-game-start effect production processing (step S171). In the processing, for example, in a case of starting the free game as a result of establishment of the free game trigger in the base game, a sound effect (SE) associated with start of the free game is outputted from the speaker 112, and a notification that the free game has been started is displayed on the lower image display panel 141, and then contents displayed on the upper image display panel 131 and the lower image display panel 141 are changed so that a free game introduction effect is displayed on the lower image display panel 141. The effect produced at a time of starting the free game is described in detail later.

The main CPU 71 then sets the number of free games to eight, and stores it into a number-of-free-games storage area provided in the RAM 73 (step S172). This setting is for making the free game playable eight times. Each time the free game is played, the number of free games is subtracted by one in step S177.

The main CPU 71 then conducts free-game symbol lottery processing which is described later with reference to FIG. 17 (step S173). In the processing, to-be stopped symbols are determined based on the random values for free-game symbol determination.

The main CPU 71 then conducts effect contents execution processing (step S174). The main CPU 71 determines an effect content definition file depending on the state of progress of the free game, and produces an effect in accordance with the effect content definition file thus determined. The main CPU 71 also controls production of the effect in the free game which is described later.

The main CPU 71 then conducts free-game symbol display control processing which is described later with reference to FIG. 18 (step S175). In the processing, reverse scrolling of the symbol array of each video reel 3 is started, and the to-be stopped symbol determined in the symbol lottery processing of step S172 is stopped at a predetermined position (e.g. the upper region in the symbol display region 4). That is, four symbols including the to-be stopped symbol are displayed in the symbol display region 4. For example, when the to-be stopped symbol is the symbol associated with the code number "10" and it is to be displayed in the upper region, the symbols associated with the respective code numbers "11", "12" and "13" are to be displayed in the respective upper central region, lower central region and lower region in the symbol display region 4.

The main CPU 71 then conducts number-of-payouts determination processing for the free game (step S176). In the processing, a payout corresponding to the number of symbols displayed along each of the winning lines that are defined in the winning line definition table shown in FIG. 7B is determined based on the payout table shown in FIG. 8A. Based on this payout and the number of BETs, the number of payouts is determined, and the number of payouts thus determined is stored into the number-of-payouts storage area provided in the RAM 73.

The main CPU 71 then subtracts one from the number of free games, and stores a resultant into the number-of-free-games storage area provided in the RAM 73 (step S177). The main CPU 71 then determines whether or not the free game trigger has been established during the free game (step S178). If the main CPU 71 determines that the free game trigger is established (for example, if the "FEATURE" symbols are stopped on the second, third, and fourth reels), the main CPU 71 conducts retrigger effect production processing (step S179). If the free game trigger is established, the retrigger effect production processing is conducted in which, for example, a sound effect (SE) associated with retrigger is outputted from the speaker 112 and a notification that the retrigger has been established is displayed on the lower image display panel 141. The retrigger effect production processing is described in detail later.

The main CPU 71 then adds the number of free games (e.g., eight times) newly provided as a result of the establishment of the free game trigger, to the number of free games stored in the number-of-free-games storage area provided in the RAM 73 (step S180).

The main CPU 71 then determines whether or not the number of free games stored in the number-of-free-games storage area provided in the RAM 73 is larger than zero (step S181). If the main CPU 71 determines that it is larger than zero, the processing is shifted to step S173 and a new free game is started. On the other hand, if the number of free games is zero or less, the free game is terminated and the main CPU 71 conducts free-game-end effect production processing (step S182). If the main CPU 71 determines that the free game is to be terminated, the free-game-end effect production processing is conducted in which, for example, a sound effect (SE) associated with end of the free game is outputted from the speaker 112 and a notification that the free game has been terminated is displayed on the lower image display panel 141. The free-game-end effect production processing is described in detail later. After this processing, the free game processing is completed.

<Free-Game Symbol Lottery Processing>

Next, with reference to FIG. 17, the free-game symbol lottery processing is described. FIG. 17 shows a flowchart of the free-game symbol lottery processing for the gaming machine according to the embodiment of the present invention.

The main CPU 71 first extracts random values for free-game symbol determination (step S191). The main CPU 71 then determines to-be stopped symbols for the respective video reels 3 by lottery (step S192). The main CPU 71 holds a lottery for each video reel 3, and determines any one of the plurality of symbols as a to-be stopped symbol. At this time, in the first reel for example, each of the eighty-two symbols (code numbers 0 to 81) is selected at an equal probability (i.e. 1/82).

The main CPU 71 then stores the determined to-be stopped symbols for the respective video reels 3 into a free-game symbol storage area (step S193). The main CPU 71 then refers to the winning line definition table shown in FIG. 7B and the payout table shown in FIG. 8A, and determines a payout (winning combination) based on the free-game symbol storage area (step S194).

The main CPU 71 determines the payout (winning combination) based on the number of symbols displayed along the winning line on the respective video reels 3. After this processing, the free-game symbol lottery processing is completed.

<Free-Game Symbol Display Control Processing>

Next, with reference to FIG. 18, the free-game symbol display control processing is described. FIG. 18 shows a flowchart of the free-game symbol display control processing for the gaming machine according to the embodiment of the present invention.

The main CPU 71 first generates reel data based on the to-be stopped symbols for the respective video reels 3 that have been determined in step S192. The reel data is data for displaying rotation and stop of each of the video reels 3. The reel data is generated in, for example, the video RAM and the RAM 73. The main CPU 71, as appropriate, calculates the speed of movement in scrolling (rotation) of the symbols (step S211). These processing is described in detail later.

The main CPU 71 then starts reverse scrolling of the symbol array of each video reel 3 displayed in the symbol display region 4 of the lower image display panel 141, based on the generated reel data (step S212). The main CPU 71 then stops the reverse scrolling of the symbol array of each video reel 3 based on the generated reel data (step S213). After this processing, the free-game symbol display control processing is completed.

<Effect Production Processing at Introduction of Free Game Start>

Next, with reference to FIGS. 19A to 21B, the effect production processing at a time of start of the free game is described. FIGS. 19A to 21B show display contents on the upper image display panel 131 and the lower image display panel 141 for the gaming machine according to the embodiment of the present invention. A screen displayed on the upper image display panel 131 corresponds to a second screen 402, in which a game title, a catch phrase, a WIN signboard for the free game, and the like, are displayed. A screen displayed on the lower image display panel 141 corresponds to a first screen 401, in which not only the symbol display region 4 for displaying the respective video reels 3 but also various notifications and effects are displayed.

Figure 19A:
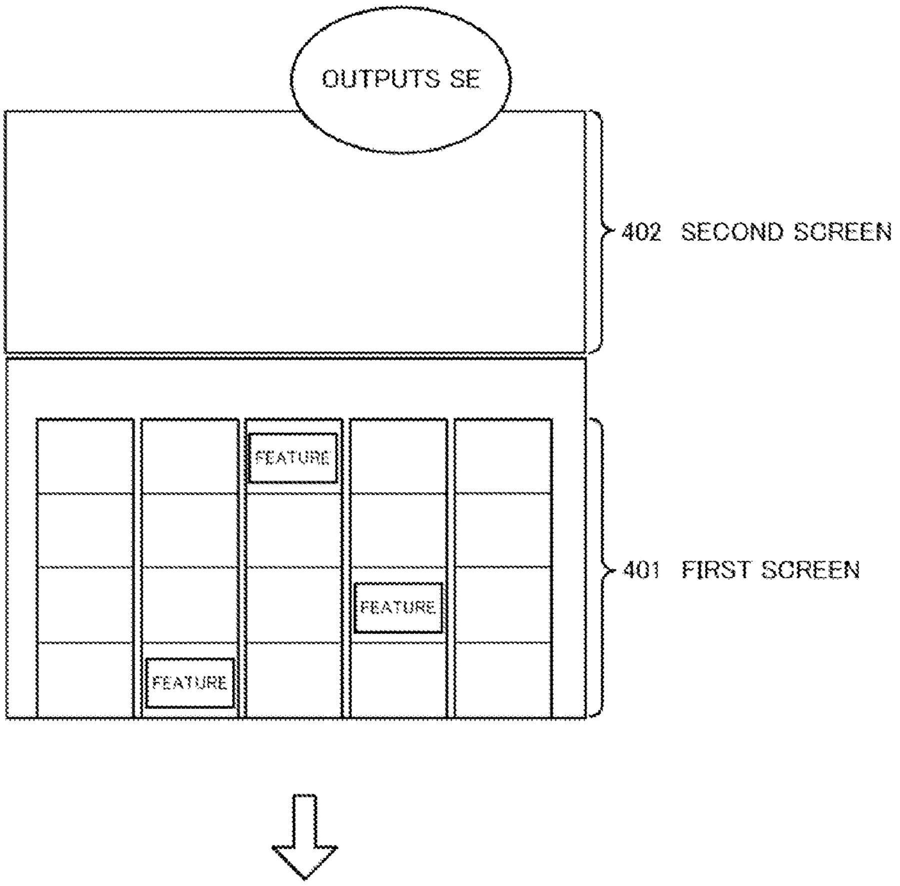
FIGS. 19A and 19B are diagrams for explanation of effect production processing conducted at start of the free game.

FIG. 19A shows a situation where, in the base game, the "FEATURE" symbols are displayed on the second, third, and fourth reels so that the free game trigger is established. In this situation, a sound effect (SE) is outputted from the speaker 112, and the display is shifted to a display shown in FIG. 19B.

Figure 19B:
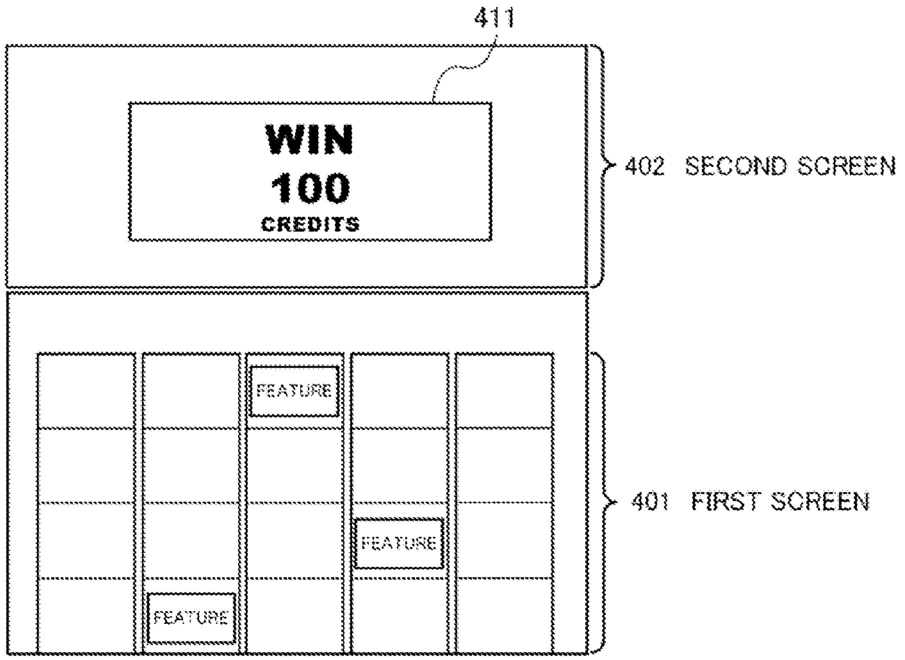

FIG. 19B shows a situation where, in a case of establishment of the free game trigger in the base game, a WIN signboard 411 is displayed in the second screen 402 to announce addition of a credit. In a case where three "FEATURE" symbols are displayed, a payout is "2" as shown in the payout table of FIG. 8A. The payout is multiplied by 1 and 50, which are the number of BETs and the number of winning lines, respectively. As a result, "100" is displayed as an obtained credit (scatter WIN). The WIN signboard 411 can be configured to make incremental display in which the obtained credit increases one by one from "0" to "100". The player may skip the incremental display and shift to the next display by pressing a predetermined button.

Figure 20A:
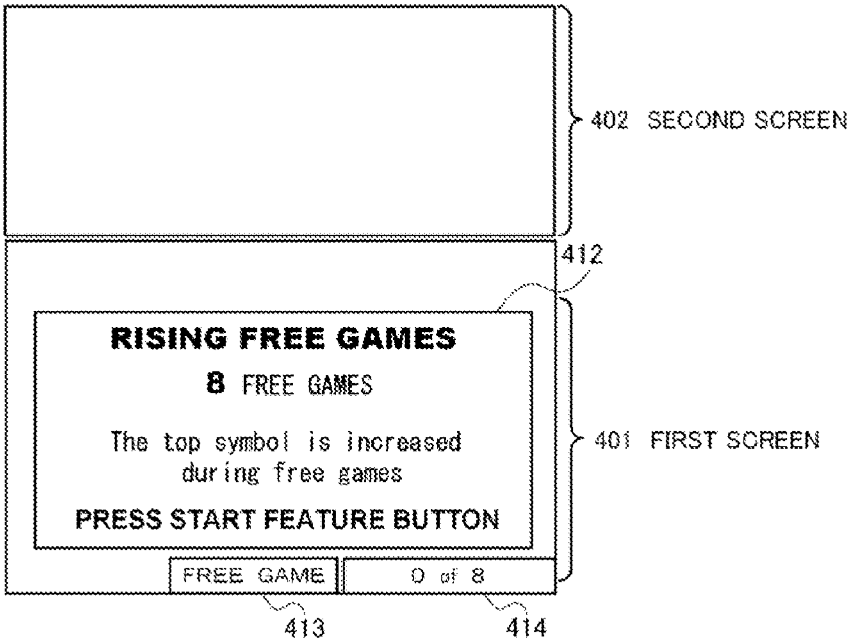
FIGS. 20A and 20B are diagrams for explanation of the effect production processing conducted at start of the free game.

After the incremental display is terminated or skipped in the display shown in FIG. 19B, display shown in FIG. 20A is given. In FIG. 20A, the first screen 401 displays a notification indicator 412 in which an introduction message introducing the free game is displayed. The introduction message announces, for example, that a free game including eight games will be started from now and that an increased number of top symbols are given in the free game. During the free game, a free game indicator 413 is displayed in a lower middle region of the first screen 401 while a number-of-free-games indicator 414 (indicating the current number of free games and the total number of free games) is displayed in a lower right region of the first screen 401.

Figure 20B:
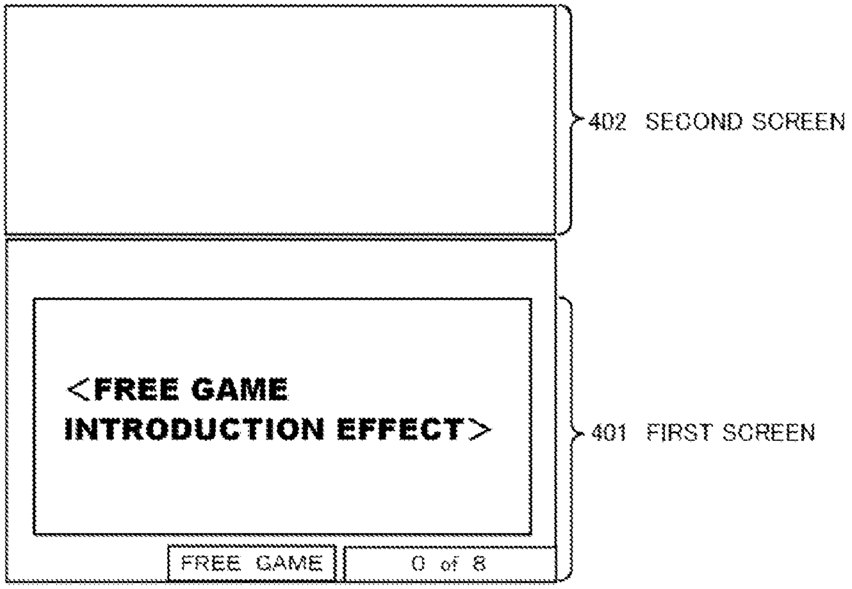

Upon the player's pressing of a feature button that is assigned to a predetermined button, the screen is changed with fade-in and fade-out effects, and shifted to a screen shown in FIG. 20B. In FIG. 20B, a free game introduction effect is produced in the first screen 401. The free game introduction effect causes a still image or a moving image (including an animation image) to be displayed, and can cause a sound effect to be outputted from the speaker 112 in accordance with the display in the first screen 401. For example, an animation showing "gold dragon" moving and entering the corresponding reel may be displayed. Such animation display prevents the player from feeling strange even when "gold dragon" is displayed in the symbol display region 4 from the beginning of a first spin of the free game.

Figure 21A:
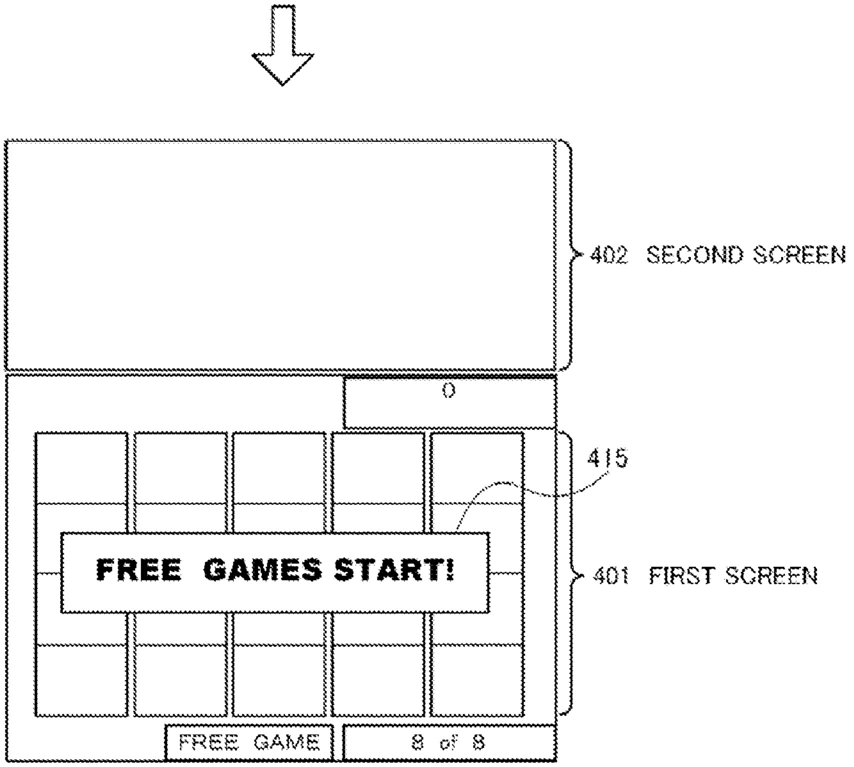
FIGS. 21A and 21B are diagrams for explanation of the effect production processing conducted at start of the free game.

After the free game introduction effect ends, a free game introduction message 415 is displayed as shown in FIG. 21A. The free game introduction message 415 is, for example, a message of "FREE GAMES START!"

Figure 21B:
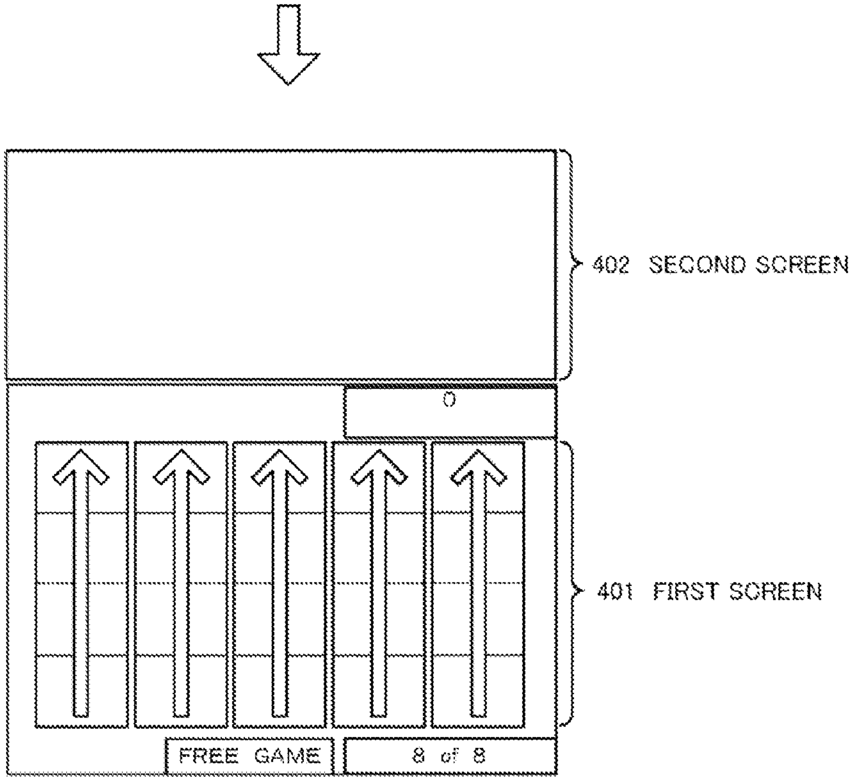

Then, as shown in FIG. 21B, rotation of symbols is displayed in the symbol display region 4 of the first screen 401. The direction of this rotation is reverse to the rotation direction employed in the base game. More specifically, the symbols of each reel are rotated in the direction from the lower side to the upper side of the symbol display region 4. The rotation of each reel causes the symbol (e.g., a picture symbol showing a gold dragon corresponding to the "GOLD" symbol) displayed in the free game to move upward, which produces an effect that makes the player feel as if a gold-colored dragon ascends to heaven (upward). The gold dragon displayed in the "GOLD" symbol is a still image or a moving image. It may be conceivable that display regions displaying a plurality of "GOLD" symbols are coupled so that a single dragon is displayed across a plurality of display regions. It may be also conceivable to, when displaying one continuous "gold dragon" moving from a lower region to an upper region of the symbol display region 4, produce such an effect that the scale of the gold dragon at least partially glows.

<Effect Production Processing at Retrigger During Free Game>

Next, with reference to FIGS. 22A to 23B, establishment of the free game trigger during the free game and display of the retrigger are described. FIGS. 22A to 23B show display contents on the upper image display panel 131 and the lower image display panel 141 for the gaming machine according to the embodiment of the present invention. A screen displayed on the upper image display panel 131 corresponds to the second screen 402, in which a game title, a catch phrase, a WIN signboard for the free game, and the like, are displayed. A screen displayed on the lower image display panel 141 corresponds to the first screen 401, in which not only the symbol display region 4 for displaying the respective video reels 3 but also various notifications and effects are displayed.

Figure 22A:
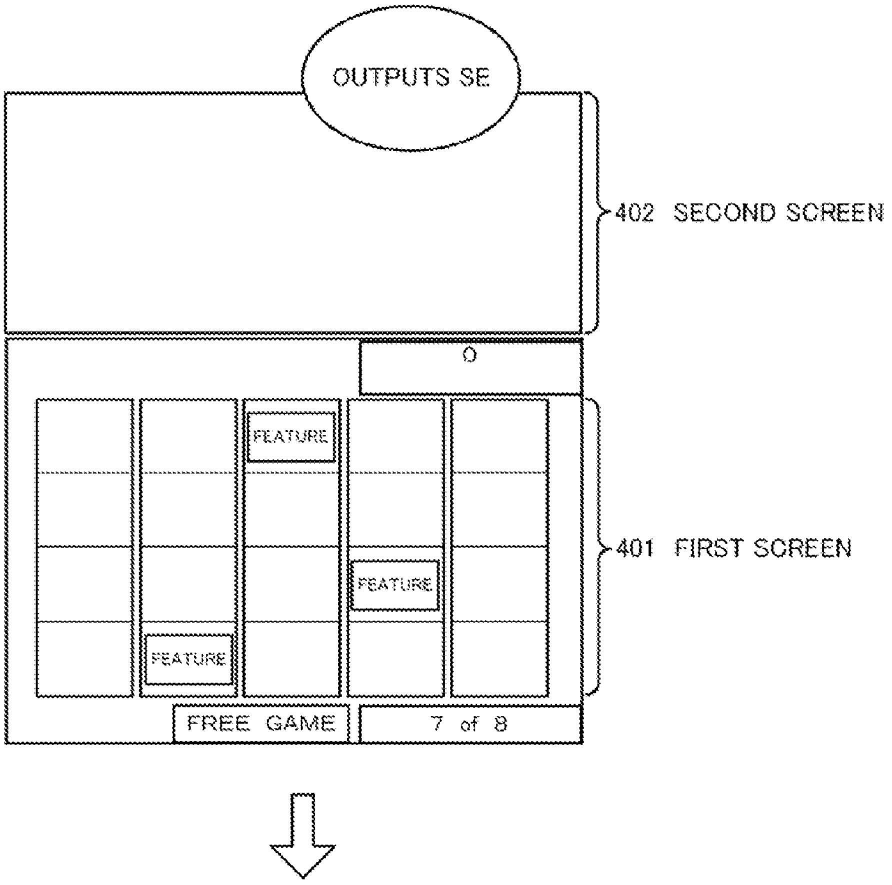
FIGS. 22A and 22B are diagrams for explanation of display of retrigger during the free game.

FIG. 22A shows a situation where, in the free game, the "FEATURE" symbols are displayed on the second, third, and fourth reels so that the retrigger is established. In this situation, a sound effect (SE) is outputted from the speaker 112, and the display is shifted to a display shown in FIG. 22B.

Figure 22B:
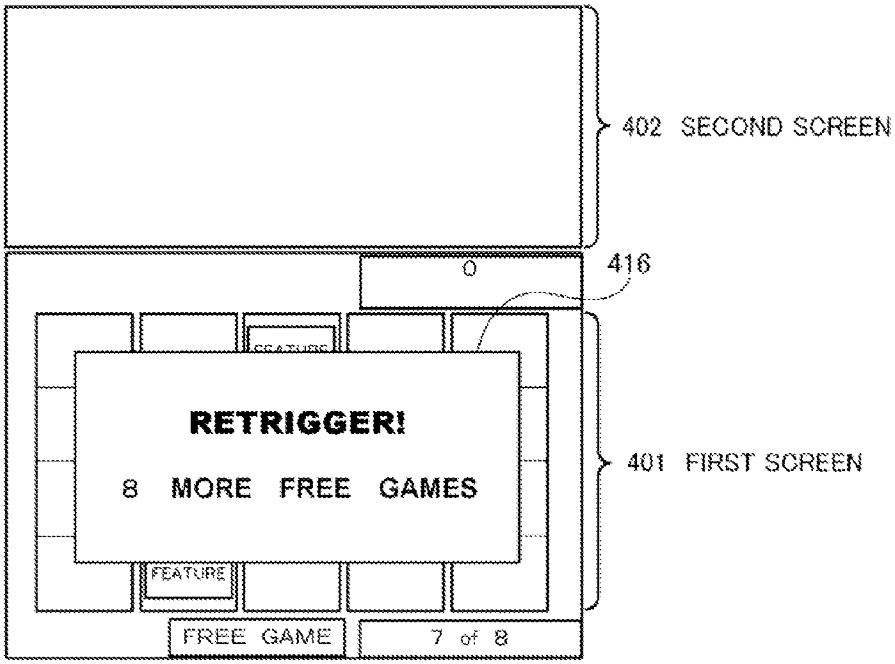

In FIG. 22B, a retrigger message 416 announcing establishment of the retrigger is displayed. The retrigger message 416 is, for example, a message of "RETRIGGER!" A notification that the number of free games is further increased by eight games is also displayed.

Figure 23A:
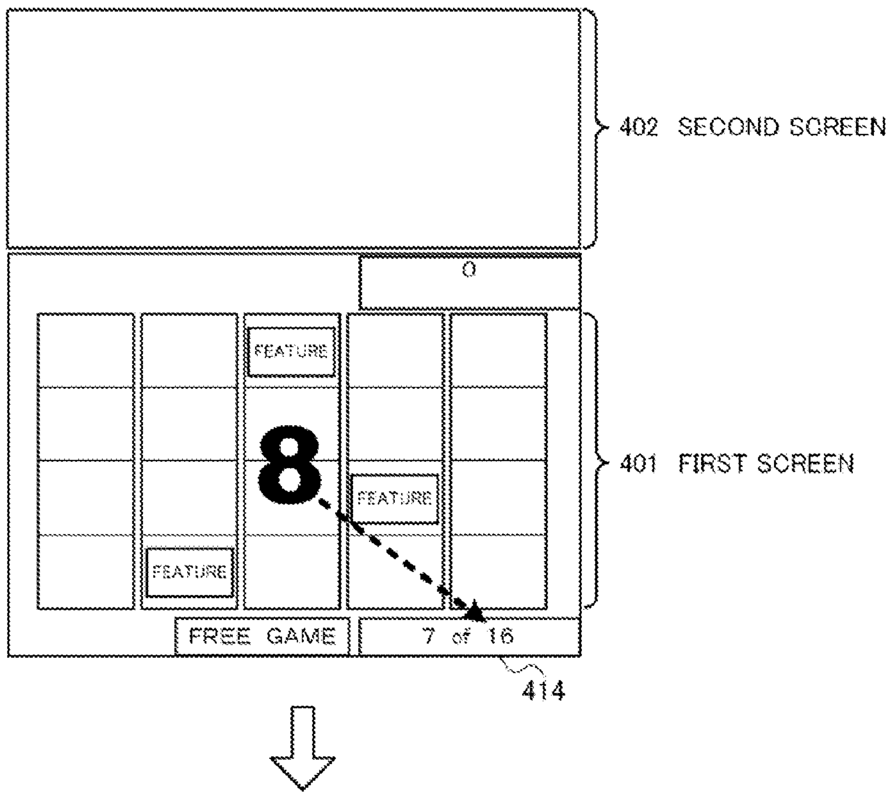
FIGS. 23A and 23B are diagrams for explanation of the display of retrigger during the free game.

Then, the display is shifted to a display shown in FIG. 23A. The figure of "8", which indicates the number of newly provided games, is displayed in the symbol display region 4 of the first screen 401 such that the figure of "8" overlaps symbols of the video reels. The value indicated by this figure is added to the total number of free games indicated by the number-of-free-games indicator 414 that is displayed in the lower right region of the first screen 401. In this example, the display of "7 of 8" is updated into the display of "7 of 16". It may be conceivable to produce such an effect that the figure of "8" displayed in the symbol display region 4 moves toward the number-of-free-games indicator 414 and makes the total number of free games updated.

Figure 23B:
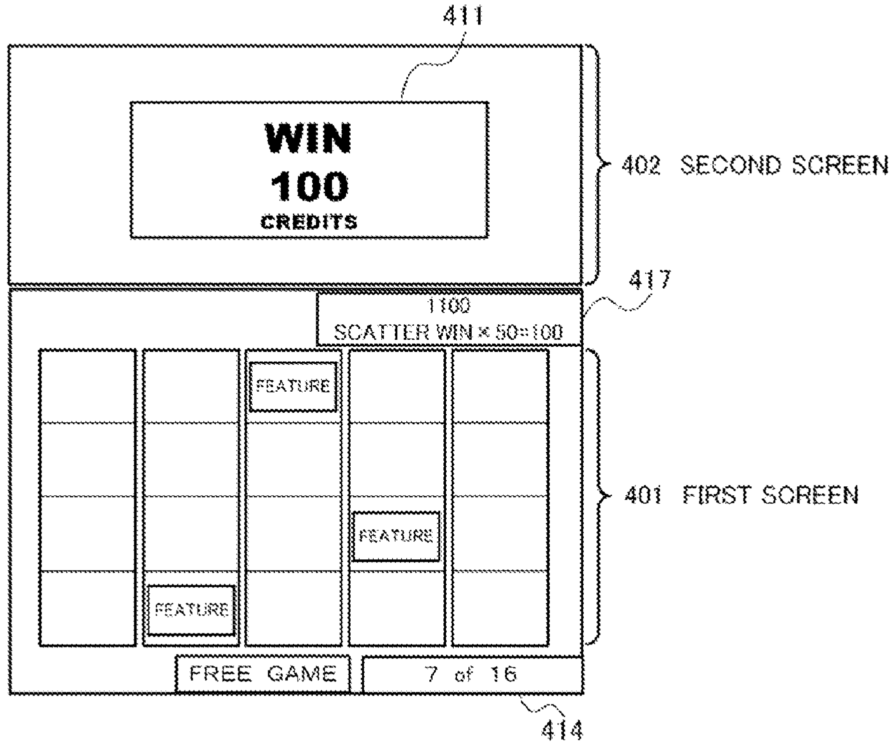

After the total number of free games is increased as shown in FIG. 23A, an effect associated with addition of the credit as a result of the retrigger (scatter WIN) is produced as shown in FIG. 23B. In this example, as shown in the payout table of FIG. 8A, a payout given for the scatter WIN, that is, for three "FEATURE" symbols being displayed, is "2". The payout is multiplied by "1" and "50" which are the number of BETs and the number of winning lines, respectively. As a result, "100" is displayed as an obtained credit. The WIN signboard 411 displayed in the second screen 402 can be configured to make incremental display in which the obtained credit increases one by one from "0" to "100".

Additionally, a WIN meter 417 in the first screen 401 shows, in its first stage, incremental display of a total credit value. This incremental display conforms to the incremental display in the WIN signboard 411. In this example, the incremental display is made such that the total credit value is incremented from "1000", which is the former total credit value, to "1100". The WIN meter 417 also displays, in its second stage, details of the credit obtained in this spin. In a case where there are a plurality of credits, a credit resulting from a scatter payout to a credit resulting from a line payout are sequentially displayed in succession (for example, at time intervals of one second).

<Effect Production Processing at End of Free Game>

Figure 24A:
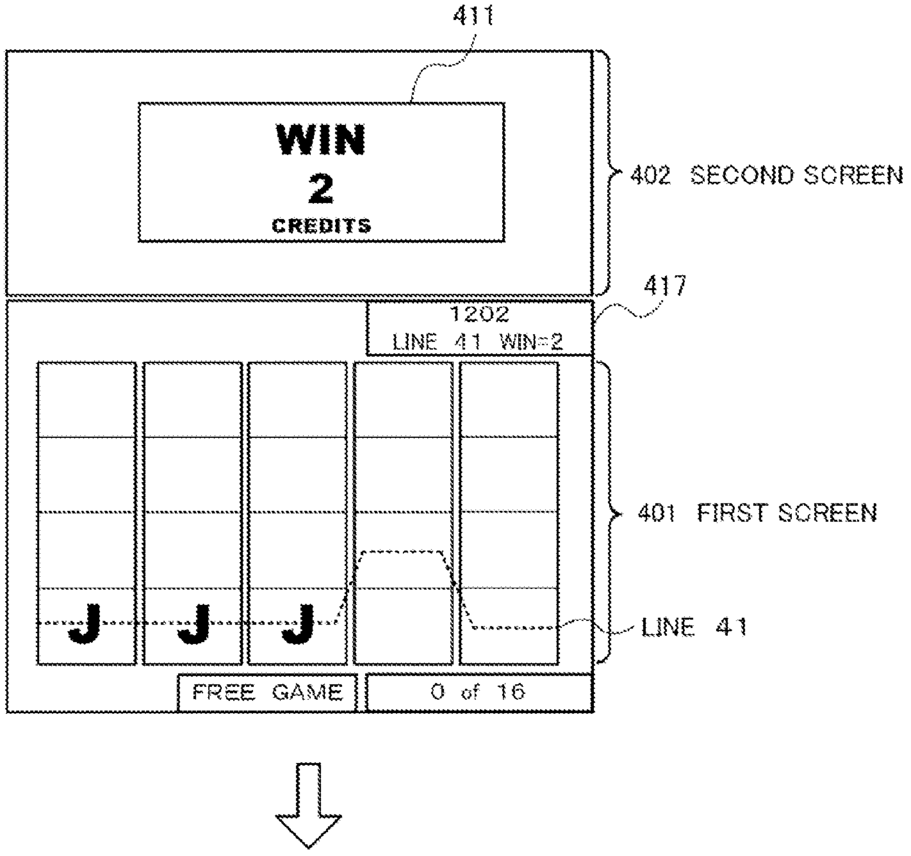
FIGS. 24A and 24B are diagrams for explanation of an effect produced at end of the free game.
Figure 24B:
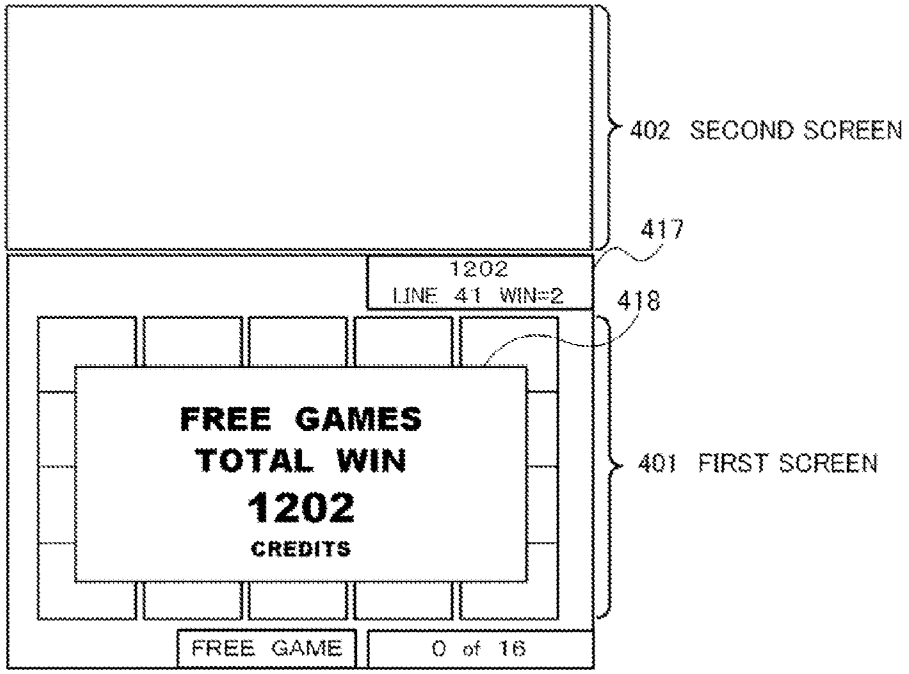
Figure 25:
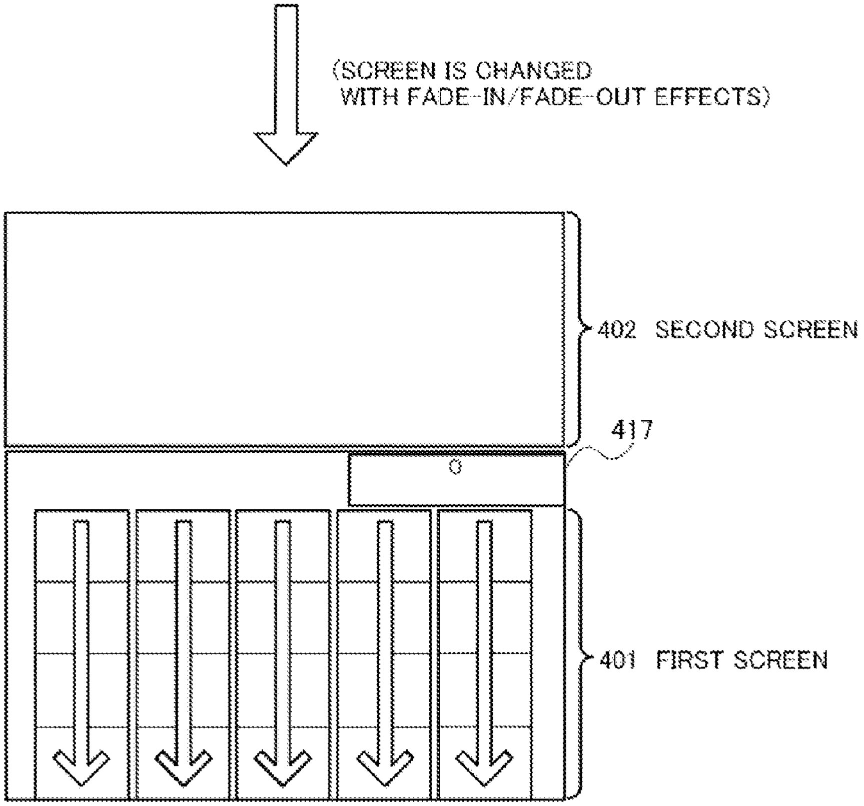
FIG. 25 is a diagram for explanation of the effect produced at end of the free game.

Next, with reference to FIGS. 24A to 25, an effect produced at a time of end of the free game is described. FIGS. 24A to 25 show display contents on the upper image display panel 131 and the lower image display panel 141 for the gaming machine according to the embodiment of the present invention. A screen displayed on the upper image display panel 131 corresponds to the second screen 402, in which a game title, a catch phrase, a WIN signboard for the free game, and the like, are displayed. A screen displayed on the lower image display panel 141 corresponds to the first screen 401, in which not only the symbol display region 4 for displaying the respective video reels 3 but also various notifications and effects are displayed.

FIG. 24A shows a situation where, in the final free game, a line payout (win) occurs so that the WIN signboard 411 in the second screen 402 and the WIN meter 417 in the first screen 401 make displays about the line payout. In this example, the line payout is a payout for three "J" symbols aligned along the winning line 41, and the finally obtained credit value is "2" which equals the payout "2"× the number of BETs "1".

After the display of the WIN signboard 411 shown in FIG. 24A disappears, the first screen 401 displays a free-game total WIN signboard 418 as shown in FIG. 24B. The free-game total WIN signboard 418 displays the sum of credit values obtained in the free game. In a case where the credit value obtained in the free game is zero, the free-game total WIN signboard 418 is not displayed and instead such a control is performed that shifting to a next display is caused after a predetermined time period (e.g., two seconds) has elapsed since the final spin was made.

After the display of the free-game total WIN signboard 418 shown in FIG. 24B is finished, the screen is changed with fade-in and fade-out effects, and shifted to a screen shown in FIG. 25. FIG. 25 shows a situation where the free game ends and the processing is returned to the base game, in which the symbols of the respective video reels displayed in the symbol display region 4 of the first screen 401 are rotated in the direction from the upper side to the lower side of the symbol display region 4.

<Effect Production Processing Upon Winning During Free Game>

Next, with reference to FIGS. 26A to 29B, effects produced in a case where a line payout (win) occurs as a result of a spin during the free game are described. FIGS. 26A to 29B show display contents on the upper image display panel 131 and the lower image display panel 141 for the gaming machine according to the embodiment of the present invention. A screen displayed on the upper image display panel 131 corresponds to the second screen 402, in which a game title, a catch phrase, a WIN signboard for the free game, and the like, are displayed. A screen displayed on the lower image display panel 141 corresponds to the first screen 401, in which not only the symbol display region 4 for displaying the respective video reels 3 but also various notifications and effects are displayed.

Figures 26A, 26B:
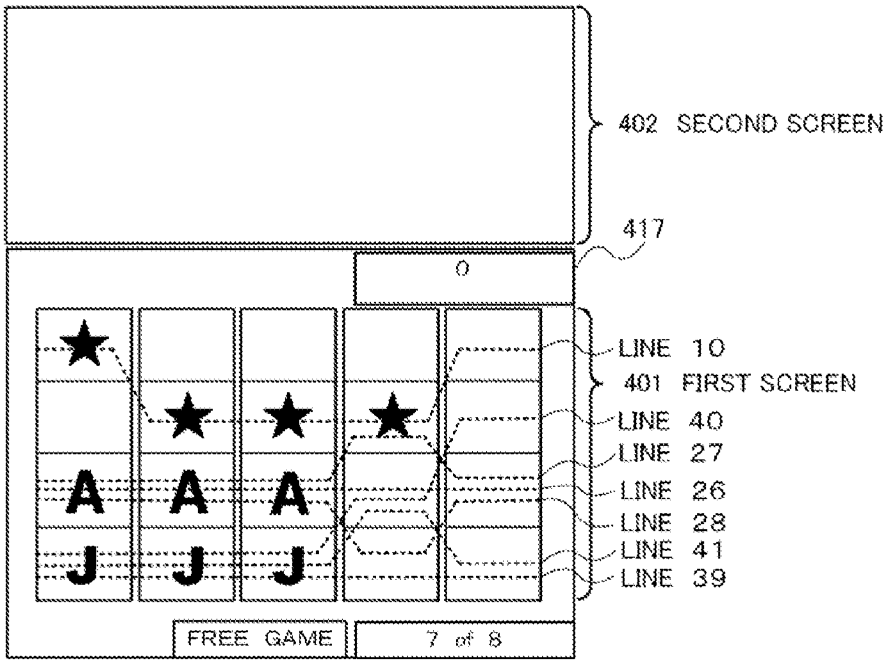
FIGS. 26A and 26B are diagrams for explanation of an effect produced when line payouts occur.

FIG. 26A shows a situation where, in the free game, the respective video reels are rotated and then stopped in the symbol display region 4. Symbols represented by black stars correspond to the "GOLD" symbols shown in the payout table of FIG. 8A. Symbols represented by "A" correspond to the "A" symbols shown in the same payout table. Symbols represented by "J" correspond to the "J" symbols shown in the same payout table. Each of winning lines associated with line payouts of this example is indicated by a dotted line. Here, the dotted lines indicating the winning lines are shown for convenience of illustration of the winning lines, but in actuality, dotted lines or the like indicating the winning lines may be displayed in the symbol display region 4. It may be also acceptable that a frame (any of the first-stage to fourth-stage regions) of each video reel forming a winning line is given a particular effect (for example, displayed with a higher brightness or displayed with blinking).

Also conceivable is such a control that, among the symbols stopped in the symbol display region 4, any symbol that makes a win is displayed with an animation or with blinking irrespective of a winning line for which the effect is to be produced and irrespective of the line No. Moreover, such a symbol can be displayed with both an animation and blinking.

The winning line indicated by "LINE 10", which is a winning line of the pattern 10 (line No. 10) shown in the winning line definition table of FIG. 7B, is a line connecting the first-stage region of the first reel, the second-stage region of the second reel, the second-stage region of the third reel, the second-stage region of the fourth reel, and the first-stage region of the fifth reel. Herein, details of the line are expressed by a set of stage numbers of the first to fifth reels (for example, [0, 1, 1, 1, 0]).

Not only the winning line of the line No. 10 but also a plurality of other winning lines are associated with line payouts. In the case shown in FIG. 26A, there are nineteen winning lines in total. FIG. 26B shows a list of these winning lines. There are thirteen winning lines related to the "GOLD" symbol, three winning lines related to the "A" symbol, and three winning lines related to the "J" symbol. For example, in the pattern 10 (line No. 10), the number of the "GOLD" symbols is four, which provides a line payout of 50 based on the payout table of FIG. 8A. Line payouts are also given in cases where there are three "GOLD" symbols and there are two "GOLD" symbols. Line payouts are given for winning lines of a plurality of patterns (i.e., patterns 12, 13, 34, 4, 5, 6, 9, 11, 14, 15, 16, and 17).

As for the "A" symbol, line payouts are given for the winning lines of the patterns 26, 27, and 28, as shown in FIG. 26B. Any of these winning lines contains three "A" symbols. As for the "J" symbol, line payouts are given for the winning lines of the patterns 39, 40, and 41, as shown in FIG. 26B. Any of these winning lines contains three "J" symbols.

An effect (WIN effect) at a time of winning is started after a predetermined time period has elapsed since the video reels were rotated and then stopped in the symbol display region 4 during the free game, as shown in FIG. 26A. For every winning line providing a line payout, the WIN signboard 411 is displayed in the second screen 402 while the WIN meter 417 in the first screen 401 updates its display. In sequentially displaying these effects, for example, the effect for a scatter WIN, if any, is first produced, and then the effects for line payouts are produced in ascending order of line Nos.

Figure 27A:
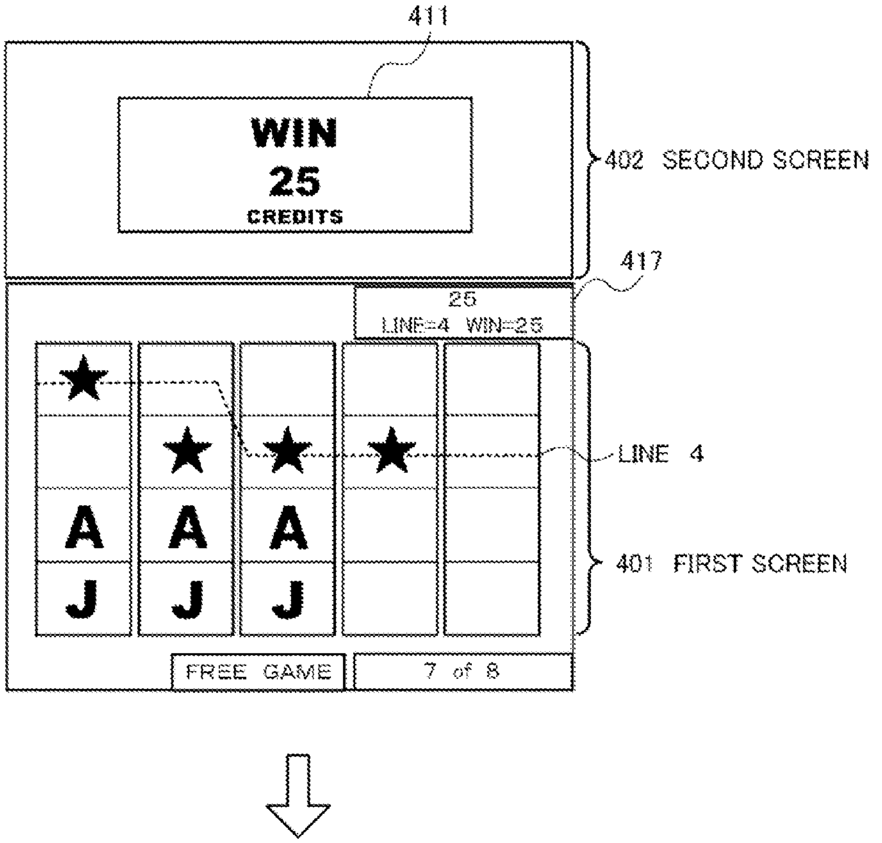
FIGS. 27A and 27B are diagrams for explanation of the effect produced when the line payouts occur.
Figure 27B:
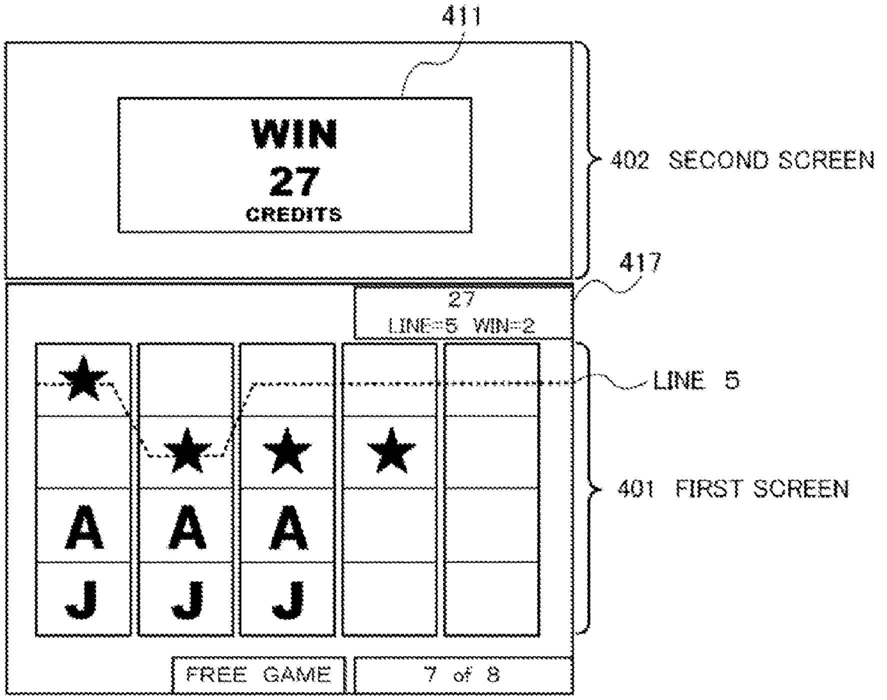

FIG. 27A shows a situation where an effect for an initial line payout is produced. The effect produced in this situation is an effect for the smallest line No. 4 (0, 0 1, 1, 1). This winning line contains three "GOLD" symbols, which provides a payout of 25 (assuming that the number of BETs for the winning line is one), and thus the obtained credit is 25. Therefore, the WIN signboard 411 makes incremental display in which the obtained credit increases from 0 to 25. The WIN meter 417 shows, in its first stage, incremental display of the total credit value (the number of credits obtained in the current game cycle) increasing from 0 to 25, which is linked to the incremental display in the WIN signboard 411. The WIN meter 417 also displays, in its second stage, details of the obtained credit, which mean the line No. of the winning line that provides a current line payout and the value of the line payout.

After a predetermined time period has elapsed since the incremental display is terminated, the display of the WIN signboard 411 disappears. Then, the display of FIG. 27A is shifted to a display of FIG. 27B. In this display, an effect for the next line No. 5 (0, 1, 0, 0, 0) is produced. This winning line contains two "GOLD" symbols, which provides a payout of 2 (assuming that the number of BETs for the winning line is one), and thus the obtained credit is 2. Therefore, the WIN signboard 411 makes incremental display in which the obtained credit increases from 25 to 27. In this example, the WIN signboard 411 displays an accumulation (total WIN) of the credits obtained by the spin. Alternatively, the WIN signboard 411 may be configured to display another value (for example, a credit obtained in the free game or a credit obtained by the currently evaluated winning line). The WIN meter 417 shows, in its first stage, incremental display of the total credit value increasing from 25 to 27, which is linked to the incremental display in the WIN signboard 411. The WIN meter 417 also displays, in its second stage, details of the obtained credit, which mean the line No. of the winning line that provides a current line payout and the value of the line payout.

Figure 28A:
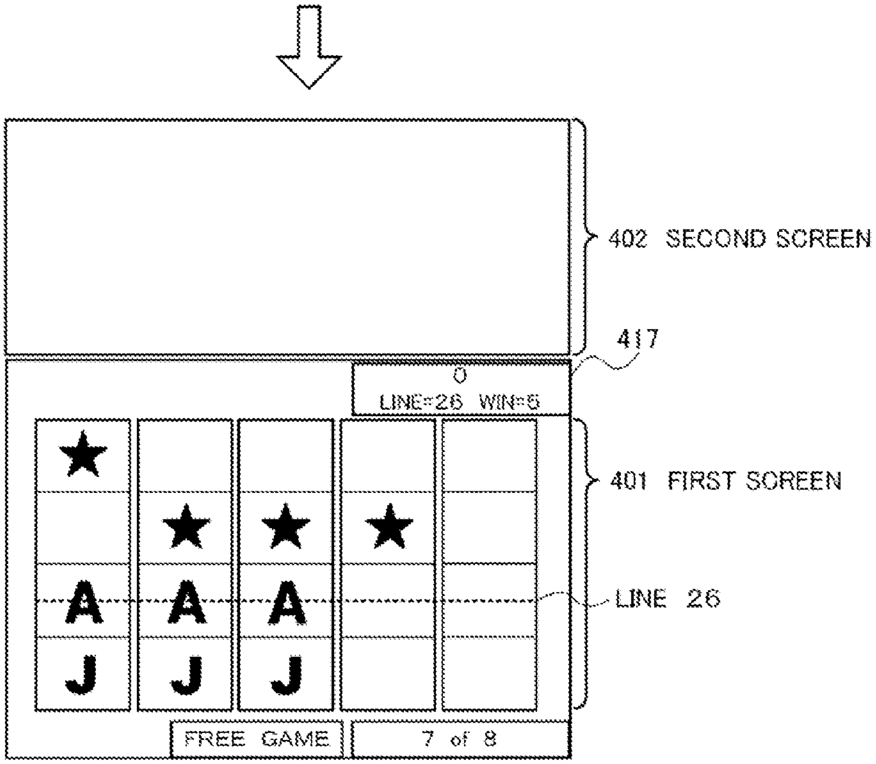
FIGS. 28A and 28B are diagrams for explanation of the effect produced when the line payouts occur.
Figure 28B:
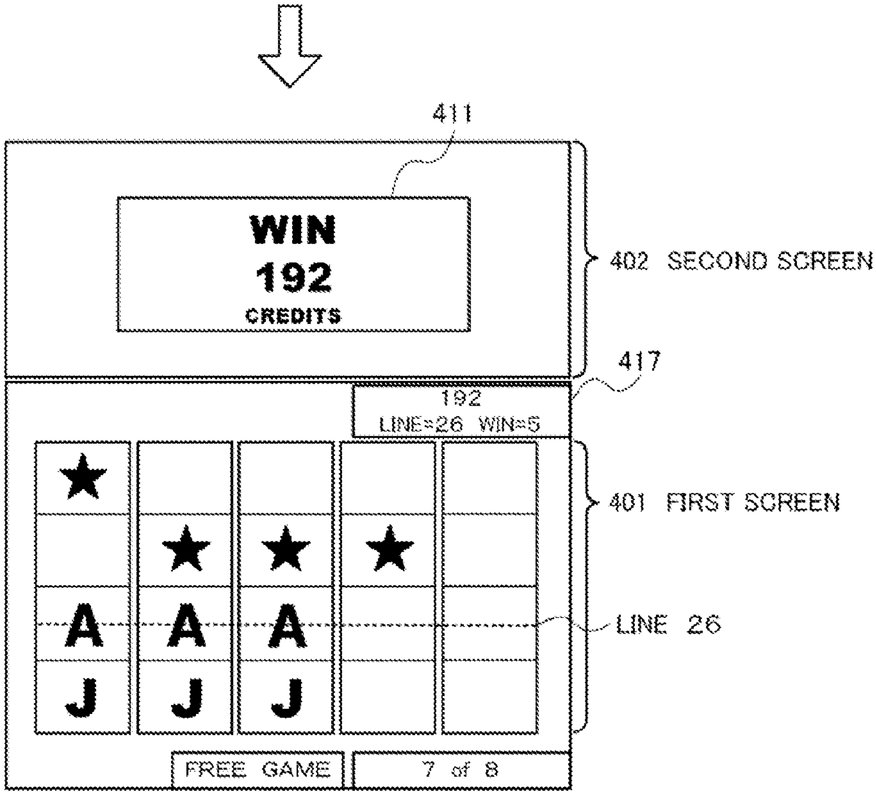

Then, after effects for a plurality of winning lines are produced, an effect for the line No. 26 (2, 2, 2, 2, 2) is produced as shown in FIG. 28A. This winning line contains three "A" symbols, which provides a payout of 5 (assuming that the number of BETs for the winning line is one), and thus the obtained credit is 5. The display is shifted from the display of FIG. 28A to a display of FIG. 28B. The WIN signboard 411 makes incremental display indicating that obtained credit is 5 by increasing the value thereof from 187 to 192. The WIN meter 417 shows, in its first stage, incremental display of the total credit value increasing from 187 to 192, which is linked to the incremental display in the WIN signboard 411. The WIN meter 417 also displays, in its second stage, details of the obtained credit, which mean the line No. of the winning line that provides a current line payout and the value of the line payout.

Figure 29A:
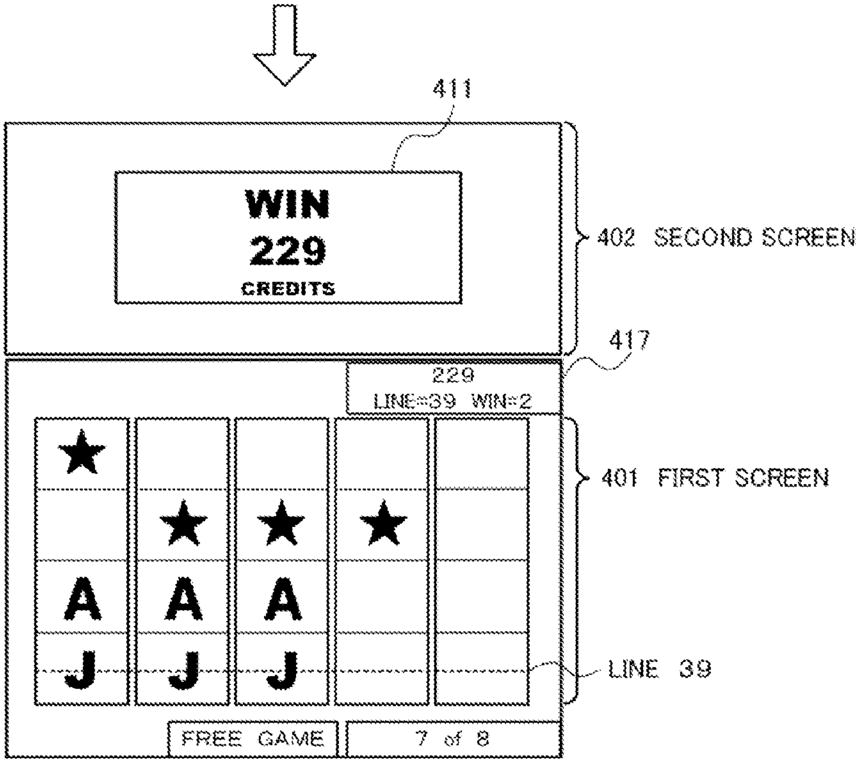
FIGS. 29A and 29B are diagrams for explanation of the effect produced when the line payouts occur.

After effects for a plurality of winning lines are further produced, an effect for the line No. 39 (3, 3, 3, 3, 3) is produced as shown in FIG. 29A. This winning line contains three "J" symbols, which provides a payout of 2 (assuming that the number of BETs for the winning line is one), and thus the obtained credit is 2. Therefore, the WIN signboard 411 makes incremental display in which the obtained credit increases from 227 to 229. The WIN meter 417 shows, in its first stage, incremental display of the total credit value increasing from 227 to 229, which is linked to the incremental display in the WIN signboard 411. The WIN meter 417 also displays, in its second stage, details of the obtained credit, which mean the line No. of the winning line that provides a current line payout and the value of the line payout.

Figure 29B:
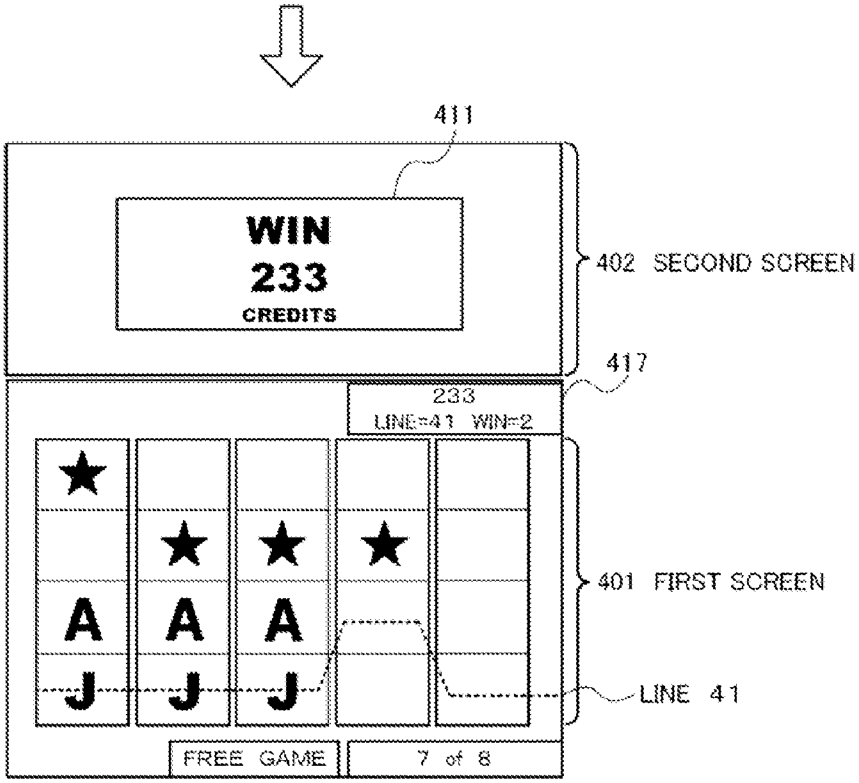

Then, an effect for the winning line having the line No. 40 is produced, and then an effect for the final winning line having the line No. 41 is produced. An effect for the line No. 41 (3, 3, 3, 2, 3) is produced as shown in FIG. 29B. This winning line contains three "J" symbols, which provides a payout of 2 (assuming that the number of BETs for the winning line is one), and thus the obtained credit is 2. Therefore, the WIN signboard 411 makes incremental display in which the obtained credit increases from 231 to 233. The WIN meter 417 shows, in its first stage, incremental display of the total credit value increasing from 231 to 233, which is linked to the incremental display in the WIN signboard 411. The WIN meter 417 also displays, in its second stage, details of the obtained credit, which mean the line No. of the winning line that provides a current line payout and the value of the line payout.

After the incremental display in the WIN signboard 411 and the incremental display of the total credit value in the first stage of the WIN meter 417 are completed, the sum (total WIN) of the credits obtained by the spin can be displayed in a third stage of the WIN meter 417. At the same timing, the winning lines arranged in ascending order of line Nos. can be displayed (with dotted lines extending along the winning lines, with a higher brightness, with blinking, or the like).

In this example, the control is performed such that the win-time effect during the free game is produced in ascending order of line Nos. and the corresponding obtained credits are displayed in sequence. Instead, the effects may be produced in other various orders. For example, the effects may be displayed in descending order of payouts, or may be displayed according to each of the kinds of symbols associated with the respective effects.

<Effect Production Processing for Display in WIN Signboard During Free Game>

Figure 30D:
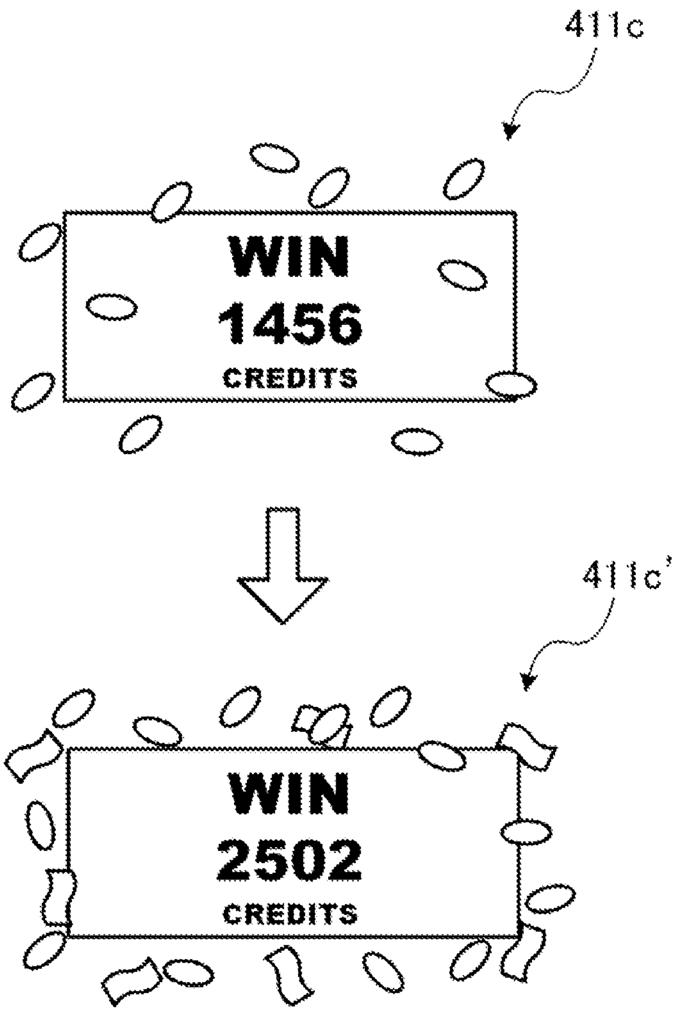

Next, with reference to FIGS. 30A to 30D, effects in the WIN signboard 411 displayed in the second screen 402 are described. In the gaming machine according to the embodiment of the present invention, the WIN signboard 411 is controlled such that the display therein is made in different manners depending on the sum (total WIN) of credits obtained by a single spin. For example, as shown in FIG. 30A, the manner of display (effect) in the WIN signboard 411 is changed depending on the amount of total WIN. More specifically, when the total WIN is less than 20 times the total BET, the WIN signboard 411 is displayed as a silver-colored signboard. When the total WIN is equal to or more than 20 times the total BET and less than 50 times the total BET, the WIN signboard 411 is displayed as a gold-colored signboard with coins (coin-shaped figures) placed therearound. When the total WIN is equal to or more than 50 times the total BET, the WIN signboard 411 is displayed as a gold-colored signboard with coins (coin-shaped figures) and bills (bill-shaped figures) placed therearound. The total BET is, for example, the value obtained by multiplying the number of BETs, which has been designated by the player, by the number of winning lines.

FIG. 30B shows the manner of display of a WIN signboard 411*a* in a case where the total WIN is less than 20 times the total BET. The total WIN is 130, which is less than 20 times the total BET (in this example, the number of BETs 1× the number of winning lines 50×20=1000). The WIN signboard 411*a* is displayed as a silver-colored signboard.

FIG. 30C shows the manner of display of a WIN signboard 411*b* in a case where the total WIN is equal to or more than 20 times the total BET and less than 50 times the total BET. The total WIN is 1456, which is equal to or more than the 20 times the total BET (in this example, the number of BETs 1× the number of winning lines 50×20=1000) and less than 50 times the total BET (in this example, the number of BETs 1× the number of winning lines 50×50=2500). The WIN signboard 411*b* is displayed as a gold-colored signboard with coins placed therearound.

FIG. 30D shows the manner of display of a WIN signboard 411*c* in a case where the total WIN is equal to or more than 50 times the total BET. In this example, incremental display of the total WIN is made, and at a timing of exceeding 2500, the gold-colored WIN signboard 411*c* with coins placed therearound is shifted to a gold-colored WIN signboard 411*c*' with coins and bills placed therearound. The final value of the total WIN is 2502, which is equal to or more than 50 times the total BET (in this example, the number of BETs 1× the number of winning lines 50×50=2500).

In this example, the control is performed such that the manner of display of the WIN signboard is changed in accordance with the relationship between the total WIN and the total BET. Alternatively, other controls may be adoptable in which, for example, the manner of display of the WIN signboard is changed in accordance with the relationship between the number of credits obtained in a game spin or in any other cycle and the value related to the number of BETs designated by the player.

<Effect Production Processing for Incremental Display in WIN Signboard>

Figure 32:
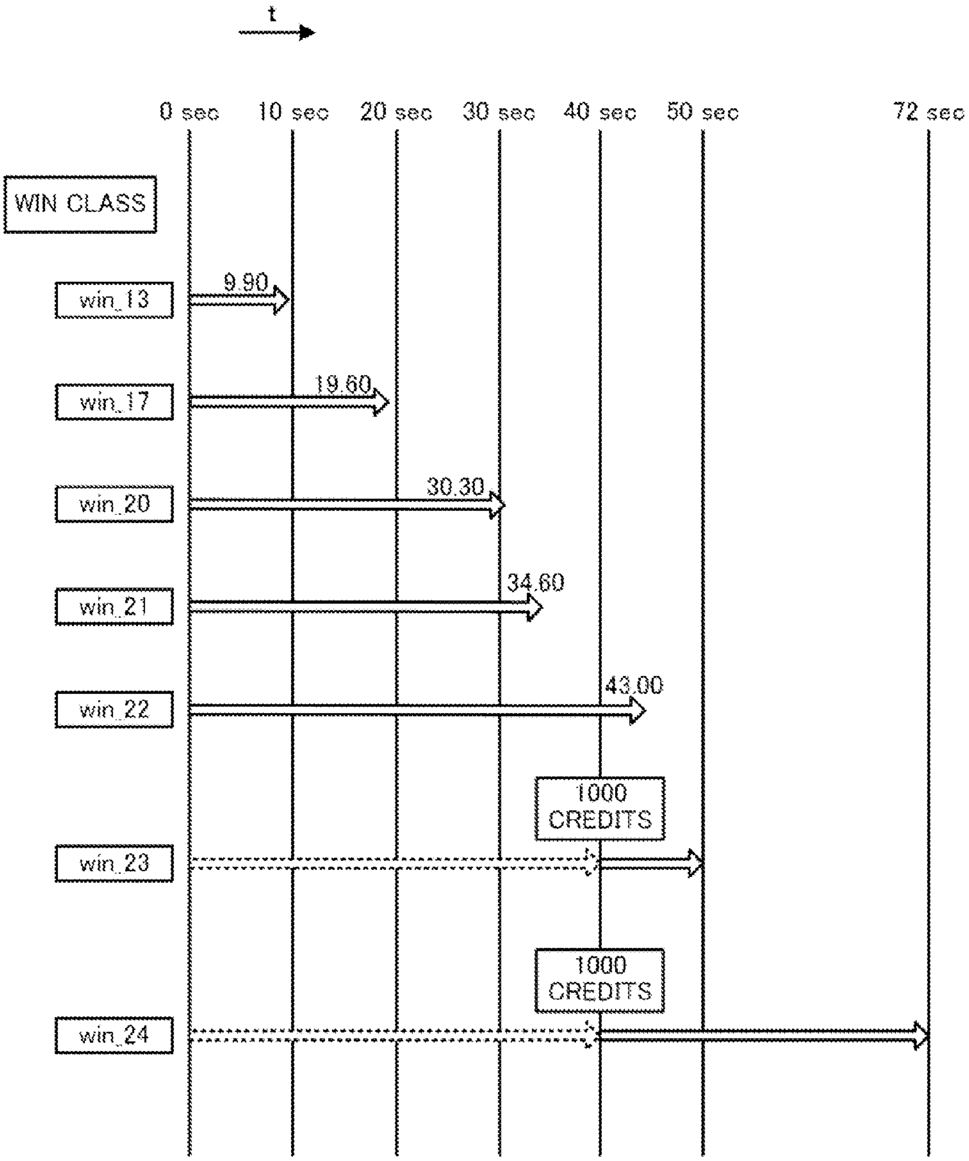
FIG. 32 is a diagram for explanation of a timing for incremental display in the WIN signboard.

Next, with reference to FIGS. 31 and 32, effects for the incremental display in the WIN signboard 411 are described. FIG. 31 shows an incremental rate management table for the WIN signboard 411. The rate of increment in the incremental display in the WIN signboard 411 varies depending on setting of the incremental rate management table shown in FIG. 31, that is, depending on how many times the total WIN is as large as the total BET.

For example, for the WIN class "win_1" in which the total WIN is less than 0.1 times the total BET, a control is performed such that the incremental display of the total WIN credit is made in 0.50 seconds. Each increment is basically made at equal time intervals. This time interval corresponds to the value obtained by dividing the 0.50 seconds by the number of times the increment is to be made.

FIG. 32 shows a time chart of the incremental display in more detail. For example, for the WIN class "win_13" in which the total WIN is equal to or more than four times the total BET and less than five times the total BET, a control is performed such that the incremental display of the total WIN credit is made in 9.90 seconds. For the WIN class "win_17" in which the total WIN is equal to or more than eight times the total BET and less than ten times the total BET, a control is performed such that the incremental display of the total WIN credit is made in 19.60 seconds. For the WIN class "win_20" in which the total WIN is equal to or more than 15 times the total BET and less than 20 times the total BET, a control is performed such that the incremental display of the total WIN credit is made in 30.30 seconds. For the WIN class "win_21" in which the total WIN is equal to or more than 20 times the total BET and less than 30 times the total BET, a control is performed such that the incremental display of the total WIN credit is made in 34.60 seconds. For the WIN class "win_22" in which the total WIN is equal to or more than 30 times the total BET and less than 40 times the total BET, a control is performed such that the incremental display of the total WIN credit is made in 43.00 seconds.

For the WIN class "win_23" in which the total WIN is equal to or more than 40 times the total BET and less than 50 times the total BET, a control is performed such that the incremental display of the total WIN credit is made in 50.00 seconds. In this case, however, until the displayed total WIN credit reaches the value corresponding to 20 times the total BET (e.g., in this example, the number of BETs 1× the number of winning lines 50×20=1000 credits), the increment is made at such a rate that the value is incremented by ½ of the total BET (e.g., in this example, the number of BETs 1× the number of winning lines 50/2=25) per second, and subsequently, the increment is made at equal time intervals. This time interval corresponds to the value obtained by dividing the number of remaining seconds by the number of remaining increments.

For the WIN class "win_23", the incremental display of the first 1000 credits is completed by the time that 40.00 seconds elapse, and then the incremental display of the remaining credits (1000 to 1499 credits) is made at equal time intervals by the time that 50.00 seconds elapse.

For the WIN class "win_24" in which the total WIN is equal to or more than 50 times the total BET, a control is performed such that the incremental display of the total WIN credit is made in 72.00 seconds. In this case, similarly to the case of WIN class "win_23", until the displayed total WIN credit reaches the value corresponding to 20 times the total BET (e.g., in this example, the number of BETs 1× the number of winning lines 50×20=1000 credits), the increment is made at such a rate that the value is incremented by ½ of the total BET (e.g., in this example, the number of BETs 1× the number of winning lines 50/2=25) per second, and subsequently, the increment is made at equal time intervals. This time interval corresponds to the value obtained by dividing the number of remaining seconds by the number of remaining increments. That is, for the WIN class "win_24", the incremental display of the first 1000 credits is completed by the time that 40.00 seconds elapse, and then the incremental display of the remaining credits (1500 credits or more) is made at equal intervals by the time that 72.00 seconds elapse.

In this example, the control is performed such that the rate of increment displayed in the WIN signboard varies in accordance with the relationship between the total WIN and the total BET. Alternatively, other controls may be adoptable in which, for example, the rate of increment in the WIN signboard varies in accordance with the relationship between the number of credits obtained in a game spin or in any other cycle and the value related to the number of BETs designated by the player. In addition, although the incremental display in the WIN signboard 411 and the incremental display in the WIN meter 417 are linked to each other, the incremental display in the WIN meter 417 may be made at a different rate of increment.

<Effect Production Processing Upon Establishment of Line Payout Associated with Top Symbol>

Next, with reference to FIGS. 33A to 35, a description is given of an effect produced when three or more top symbols are aligned along a winning line so that a line payout is established in the base game and the free game.

Figure 33A:
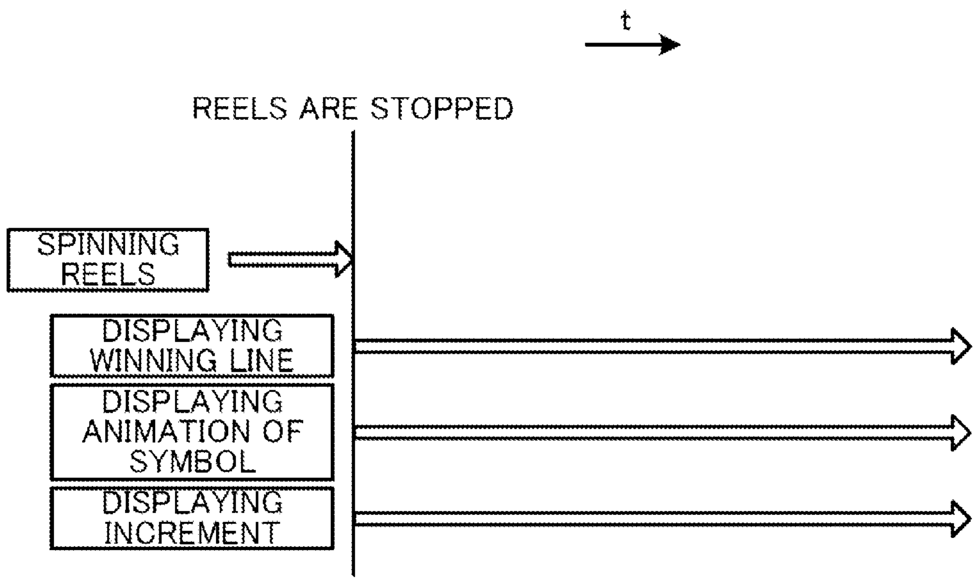
FIGS. 33A and 33B are diagrams for explanation of effects produced when a line payout associated with a top symbol is established.

FIG. 33A shows a timing of producing an effect in a case where a line payout (not associated with a top symbol) is established. As shown in FIG. 33A, when rotation of the video reels 3 in the symbol display region 4 is stopped, the first screen 401 displays, in the second stage of the WIN meter 417, details of a credit (a winning line and a corresponding payout) obtained by the current spin, with display of an animation of a win-making symbol. Moreover, incremental display of the credit is made in the WIN signboard 411 displayed in the second screen 402 and in the first stage of the WIN meter 417 displayed in the first screen 401.

Figure 33B:
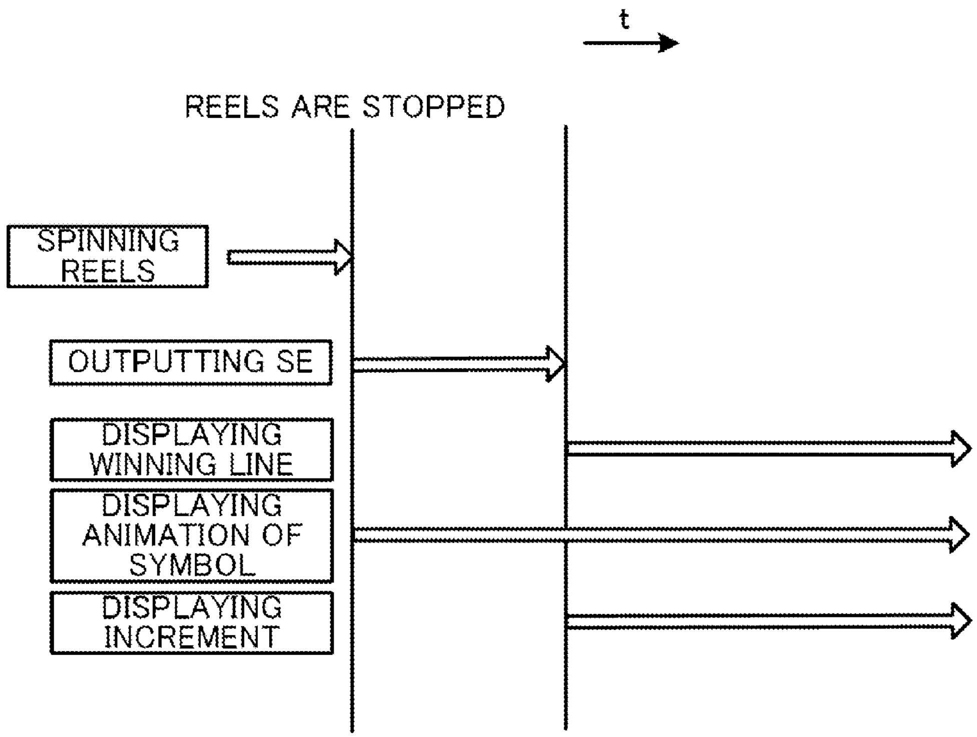

FIG. 33B shows a timing of producing an effect in a case where a line payout associated with a top symbol is established. As shown in FIG. 33B, when rotation of the video reels 3 in the symbol display region 4 is stopped, a sound effect (SE) associated with the win is outputted, and additionally an animation of a win-making symbol is displayed. Then, after a predetermined time period elapses, the output of the sound effect is stopped and at the same timing, the WIN meter 417 displayed in the first screen 401 shows, in its second stage, details of a credit (a winning line and a corresponding payout) obtained by the current spin. Moreover, incremental display of the credit is made in the WIN signboard 411 displayed in the second screen 402 and in the first stage of the WIN meter 417 displayed in the first screen 401. The animation of the symbol is continuously displayed.

Figure 34A:
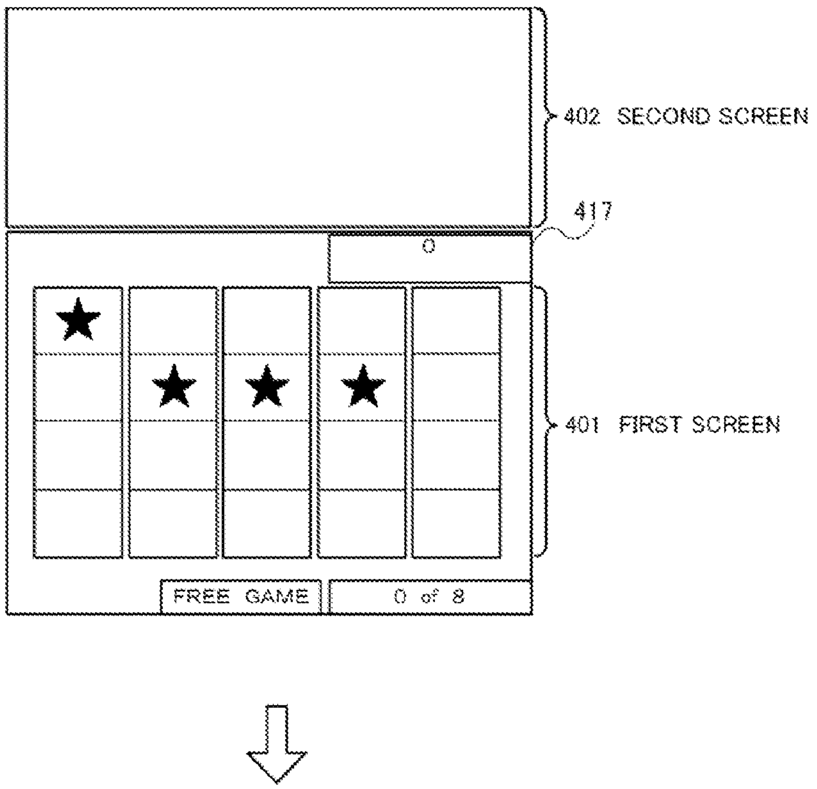
FIGS. 34A and 34B are diagrams for explanation of the effects produced when the line payout associated with the top symbol is established.
Figure 34B:
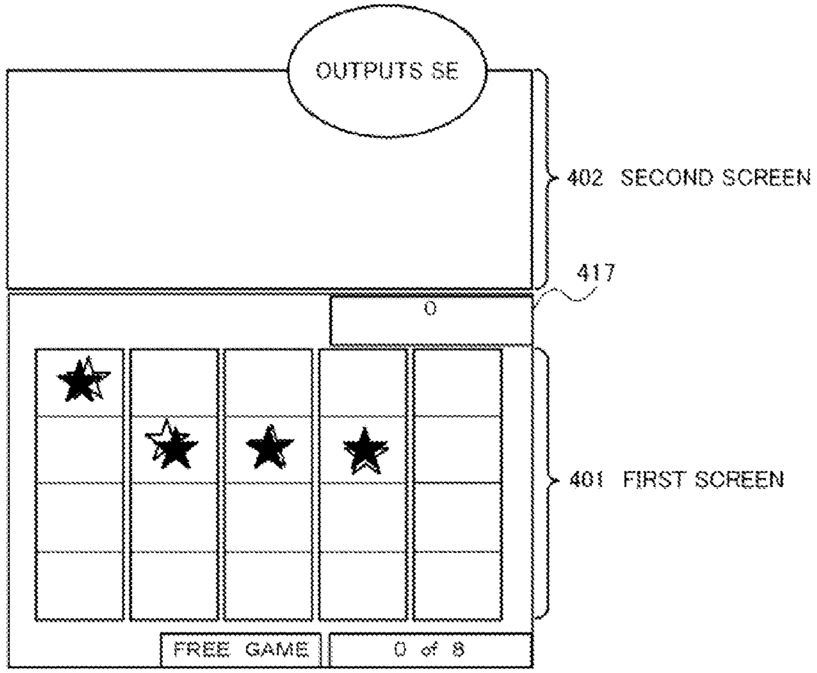

FIGS. 34A to 35 show a manner in which an effect is produced in a case where a line payout associated with a top symbol is established in the free game. FIG. 34A shows a situation where rotation of the video reels 3 in the symbol display region 4 is stopped so that four "GOLD" symbols (black stars), which are top symbols, are stopped. FIG. 34B shows a subsequent situation where the sound effect is outputted and an animation of each of the "GOLD" symbols, which are top symbols, is displayed.

Then, after a predetermined time period elapses, the output of the sound effect is stopped and at the same timing, the WIN meter 417 displayed in the first screen 401 shows, in its second stage, details of a credit (a winning line 4 and a corresponding payout 2) obtained by the spin, as shown in FIG. 35. Moreover, incremental display (from 0 to 2) of the credit is made in the WIN signboard 411 displayed in the second screen 402 and in the first stage of the WIN meter 417 displayed in the first screen 401. The animation of the symbol is continuously displayed.

<Effect Production Processing Upon Appearance of Three Feature Symbols>

Figure 36:
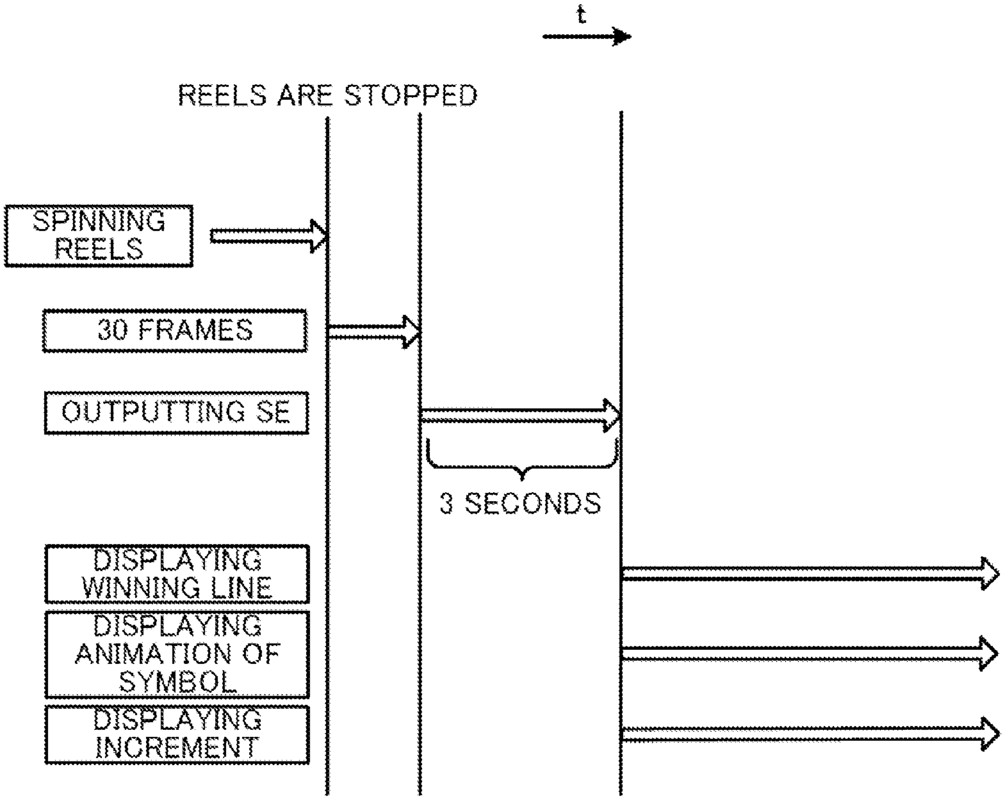
FIG. 36 is a diagram for explanation of effects produced when three feature symbols appear.

Next, with reference to FIGS. 36 to 38, an effect produced when three feature symbols appear in the base game and the free game is described. Appearance of three feature symbols in the free game causes a retrigger.

FIG. 36 shows a timing of producing an effect in a case where three feature symbols appear in the free game. As shown in FIG. 36, when rotation of the video reels 3 in the symbol display region 4 is stopped, a sound effect is outputted for a predetermined time period (for example, three seconds) after 30 frames have passed (for example, after elapse of a time period required for each symbol array to move through 30 frames). Then, the first screen 401 displays, in the second stage of the WIN meter 417, details of a credit (a winning line and a corresponding payout) obtained by the current spin, with display of an animation of a win-making symbol. Moreover, incremental display of the credit is made in the WIN signboard 411 displayed in the second screen 402 and in the first stage of the WIN meter 417 displayed in the first screen 401.

Figure 37A:
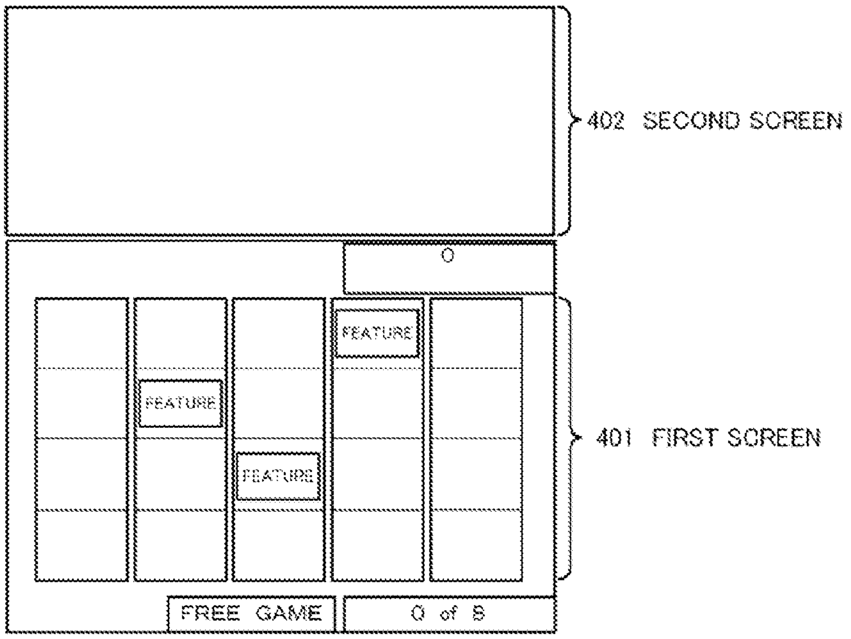
FIGS. 37A and 37B are diagrams for explanation of the effects produced when the three feature symbols appear.
Figure 37B:
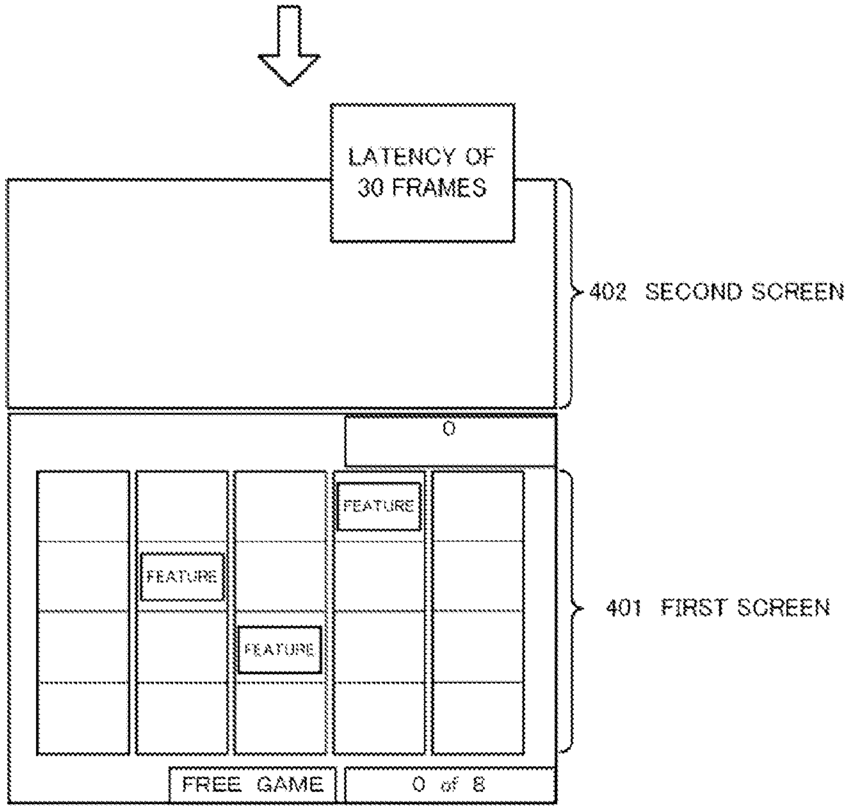
Figure 38A:
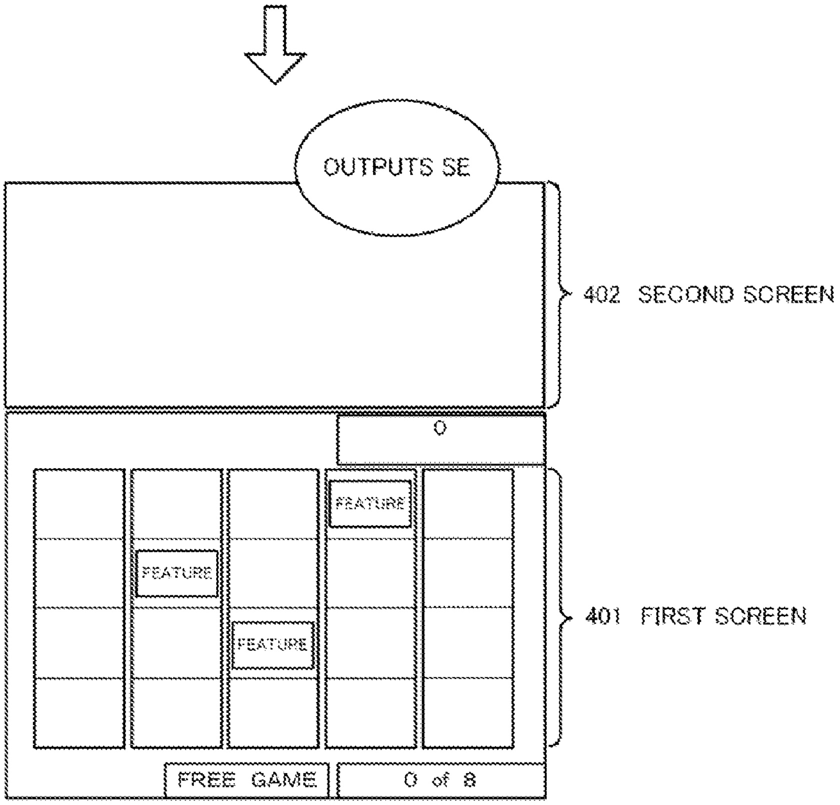
FIGS. 38A and 38B are diagrams for explanation of the effects produced when the three feature symbols appear.

FIGS. 37A to 38B show a manner in which an effect is produced in a case where three feature symbols appear in the free game. FIG. 37A shows a situation where rotation of the video reels 3 in the symbol display region 4 is stopped so that three feature symbols are stopped. FIG. 37B shows a subsequent situation where the displays of the first screen 401 and the second screen 402 are kept unchanged during a latency of 30 frames. FIG. 38A shows a situation where the sound effect is outputted after passing of the 30 frames. In this situation, the displays of the first screen 401 and the second screen 402 are kept unchanged.

Figure 38B:
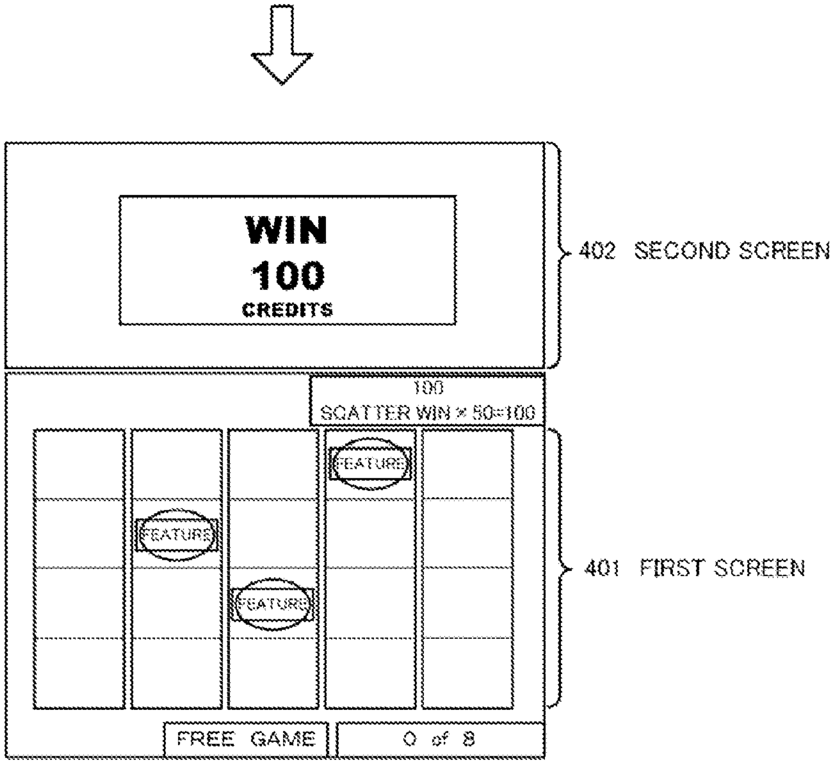

Then, after the sound effect is outputted for three seconds, the output of the sound effect is stopped and at the same timing, the first screen 401 displays, in the second stage of the WIN meter 417, details of a credit (SCATTER and a corresponding payout 2×50) obtained by the spin, as shown in FIG. 38B, with display of an animation of a win-making symbol. Moreover, incremental display (from 0 to 100) of the credit is made in the WIN signboard 411 displayed in the second screen 402 and in the first stage of the WIN meter 417 displayed in the first screen 401.

<Effect Production Processing Upon Occurrence of Large Prize WIN>

Figure 39:
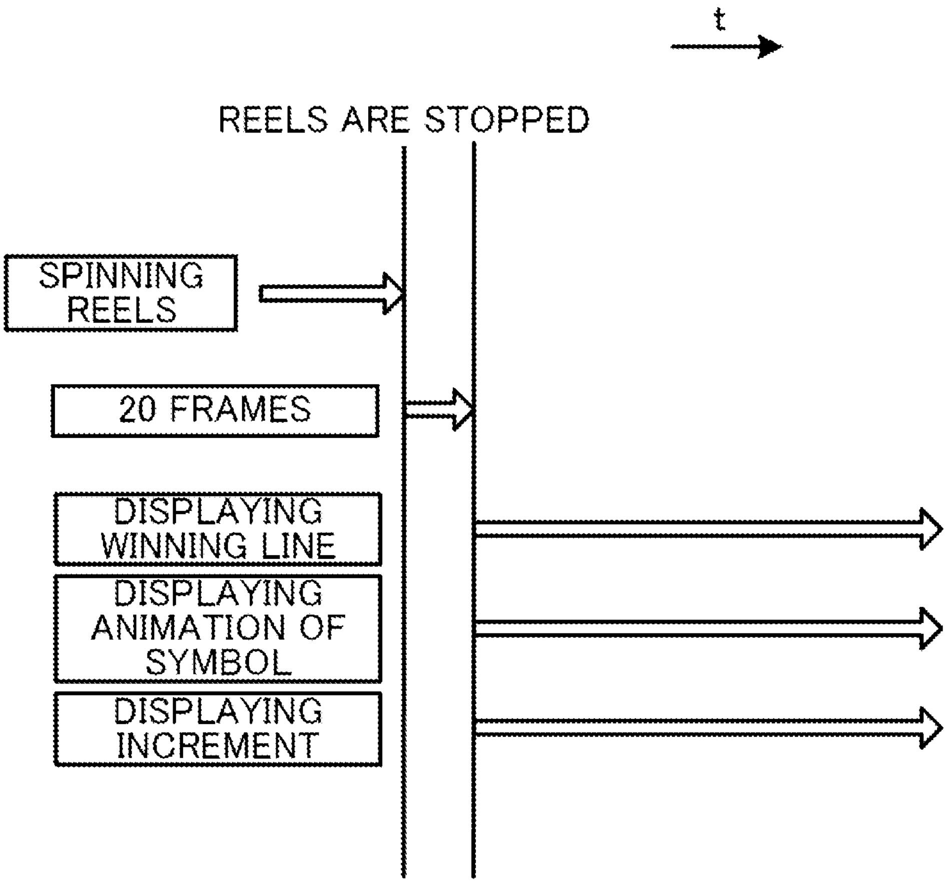
FIG. 39 is a diagram for explanation of effects produced when a large prize WIN occurs.

Next, with reference to FIG. 39, an effect produced when a large prize WIN occurs in the base game and the free game is described. The large prize WIN is established when, for example, the total WIN is equal to or more than 20 times the total BET.

FIG. 39 shows a timing of producing an effect in a case where a large prize WIN occurs in the free game. As shown in FIG. 39, after passing of 20 frames (for example, after elapse of a time period required for the symbol array to move through 20 frames) since rotation of the video reels 3 in the symbol display region 4 was stopped, the first screen 401 displays, in the second stage of the WIN meter 417, details of a credit (a winning line and a corresponding payout) obtained by the current spin, with display of an animation of a win-making symbol. Moreover, incremental display of the credit is made in the WIN signboard 411 displayed in the second screen 402 and in the first stage of the WIN meter 417 displayed in the first screen 401. Here, if this situation occurs concurrently with a situation where three or more top symbols are aligned along a winning line so that a line payout is established, the effect shown in FIGS. 33A to 35 is preferentially adopted.

<Effect Production Processing for Display of Total WIN Signboard after Free Game>

Next, with reference to FIGS. 40A to 40D, an effect for the free-game total WIN signboard 418 displayed in the first screen 401 is described. In the gaming machine according to the embodiment of the present invention, the free-game total WIN signboard 418 is controlled such that the manner of display therein is changed in accordance with the sum of the credits (total obtained credit) obtained in a single free game.

For example, as shown in FIG. 40A, the manner of display (effect) in the free-game total WIN signboard 418 is changed in accordance with the amount of the total obtained credit. When the total obtained credit is less than 20 times the total BET, the free-game total WIN signboard 418 is displayed as a silver-colored signboard and additionally, the number of seconds for which the free-game total WIN signboard 418 is kept displayed is set to 3.6 seconds. When the total obtained credit is equal to or more than 20 times the total BET and less than 50 times the total BET, the free-game total WIN signboard 418 is displayed as a gold-colored signboard with coins (coin-shaped figures) placed therearound and additionally, the number of seconds for which the free-game total WIN signboard 418 is kept displayed is set to 6 seconds. When the total obtained credit is equal to or more than 50 times the total BET, the free-game total WIN signboard 418 is displayed as a gold-colored signboard with coins (coin-shaped figures) and bills (bill-shaped figures) placed therearound and additionally, the number of seconds for which the free-game total WIN signboard 418 is kept displayed is set to 10 seconds.

The total BET is, for example, the value obtained by multiplying the number of BETs, which has been designated by the player, by the number of winning lines. After elapse of the aforementioned number of seconds of display, the free-game total WIN signboard 418 disappears. Alternatively, for example, a configuration is also acceptable in which, after elapse of a predetermined time period (e.g., four seconds) since the free-game total WIN signboard 418 was displayed, skipping of the display of the free-game total WIN signboard 418, which is triggered by pressing of a predetermined button (e.g., a spin button), is enabled.

FIG. 40B shows a manner of display in the free-game total WIN signboard 418*a* in a case where the total obtained credit is less than 20 times the total BET. The total obtained credit is 130, which is less than 20 times the total BET (in this example, the number of BETs 1× the number of winning lines 50×20=1000). The free-game total WIN signboard 418*a* is displayed as a silver-colored signboard.

FIG. 40C shows a manner of display in the free-game total WIN signboard 418*b* in a case where the total obtained credit is equal to or more than 20 times the total BET and less than 50 times the total BET. The total obtained credit is 1450, which is equal to or more than 20 times the total BET (in this example, the number of BETs 1× the number of winning lines 50×20=1000) and less than 50 times the total BET (in this example, the number of BETs 1× the number of winning lines 50×50=2500). The free-game total WIN signboard 418*b* is displayed as a gold-colored signboard with coins placed therearound. The characters "CONGRATULATIONS!" are also displayed in the free-game total WIN signboard 418*b*.

Figure 40D:
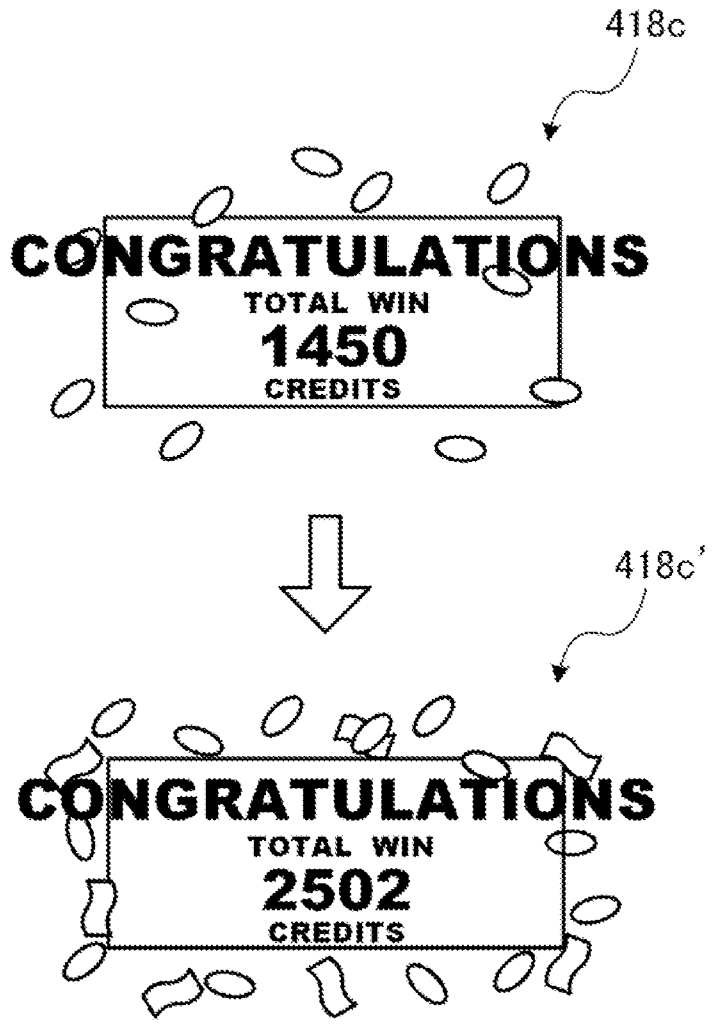

FIG. 40D shows a manner of display in the free-game total WIN signboard 418*c* in a case where the total obtained credit is equal to or more than 50 times the total BET. In this example, at a timing when the total obtained credit in the incremental display exceeds 2500, the gold-colored free-game total WIN signboard 418*c* with coins placed therearound is shifted to the gold-colored free-game total WIN signboard 418*c* with coins and bills placed therearound. The final total obtained credit is 2502, which is equal to or more than 50 times the total BET (in this example, the number of BETs 1× the number of winning lines 50×50=2500). The characters of "CONGRATULATIONS!" are also displayed in the free-game total WIN signboard 418*c* and the free-game total WIN signboard 418*c'*.

In this example, the control is performed such that the manner of display of the total WIN signboard is changed in accordance with the relationship between the total obtained credit and the total BET. Alternatively, other controls may be adoptable in which, for example, the manner of display of the total WIN signboard is changed in accordance with the relationship between the number of credits obtained in a game spin or in any other cycle and the value related to the number of BETs designated by the player.

<Effect Production Processing Upon Appearance of Top Symbol in Free Game>

Next, with reference to FIGS. 41A to 44B, an effect produced when a top symbol appears in the symbol display region 4 of the second screen 402 is described. The gaming machine according to the embodiment of the present invention performs such a control that, when a top symbol appears in the symbol display region 4 of the second screen 402, a video effect and a sound effect (SE) that are different from the normal ones are used to create a special feeling associated with the top symbol.

Figure 41A:
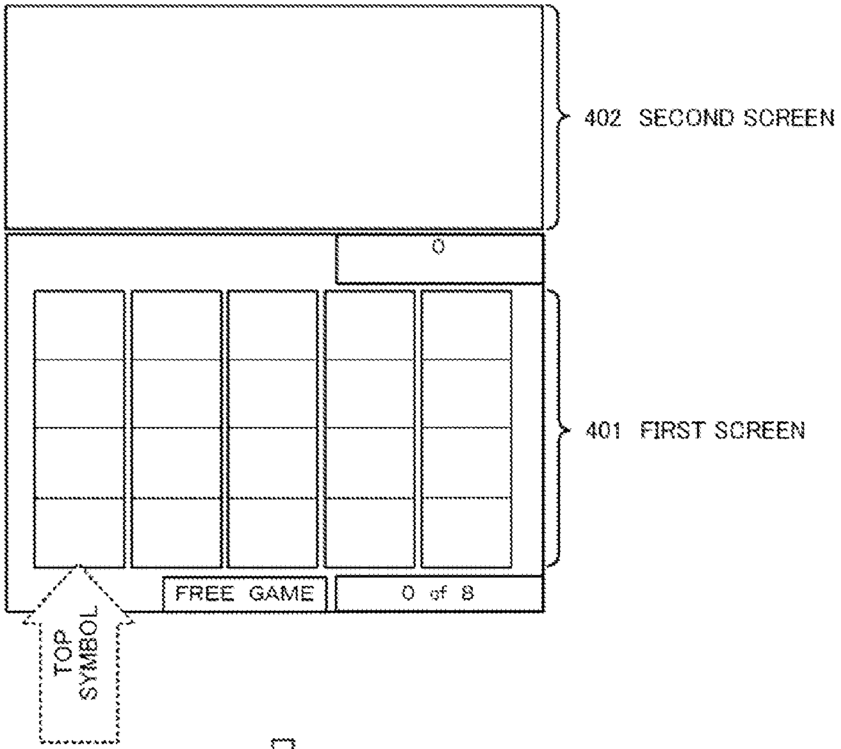
FIGS. 41A and 41B are diagrams for explanation of effects produced when a top symbol appears.
Figure 41B:
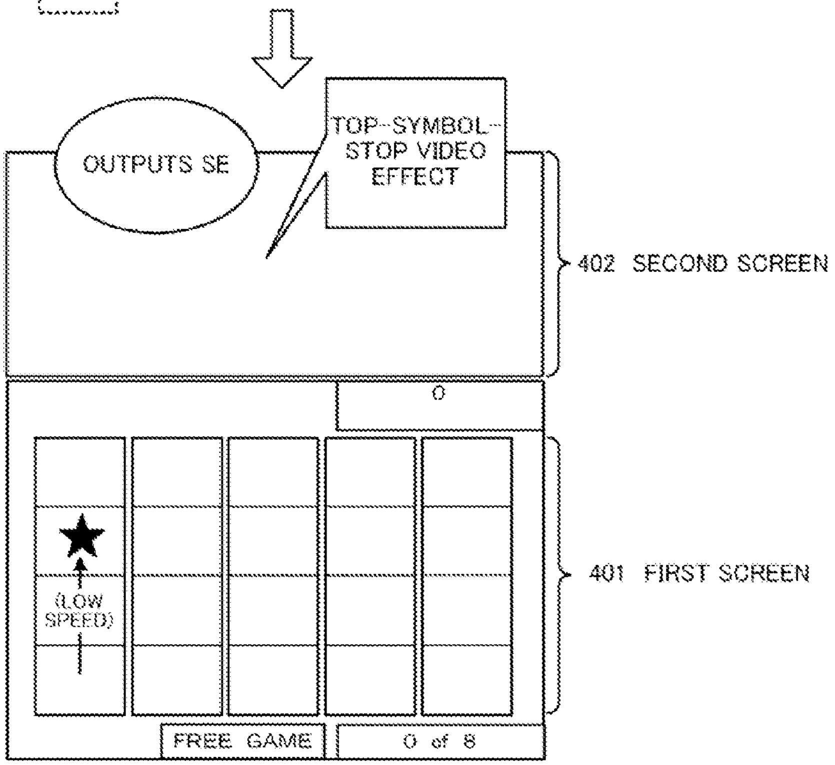

FIG. 41A shows a situation immediately before a top symbol (for example, the "GOLD" symbol (represented by the black star)) moves upward from the lower region of the first reel in the symbol display region 4 in the free game. In this example, the top symbol is scheduled to be stopped in the symbol display region 4. As shown in FIG. 41B, at a timing when the top symbol appears in the lower region of the first reel in the symbol display region 4, a top-symbol-stop video effect is displayed in the second screen 402 and a top-symbol-stop sound effect is outputted from the speaker 112. Moreover, in a time period from when the top symbol appears in the lower region of the first reel in the symbol display region 4 to the top symbol stops, a control is performed so as to reduce the speed of movement of the top symbol. For example, the speed of movement of symbols other than the top symbol is adjusted to be 2.5 times the speed of movement of the top symbol.

The display of the top-symbol-stop video effect is removed or quit after the top symbol is stopped in the symbol display region 4. The output of the top-symbol-stop sound effect is quit after the top symbol is stopped.

Figure 42A:
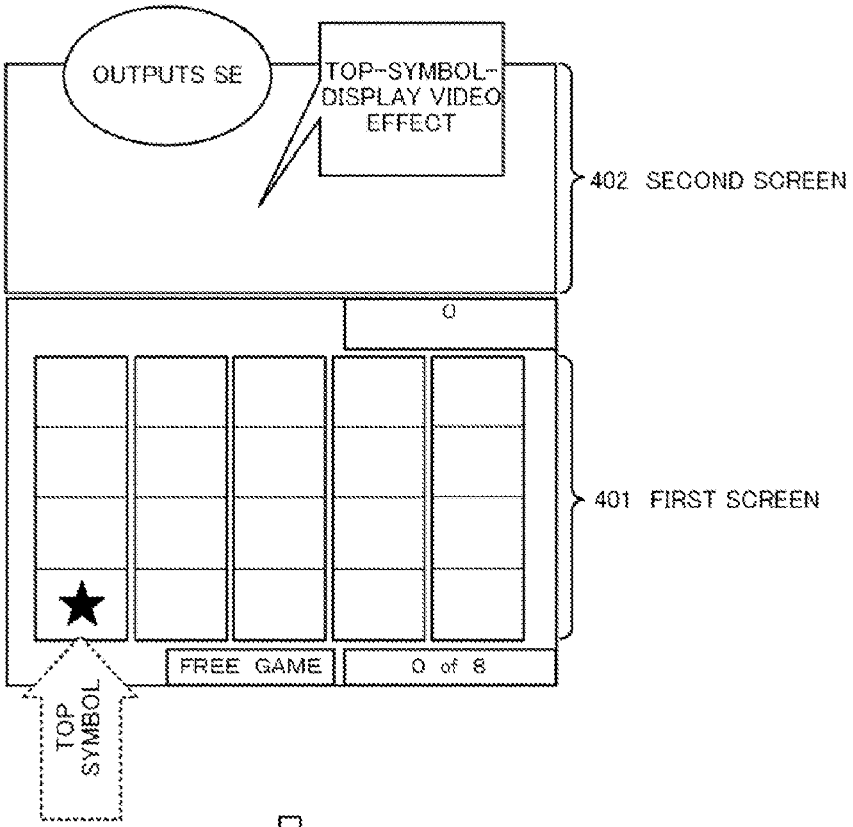
FIGS. 42A and 42B are diagrams for explanation of effects produced when a top symbol appears.

FIG. 42A shows a situation where the top symbol (for example, the "GOLD" symbol (represented by the black star)) appears in the lower region of the first reel during upward movement of the top symbol from the lower region of the first reel in the symbol display region 4 in the free game. In this example, the top symbol is scheduled to pass through the symbol display region 4 without being stopped in the symbol display region 4. At a timing when the top symbol appears in the lower region of the first reel in the symbol display region 4, a top-symbol-display video effect is displayed in the second screen 402 and a top-symbol-display sound effect is outputted from the speaker 112.

Figure 42B:
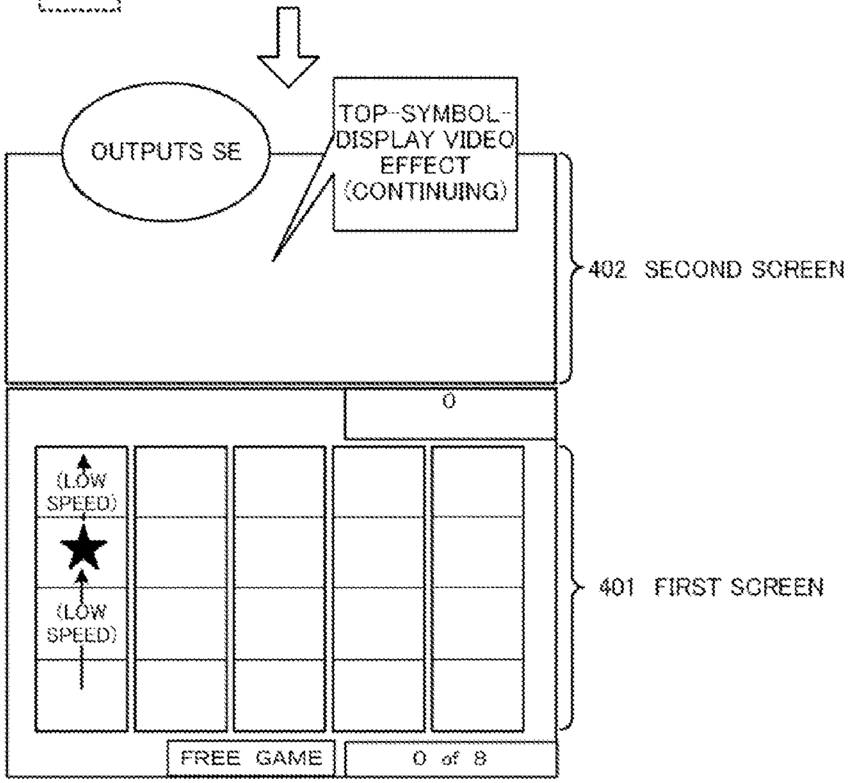

FIG. 42B shows a situation where the top symbol moving upward from the lower region of the first reel in the symbol display region 4 passes through the symbol display region 4. In this situation, the top-symbol-display video effect is continuously displayed in the second screen 402 while the top-symbol-display sound effect is continuously outputted from the speaker 112. Moreover, in a time period from when the top symbol appears in the lower region of the first reel in the symbol display region 4 to when the top symbol completes passing through the symbol display region 4, a control is performed so as to reduce the speed of movement of the top symbol. For example, the speed of movement of symbols other than the top symbol is adjusted to be 2.5 times the speed of movement of the top symbol.

FIG. 43 shows a situation where the top symbol moving from the lower region to the upper region of the first reel in the symbol display region 4 disappears out of the symbol display region 4. In this situation, the display of the top-symbol-display video effect is removed or quit at a timing when the top symbol disappears out of the symbol display region 4, and the output of the top-symbol-display sound effect is stopped at the timing when the top symbol disappears out of the symbol display region 4. Moreover, the speed of movement of the reel is returned to the original version at the timing when the top symbol disappears out of the symbol display region 4.

Figure 44A:
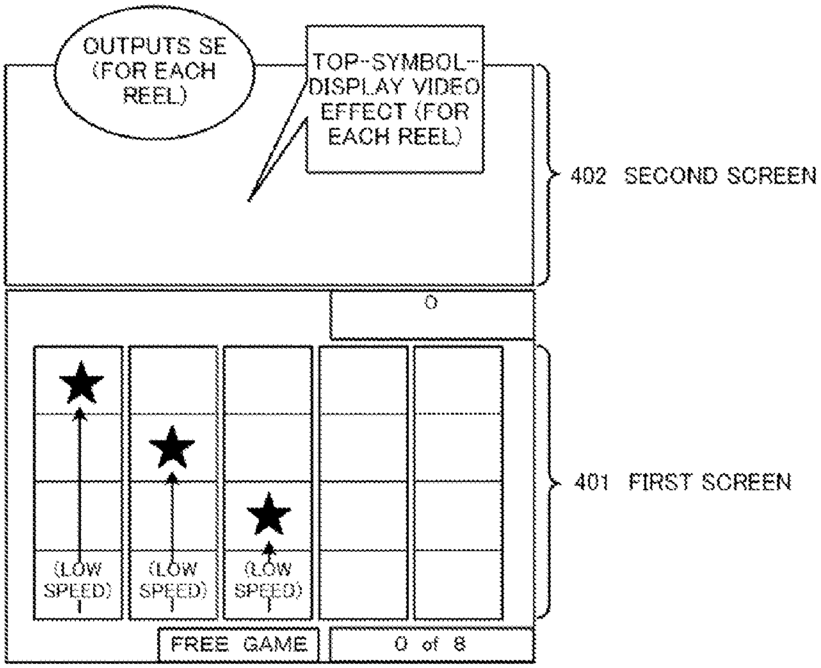
FIGS. 44A and 44B are diagrams for explanation of effects produced when top symbols appear.

FIG. 44A shows a situation where, in the free game, the top symbols (for example, the "GOLD" symbols (represented by the black star)) move upward from the lower region of the first reel, the lower region of the second reel, and the lower region of the third reel in the symbol display region 4. In this situation, the top-symbol-stop video effect or the top-symbol-display video effect is displayed in the second screen 402 while the top-symbol-stop sound effect or the top-symbol-display sound effect is outputted from the speaker 112. A control is performed so as to selectively adopt either one of the video effects and either one of the sound effects depending on whether or not any top symbol is stopped in the symbol display region 4. It is possible that the video effect and the sound effect are set for each reel so that each time the top symbol appears on a reel, the video effect and the sound effect corresponding to the reel can be employed.

Another control is also possible in which, when the top symbol appears in the symbol display region 4, the speed of movement of the symbols in the reel where the top symbol is appearing is reduced. When the top symbol is stopped in the symbol display region 4 or passes through the symbol display region 4 without being stopped, a control can be performed so as to quit or remove the display of the video effect and so as to quit the output of the sound effect for each corresponding reel.

Figure 44B:
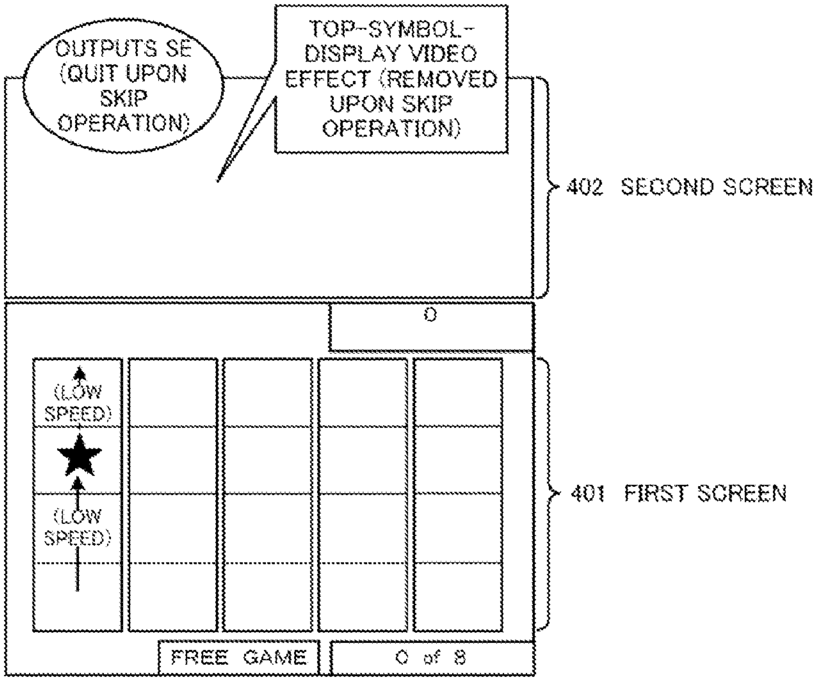

FIG. 44B shows a situation where, in the free game, the player presses a predetermined button for a skip operation while the top symbol (for example, the "GOLD" symbol (represented by the black star)) moving upward from the lower side of the first reel in the symbol display region 4 passes through the symbol display region 4. In this situation, a control can be performed so as to quit or remove the display of the top-symbol-display video effect and so as to quit the output of the top-symbol-display sound effect. In a case where the player performs the skip operation while no top symbol appears in the symbol display region 4, the display of the video effect and the output of the sound effect are not implemented.

<Reel Data Generation Processing>

Figure 45:
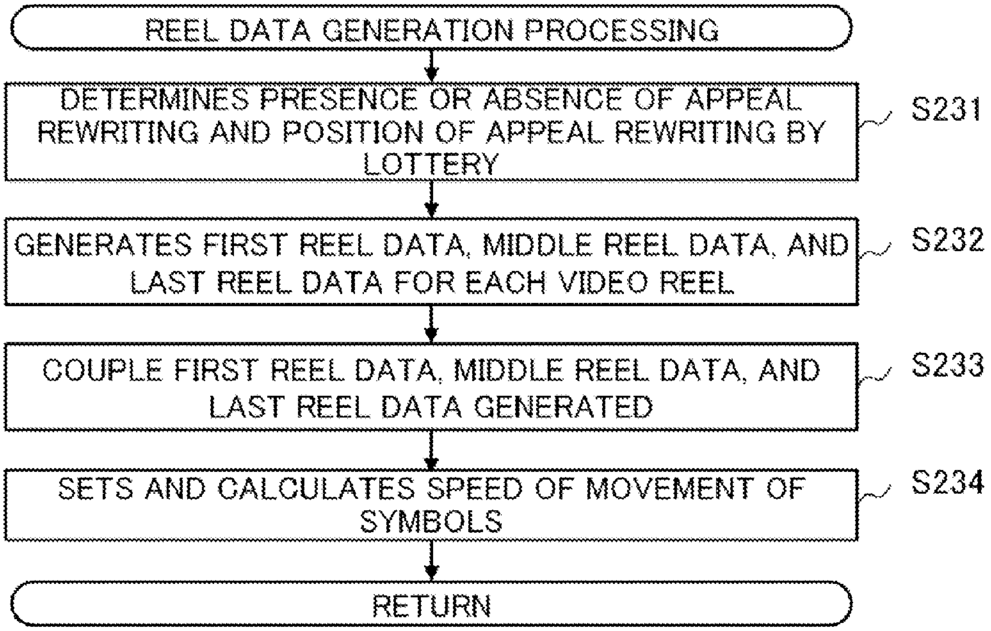
FIG. 45 shows a flowchart of reel data generation processing.

Next, with reference to FIG. 45, reel data generation processing is described. FIG. 45 is a flowchart showing a procedure of reel data generation processing according to the embodiment of the present invention. The reel data is generated in, for example, the video RAM or the RAM 73.

The main CPU 71 first determines by lottery the presence or absence of appeal rewriting of symbols in each video reel. If the main CPU 71 determines that there is appeal rewriting, a position of each appeal rewriting is determined from a plurality of candidates (step S231).

The main CPU 71 then generates reel data for display of rotation and stopping of symbols in the symbol display region 4, based on the symbols arranged in rotation start positions (the symbols previously stopped in the symbol display region 4), to-be stopped symbols stored in the free-game symbol storage area, symbol arrays assigned to the respective video reels (see FIGS. 5A to 5C), the presence or absence of the appeal rewriting, an appeal rewriting position, and the like (step S232). In this example, the reel data includes first reel data, middle reel data, and last reel data.

The main CPU 71 then couples the first reel data, middle reel data, the last reel data generated in step S232 (step S233), and based on the coupled data, controls the display of symbols from start of reverse scrolling of the symbols (step S211 in FIG. 18) to stop of the symbols (step S212 in FIG. 18).

The main CPU 71 then sets and calculates the speed of movement of the symbols as appropriate (step S234). In this example, the setting is made such that the top symbol (the symbol providing the highest payout) is scrolled at a speed lower than other symbols.

Next, with reference to FIGS. 46A to 46C, generation of reel data, which is a data domain for managing symbols, is detailed. FIG. 46A shows a configuration of the first reel data. The first reel data includes symbols arranged in the rotation start positions, that is, the symbols of each video reel 3 stopped in the symbol display region 4. The first reel data further includes the symbols arranged immediately above the symbol display region 4 and the symbols arranged immediately below the symbol display region 4. Thus, the first reel data includes six rows of symbols in total. Although the description herein states that each reel data "includes symbols" for convenience of illustration, the reel data may be any data as long as the data enables identification of symbols that are to be stopped or rotated in the symbol display region 4. For example, the reel data may be code numbers stored for each reel.

In a case where the symbols arranged immediately below the symbol display region 4 are a sequence of picture symbols, the reel data is additionally generated (downward) so as to range up to the end of the sequence of symbols. In this example, for the symbol display region 4 generated by the first spin, appeal rewriting is conducted so that top symbols are arranged (for example, twenty top symbols are arranged downward from the upper region of the symbol display region 4). Therefore, the first reel data is not generated for the first spin.

FIG. 46B shows a specific example of symbols included in the first reel data. In each of the first to fifth reels, six symbols including four symbols stopped in the symbol display region 4 are arranged.

FIG. 46C shows a configuration of the last reel data. The last reel data includes symbols arranged in stop positions, that is, symbols of the respective video reels 3 scheduled to be stopped in the symbol display region 4 (at next-spin scheduled stop positions). The last reel data further includes the symbols arranged immediately above the symbol display region 4 and the symbols arranged immediately below the symbol display region 4. Thus, the last reel data includes six rows of symbols in total. In a case where the symbols arranged immediately above the symbol display region 4 are a sequence of picture symbols, the reel data is additionally generated (upward) so as to range up to the end of the sequence of symbols.

The middle reel data (not shown) is reel data coupled between the first reel data and the last reel data. In a case where there is appeal rewriting, a part of the symbol array assigned to each video reel is assigned to the position next to (below) a top symbol arranged by the appeal rewriting. In this example, to make a spin time constant, a part of the symbol array arranged immediately above the symbols corresponding to the next-spin scheduled stop positions, which is identified by counting back symbols from the symbols corresponding to the next-spin scheduled stop positions, is connected to the top symbol provided by the appeal rewriting. In a case of conducting no appeal rewriting, a part of the symbol array assigned to each video reel is skipped so as to make symbols stopped in the scheduled stop positions at a certain time. It may be possible that a symbol other than a sequence of symbols is preferentially assigned as the skipped symbol.

<Appeal Rewriting Processing>

Figure 47:
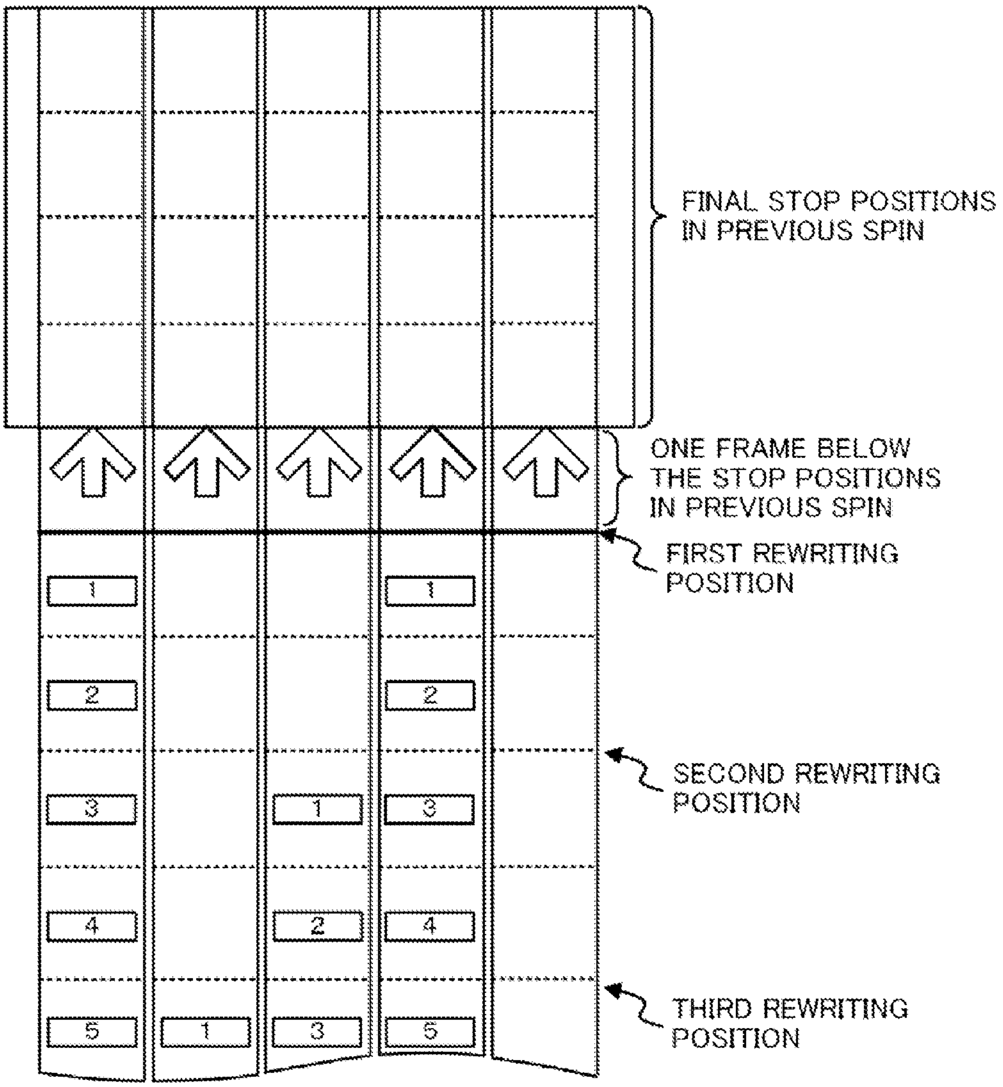
FIG. 47 is a diagram for explanation of appeal rewriting processing.

Next, with reference to FIGS. 47 and 48, the appeal rewriting processing is described. FIG. 47 conceptually shows the appeal rewriting processing. The appeal rewriting processing is processing performed only in the free game, and performed for the purpose of enhancing the player's expectation by exhibiting a series of top symbols, which looks favorable to the player. In the example shown in FIG. 47, several positions are set as a position from which the appeal rewriting is started. In a first rewriting position, the rewriting is conducted from the symbol two frames below final previous-spin stop positions which are positions where symbols were finally stopped in the previous spin (in other words, the rewriting is conducted from the symbol that will be second to appear in the lower region of the symbol display region 4 in the next spin). In a second rewriting position, the rewriting is conducted from the symbol four frames below the final previous-spin stop positions (that is, from the symbol that will be fourth to appear in the lower region of the symbol display region 4 in the next spin). In a third rewriting position, the rewriting is conducted from the symbol six frames below the final previous-spin stop positions (that is, from the symbol that will be sixth to appear in the lower region of the symbol display region 4 in the next spin). There can be some video reel, such as the fifth reel, in which no rewriting is conducted.

The appeal rewriting is conducted, for example, by using a series of twenty top symbols. Referring to the first reel in the example shown in FIG. 47, when the spin is started from the stop positions, the lower region of the symbol display region 4 first displays a symbol in accordance with setting of the symbol array (see FIGS. 5A to 5C) of the video reel, then displays a top symbol of "1" provided by the appeal rewriting, then displays a top symbol of "2", and then continuously displays top symbols up to "20".

The appeal rewriting processing shown in FIG. 47 is more specifically illustrated in FIG. 48A. In the first reel, symbols of "NINE" (code number 33), "TEN" (code number 34), "TEN" (code number 35), and "TEN" (code number 36) were stopped in the symbol display region 4 in the previous spin, and rewriting into twenty top symbols has been conducted from the first rewriting position. Therefore, in the next spin, in the lower region of the symbol display region 4, a symbol of "TEN" (code number 37) first appears and a top symbol of "1" then appears. Subsequently, top symbols of "2" to "20" appear sequentially. These twenty top symbols are rewriting of (overlay on) the original symbol array of the first reel, that is, symbols of "NINE" (code number 38) to "KING" (code number 57).

In the second reel, symbols of "KING" (code number 50), "KING" (code number 51), "KING" (code number 52), and "KING" (code number 53) were stopped in the symbol display region 4 in the previous spin, and rewriting into twenty top symbols has been conducted from the third rewriting position. Therefore, in the next spin, in the lower region of the symbol display region 4, a symbol of "WILD" (code number 54) first appears and the four symbols of "ACE" (code numbers 55 to 58) then appear sequentially. Then, in the sixth place, a top symbol of "1" appears. Subsequently, top symbols of "2" to "20" appear sequentially. These twenty top symbols are rewriting of (overlay on) the original symbol array of the second reel, that is, symbols of "FEATURE" (code number 59) to "QUEEN" (code number 78). In the third reel and the fourth reel as well, rewriting into top symbols of "1" to "20" is conducted from the second rewriting position and the first rewriting position, respectively.

In the fifth reel, symbols of "KING" (code number 75), "KING" (code number 76), "KING" (code number 77), and "KING" (code number 78) were stopped in the symbol display region 4 in the previous spin. In the next spin, the symbols included in the original symbol array of the fifth reel sequentially appear in the lower region of the symbol display region 4. That is, no appeal rewriting is conducted in this reel.

FIG. 48B shows a configuration of a rewriting position table. As shown in FIGS. 47 and 48A, different rewriting positions can be set for different reels. It is possible to determine not to conduct the appeal rewriting, like in the fifth reel. Such setting can be determined by lottery by using a rewriting position table as shown in FIG. 48B.

In an example shown in FIG. 48B, any of the first rewriting position, the second rewriting position, the third rewriting position, and no rewriting is selected for each reel. The value "2" means starting rewriting from a position two frames below the lower region of the symbol display region 4. Thus, the value "2" indicates that rewriting is conducted in the first rewriting position. Likewise, the value "4" means starting rewriting from a position four frames below the lower region of the symbol display region 4. Thus, the value "4" indicates that rewriting is conducted in the second rewriting position. The value "6" means starting rewriting from a position six frames below the lower region of the symbol display region 4. Thus, the value "6" indicates that rewriting is conducted in the third rewriting position. The value "−1" indicates that no appeal rewriting is conducted. A lottery probability depends on a weight. In this example, the probability of conducting rewriting in the first rewriting position is 1/9, the probability of conducting rewriting in the second rewriting position is 1/9, the probability of conducting rewriting in the third rewriting position is 1/9, and the probability of not conducting rewriting is 6/9.

In the exemplary rewriting position table shown in FIG. 48B, three types of rewriting positions (the first to third rewriting positions) are equally set for all the reels. Alternatively, rewriting positions set for one reel may be different from rewriting positions set for another reel. In the example shown in FIG. 48B, the same weight is associated with the same rewriting position the same in all the reels, and the same weight is associated with no rewriting in all the reels. Alternatively, different weights may be associated for different reels.

<Specific Example of Symbol Display Control>

Next, with reference to FIGS. 49A to 52C, a specific example of a symbol display control as well as a configuration of the reel data is described. Herein, the description is given with focus on the first reel. The reel data, which is a data domain for managing symbols to be rotated and stopped, includes a plurality of data domains such as first reel data, middle reel data, and last reel data. This data domain uses code numbers to manage the symbols of the symbol array to be displayed, but any other data may be stored and managed. In FIGS. 49A to 52C, for convenience of illustration, contents of the reel data are represented by symbol names such as "JACK" and "QUEEN" in association with the symbol array.

Figures 49A, 49B, 49C:
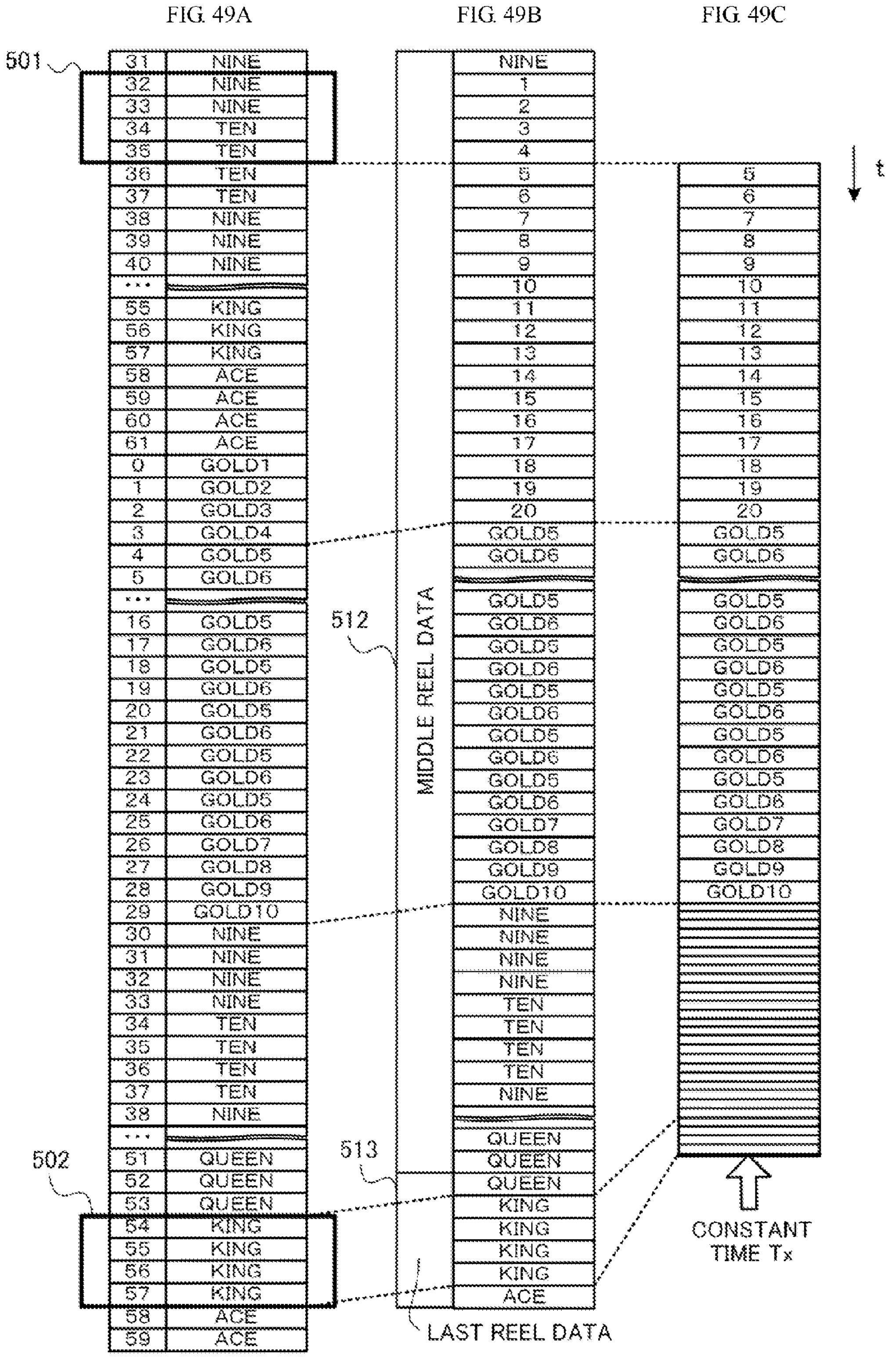
FIGS. 49A to 49C are diagrams for explanation of an example of a symbol display control.

FIGS. 49A to 49C show a symbol display control and a configuration of reel data generated for an initial spin. FIG. 49A shows the symbol array of the first reel (see FIGS. 5A to 5C). It is assumed that symbols of "NINE", "NINE", "TEN", and "TEN" (code numbers 32 to 35) are stopped in stop positions 501 in the initial spin. It is assumed that four symbols of "KING" (code numbers 54 to 57) are scheduled to be stopped in next-spin scheduled stop positions 502.

FIG. 49B shows reel data generated at this time. FIGS. 49A to 49C show a case of the initial spin, and therefore the first reel data is not generated as mentioned above. In middle reel data 512, top symbols of "1" to "4" provided by appeal rewriting are arranged as symbols corresponding to the stop positions in the symbol display region 4, and top symbols of "5" to "20" are arranged below the top symbols of "1" to "4".

The other symbols of the middle reel data 512 are determined by counting back the symbols of the symbol array of the first reel shown in FIG. 49A such that the four symbols corresponding to the next-spin scheduled stop positions 502 are stopped when the spin stops in a predetermined time period Tx. In other words, among the symbols of the symbol array of the first reel shown in FIG. 49A, symbols arranged above the symbols corresponding to the next-spin scheduled stop positions 502 are assigned retroactively. As a result, symbols of "GOLD5" (code number 4) to "QUEEN" (code number 52) are additionally provided so as to follow the twenty top symbols in the middle reel data 512. In this symbol display control, symbols displayed in rotation after the top symbols provided by appeal rewriting (in a case of conducting no appeal rewriting, immediately after the symbols stopped in the previous spin) can be determined (that is, symbols to be displayed and an order of the symbols can be selected) in various methods. For example, they can be determined based on a predetermined algorithm or can be determined fixedly in accordance with the relationship between the previous-spin stop positions and the next-spin scheduled stop positions.

Last reel data 513 includes four symbols corresponding to the next-spin scheduled stop positions 502, and symbols arranged immediately above and below the four symbols.

FIG. 49C conceptually shows a situation where scrolling of the first reel is started based on the coupled reel data (reel data including the middle reel data 512 and the last reel data 513 coupled) and then stopped. The height of each symbol corresponds to a time at which the symbol passes through the lower side of the lower region of the symbol display region 4. The vertical direction represents a time axis.

In this example, a top symbol moves through the symbol display region 4 at a speed of 6 dots/fps (here, fps is 1/60 seconds and therefore 6 dots/fps is 360 dots/s), while each of the other symbols moves at a speed of 15 dots/fps (900 dots/s) which is 2.5 times higher than the top symbol. Assuming that the number of vertical dots included in one symbol is 92, a time period required for the top symbol to pass through the lower side of the lower region of the symbol display region 4 is about 0.2556 seconds, and a time period required for any symbol other than the top symbol to pass through the lower side of the lower region of the symbol display region 4 is about 0.1022 seconds.

For example, as shown in FIG. 49C, upon start of scrolling of the first reel for the next spin, a top symbol of "5" appears in the lower region of the symbol display region 4 and passes upward through the lower side of the lower region of the symbol display region 4 in about 0.2556 seconds. Likewise, subsequent forty-one top symbols of "6" to "20" and "GOLD5" to "GOLD10" pass. Then, twenty-eight symbols which are not top symbols, that is, symbols of "NINE" (code number 30) to "KING" (code number 57), pass. Each of these symbols passes at a speed (taking about 0.1022 seconds) higher than the top symbol. Then, they are stopped.

Consequently, the symbols are stopped in about 13.60 seconds (=0.2556×42+0.1022×28) after the scrolling is started (this time period is merely an illustrative example). Such a constant spin time period Tx is achieved because the reel data is generated by counting back symbols from the symbols (to-be stopped symbols) corresponding to the next-spin scheduled stop positions. In the other reels as well, the scrolling is stopped in the constant spin time. That is, a control for causing all the reels to stop at the same timing is achieved. Although the spin times for all the spins are adjusted to the constant time, setting different time periods for different spins may be also acceptable.

Figures 50A, 50B, 50C:
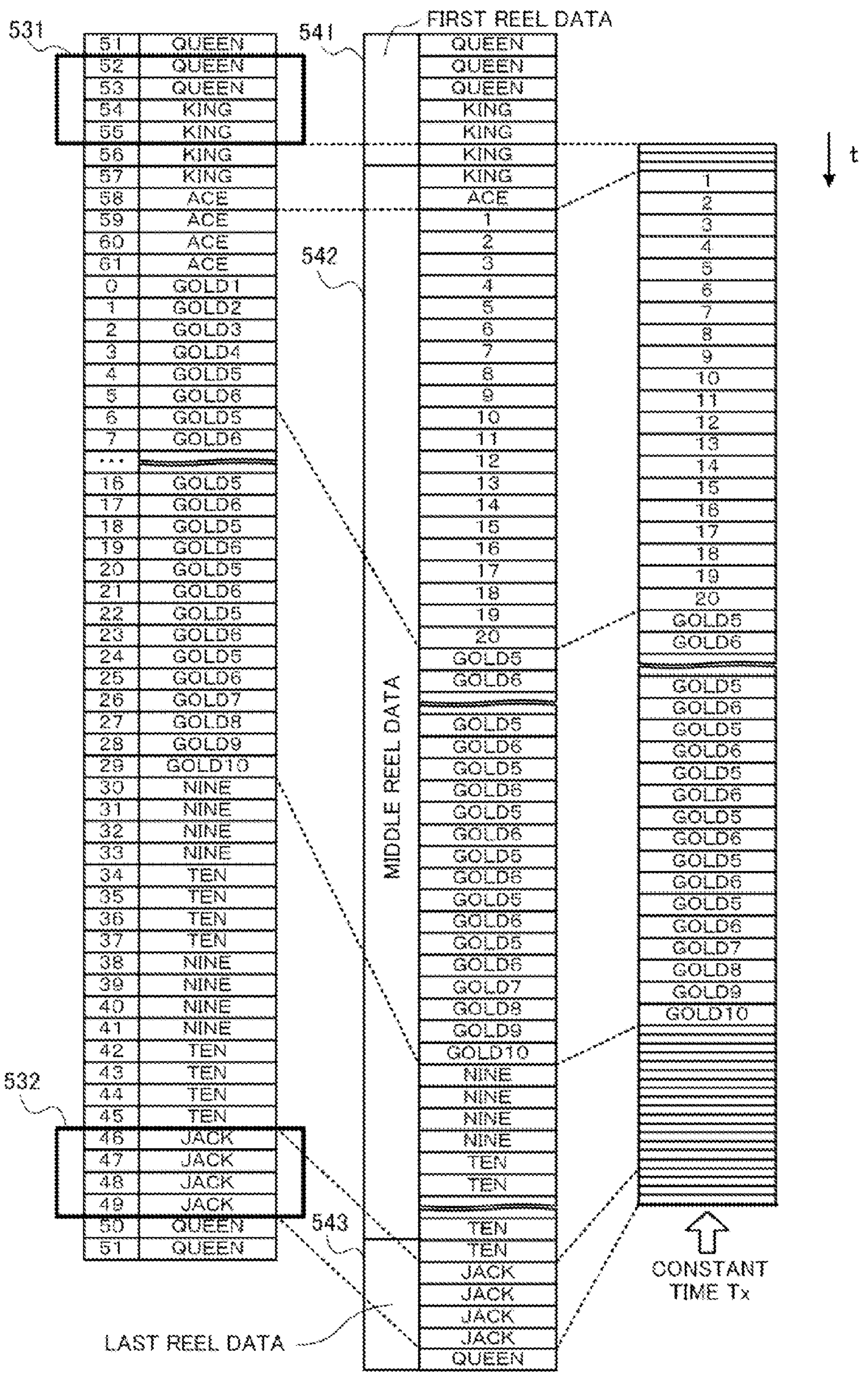
FIGS. 50A to 50C are diagrams for explanation of an example of the symbol display control.

FIGS. 50A to 50C show a symbol display control and a configuration of reel data generated for second and subsequent spins. FIG. 50A shows the symbol array of the first reel (see FIGS. 5A to 5C). It is assumed that symbols of "QUEEN", "QUEEN", "KING", and "KING" (code numbers 52 to 55) are stopped in previous-spin stop positions 531. It is assumed that four symbols of "JACK" (code numbers 46 to 49) are scheduled to be stopped in next-spin scheduled stop positions 532.

FIG. 50B shows reel data generated at this time. First reel data 541 includes four symbols corresponding to the previous-spin stop positions 531, and symbols arranged immediately above and below the four symbols.

In middle reel data 542, a symbol of "KING" (code number 57) of the symbol array of the first reel is arranged first, and next, a symbol of "ACE" (code number 58) and top symbols of "1" to "20" provided by appeal rewriting are arranged. This appeal rewriting is conducted from the position four frames below the lower region of the symbol display region 4. The second rewriting position described with reference to FIGS. 47 and 48 is determined by lottery, and rewriting is conducted from the determined position.

The other symbols of the middle reel data 542 are determined by counting back the symbols of the symbol array of the first reel shown in FIG. 50A such that the four symbols corresponding to the next-spin scheduled stop positions 532 are stopped when the spin stops in the predetermined time period Tx. In other words, among the symbols of the symbol array of the first reel shown in FIG. 50A, symbols arranged above the symbols corresponding to the next-spin scheduled stop positions 532 are assigned retroactively. As a result, symbols of "GOLD5" (code number 6) to "TEN" (code number 44) are additionally provided so as to follow the twenty top symbols in the middle reel data 542.

Last reel data 543 includes four symbols corresponding to the next-spin scheduled stop positions 532, and symbols arranged immediately above and below the four symbols.

FIG. 50C conceptually shows a situation where scrolling of the first reel is started based on the coupled reel data (reel data including the first reel data 541, the middle reel data 542, and the last reel data 543 coupled) and then stopped. The height of each symbol corresponds to a time at which the symbol passes through the lower side of the lower region of the symbol display region 4. The vertical direction represents a time axis.

In this example, a top symbol moves through the symbol display region 4 at a speed of 6 dots/fps, while each of the other symbols moves at a speed of 15 dots/fps which is 2.5 times higher than the top symbol. Assuming that the number of vertical dots included in one symbol is 92, a time period required for the top symbol to pass through the lower side of the lower region of the symbol display region 4 is about 0.2556 seconds, and a time period required for any symbol other than the top symbol to pass through the lower side of the lower region of the symbol display region 4 is about 0.1022 seconds.

For example, as shown in FIG. 50C, upon start of scrolling of the first reel for the next spin, a symbol of "KING" which is not a top symbol appears in the lower region of the symbol display region 4, and passes upward through the lower side of the lower region of the symbol display region 4 in about 0.1022 seconds. Likewise, subsequent two symbols of "KING" and "ACE" which are not top symbols pass. Then, 44 top symbols of "1" to "20" and "GOLD5" to "GOLD10" in total pass. Each of these symbols takes about 0.2556 seconds to pass through. Then, twenty symbols which are not top symbols, that is, symbols of "NINE" (code number 30) to "JACK" (code number 49), pass. Each of these symbols passes at a speed (taking about 0.1022 seconds) higher than the top symbol. Then, they are stopped.

Consequently, the symbols are stopped in about 13.60 seconds (=0.1022×3+0.2556×44+0.1022×20) after the scrolling is started (this time period is merely an illustrative example). Such a constant spin time period Tx is achieved because the reel data is generated by counting back symbols from the symbols (to-be stopped symbols) corresponding to the next-spin scheduled stop positions. In the other reels as well, the scrolling is stopped in the constant spin time. That is, a control for causing all the reels to stop at the same timing is achieved. Although the spin times for all the spins are adjusted to the constant time, setting different time periods for different spins may be also acceptable.

Figures 51A, 51B, 51C:
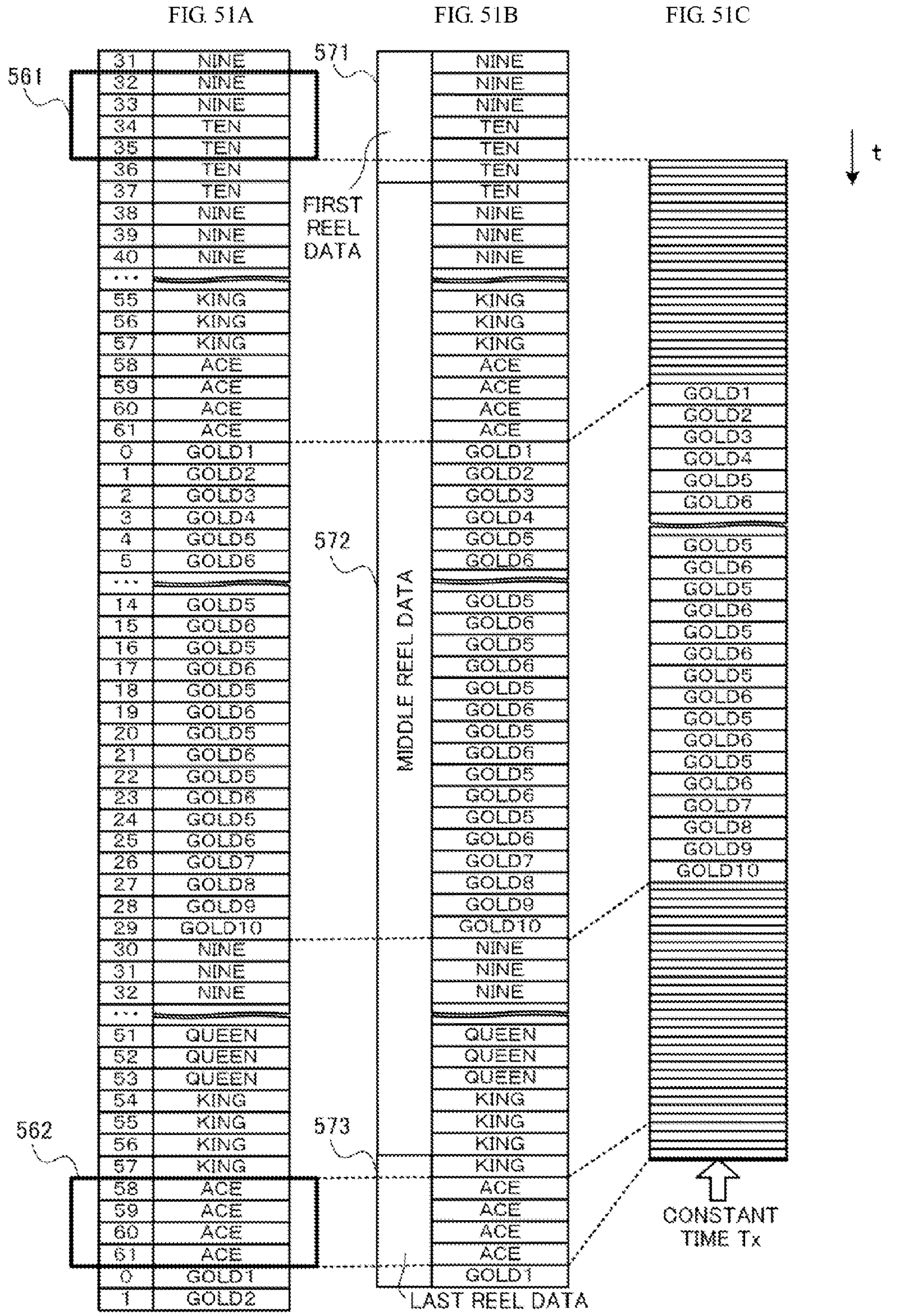
FIGS. 51A to 51C are diagrams for explanation of an example of the symbol display control.

FIGS. 51A to 51C show a symbol display control and a configuration of reel data generated in a case of conducting no appeal rewriting. FIG. 51A shows the symbol array of the first reel (see FIGS. 5A to 5C). It is assumed that symbols of "NINE", "NINE", "TEN, and "TEN" (code numbers 32 to 35) are stopped in previous-spin stop positions 561. It is assumed that four symbols of "ACE" (code numbers 58 to 61) are scheduled to be stopped in next-spin scheduled stop positions 562.

FIG. 51B shows reel data generated at this time. First reel data 571 includes four symbols corresponding to the previous-spin stop positions 561, and symbols arranged immediately above and below the four symbols.

In middle reel data 572, a symbol of "TEN" (code number 37) and symbols of "NINE" (code number 38) to "ACE" (code number 61) of the symbol array of the first reel are arranged first, and next, symbols of "GOLD1" (code number 0) to "GOLD10" (code number 29) which are top symbols of the symbol array of the first reel are arranged. Subsequently, symbols of "NINE" (code number 30) to "KING" (code number 56) of the symbol array of the first reel are arranged. In this manner, the symbol array of the first reel is arranged with some symbols skipped as appropriate such that the four symbols corresponding to the next-spin scheduled stop positions 562 are stopped when the spin stops in the predetermined time period Tx. In this example, however, to ensure that thirty top symbols of "GOLD1" to "GOLD10" preliminarily arranged in the symbol array be displayed, a control is performed so as not to skip these symbols but so as to display these symbols in rotation without any change, because the series of twenty top symbols which would be provided by appeal rewriting is not displayed in rotation.

Last reel data 573 includes four symbols corresponding to the next-spin scheduled stop positions 562, and symbols arranged immediately above and below the four symbols.

FIG. 51C conceptually shows a situation where scrolling of the first reel is started based on the coupled reel data (reel data including the first reel data 571, the middle reel data 572, and the last reel data 573 coupled) and then stopped. The height of each symbol corresponds to a time at which the symbol passes through the lower side of the lower region of the symbol display region 4. The vertical direction represents a time axis.

In this example, a top symbol moves through the symbol display region 4 at a speed of 6 dots/fps, while each of the other symbols moves at a speed of 15 dots/fps which is 2.5 times higher than the top symbol. Assuming that the number of vertical dots included in one symbol is 92, a time period required for the top symbol to pass through the lower side of the lower region of the symbol display region 4 is about 0.2556 seconds, and a time period required for any symbol other than the top symbol to pass through the lower side of the lower region of the symbol display region 4 is about 0.1022 seconds.

For example, as shown in FIG. 51C, upon start of scrolling of the first reel for the next spin, a symbol of "TEN" which is not a top symbol appears in the lower region of the symbol display region 4, and passes upward through the lower side of the lower region of the symbol display region 4. Each of these symbols takes about 0.1022 seconds to pass through. Likewise, subsequent twenty-five symbols of "NINE", "KING", "ACE", and the like, which are not top symbols, pass. Then, thirty top symbols of "GOLD1" to "GOLD10" in total pass. Each of these symbols takes about 0.2556 seconds to pass through. Then, thirty-two symbols which are not top symbols, that is, symbols of "NINE" (code number 30) to "ACE" (code number 61), pass. Each of these symbols passes at a speed (taking about 0.1022 seconds) higher than the top symbol. Then, they are stopped.

Consequently, the symbols are stopped in about 13.60 seconds (=0.1022×26+0.2556×30+0.1022×32) after the scrolling is started (this time period is merely an illustrative example). Such a constant spin time period Tx is achieved because the reel data is generated by counting back symbols from the symbols (to-be stopped symbols) corresponding to the next-spin scheduled stop positions with skipping some symbols of the symbol array as appropriate. In the other reels as well, the scrolling is stopped in the constant spin time. That is, a control for causing all the reels to stop at the same timing is achieved. Although the spin times for all the spins are adjusted to the constant time, setting different time periods for different spins may be also acceptable.

Figures 52A, 52B, 52C:
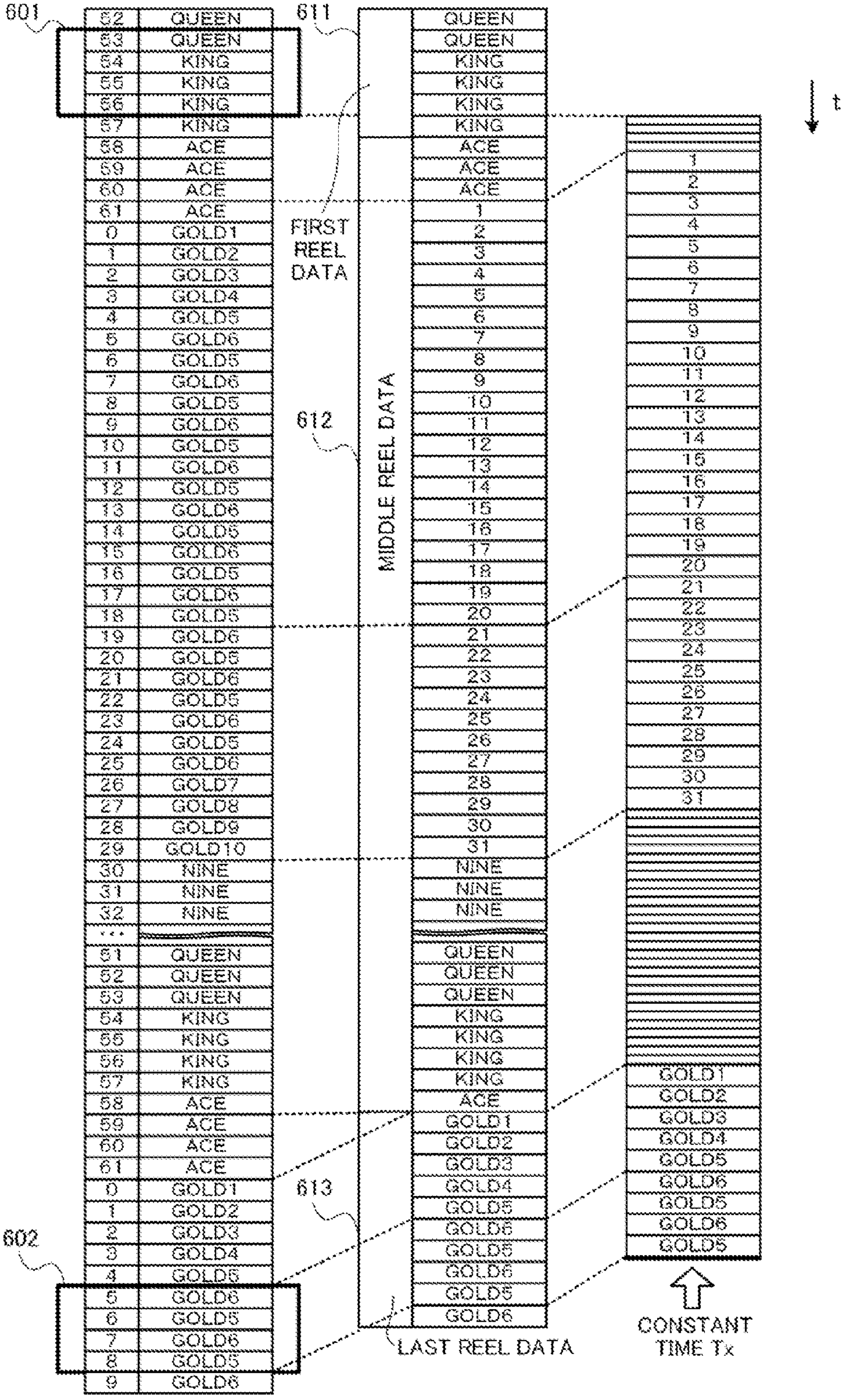
FIGS. 52A to 52C are diagrams for explanation of an example of the symbol display control.

FIGS. 52A to 52C show a symbol display control and a configuration of reel data generated in a case where, after twenty top symbols are overlaid by appeal rewriting, there are still top symbols existing in the symbol array of the first reel and additionally the symbol arranged immediately above the symbols corresponding to the next-spin scheduled stop positions is included in a series of top symbols. FIG. 52A shows the symbol array of the first reel (see FIGS. 5A to 5C). It is assumed that symbols of "QUEEN", "KING", "KING", and "KING" (code numbers 53 to 56) are stopped in previous-spin stop positions 601. It is assumed that symbols of "GOLD6", "GOLD5", "GOLD6", and "GOLD5" (code numbers 5 to 8) are scheduled to be stopped in next-spin scheduled stop positions 602.

FIG. 52B shows reel data generated in this case. First reel data 611 includes four symbols corresponding to the previous-spin stop positions 601, and symbols arranged immediately above and below the four symbols.

In middle reel data 612, three symbols of "ACE" (code numbers 58 to 60) of the symbol array of the first reel are arranged first, and next, top symbols of "1" to "20" provided by appeal rewriting are arranged. This appeal rewriting has been conducted at a position five frames below the lower region of the symbol display region 4. That is, rewriting has been conducted in a rewriting position different from the rewriting positions illustrated in FIGS. 47 and 48. In the symbol array of the first reel, symbols of "GOLD6" (code number 19) to "GOLD10" (code number 29), which are also top symbols, are arranged in positions corresponding to the positions following the top symbols of "1" to "20". Accordingly, the top symbols of "1" to "20" are followed by top symbols of "21" to "31" arranged in association with the symbols of "GOLD6" to "GOLD10".

The other symbols of the middle reel data 612 are determined by counting back the symbols of the symbol array of the first reel shown in FIG. 52A such that the four symbols corresponding to the next-spin scheduled stop positions 602 are stopped when the spin stops in the predetermined time period Tx. In other words, among the symbols of the symbol array of the first reel shown in FIG. 52A, symbols arranged above the symbols corresponding to the next-spin scheduled stop positions 602 are assigned retroactively. As a result, symbols of "NINE" (code number 30) to "ACE" (code number 58) are additionally provided so as to follow the thirty-one top symbols in the middle reel data 612.

Last reel data 613 includes four symbols corresponding to the next-spin scheduled stop positions 602, and symbols arranged immediately above and below the four symbols. The last reel data 613 further includes symbols of "GOLD1" (code number 0) to "GOLD4" (code number 3) which are picture symbols, because the symbols of "GOLD1" (code number 0) to "GOLD4" (code number 3) cooperate with the symbol of "GOLD5" (code number 4) to constitute a sequence of symbols. This is for preventing a sequence of picture symbols from being terminated incompletely during production of an effect for consecutive symbols which is described later.

FIG. 52C conceptually shows a situation where scrolling of the first reel is started based on the coupled reel data (reel data including the first reel data 611, the middle reel data 612, and the last reel data 613 coupled) and then stopped. The height of each symbol corresponds to a time at which the symbol passes through the lower side of the lower region of the symbol display region 4. The vertical direction represents a time axis.

In this example, a top symbol moves through the symbol display region 4 at a speed of 6 dots/fps, while each of the other symbols moves at a speed of 15 dots/fps which is 2.5 times higher than the top symbol. Assuming that the number of vertical dots included in one symbol is 92, a time period required for the top symbol to pass through the lower side of the lower region of the symbol display region 4 is about 0.2556 seconds, and a time period required for any symbol other than the top symbol to pass through the lower side of the lower region of the symbol display region 4 is about 0.1022 seconds.

For example, as shown in FIG. 52C, upon start of scrolling of the first reel for the next spin, a symbol of "KING" which is not a top symbol appears in the lower region of the symbol display region 4, and passes upward through the lower side of the lower region of the symbol display region 4 in about 0.1022 seconds. Likewise, subsequent three symbols of "ACE", which are not top symbols, pass. Then, thirty-one top symbols of "1" to "31" in total, which are provided by appeal rewriting, pass. Each of these symbols takes about 0.2556 seconds to pass through. Then, twenty-nine symbols which are not top symbols, that is, symbols of "NINE" (code number 30) to "ACE" (code number 58) pass. Each of these symbols passes at a speed (taking about 0.1022 seconds) higher than the top symbol. Then, nine top symbols of "GOLD1" (code number 0) to "GOLD5" (code number 8) pass. Each of these symbols takes about 0.2556 seconds to pass through. Then, they are stopped.

Consequently, the symbols are stopped in about 13.60 seconds (=0.1022×4+0.2556×31+0.1022×29+0.2556×9) after the scrolling is started (this time period is merely an illustrative example). Such a constant spin time period Tx is achieved because the reel data is generated by counting back symbols from the symbols (to-be stopped symbols) corresponding to the next-spin scheduled stop positions with skipping some symbols of the symbol array as appropriate. In the other reels as well, the scrolling is stopped in the constant spin time. That is, a control for causing all the reels to stop at the same timing is achieved. Although the spin times for all the spins are adjusted to the constant time, setting different time periods for different spins may be also acceptable.

In the symbol display controls described above with reference to FIGS. 49A to 52C, "GOLD" symbols arranged in a range from the previous-spin stop positions to the next-spin scheduled stop positions are sequentially displayed in rotation. As a result, "gold dragons" corresponding to the sequential "GOLD" symbols form a single continuous "gold dragon" which is kept displayed without a break. In a case of conducting no appeal rewriting, a control is performed so as to cause the "GOLD" symbols preliminarily arranged in the symbol array to be continuously displayed in rotation without being skipped.

The continuous "gold dragon" corresponding to the "GOLD" symbols moves upward along with scrolling of the symbol array. This gives an impression as if a gold-colored dragon ascends to heaven (upward).

Moreover, the continuous "gold dragon" corresponding to the "GOLD" symbols is displayed in rotation in the symbol display region 4 at a speed lower than the other symbols. Therefore, passing of the "gold dragon" (through the symbol display region 4) is announced by being displayed in slow motion.

Furthermore, the "GOLD" symbols are displayed in rotation at a lower speed while the other symbols are displayed in rotation at a higher speed, and on the other hand, adjustment is performed so as to skip symbols based on counting back from the next-spin scheduled stop positions. Accordingly, one spin can be completed within a specified time period.

Hereinbefore, specific examples of the symbol display control as well as the configuration of the reel data have been described with reference to FIGS. 49A to 52C. For convenience of the description, the example illustrates a case where the speed of movement of the top symbol (taking about 0.2556 seconds) and the speed of movement of each of the other symbols which is higher than the speed of movement of the top symbol are combined such that a time length from start to stop of the scrolling equals to a certain time length (e.g., about 13.60 seconds). Here, the speed of movement of the symbol can be adjusted in various methods in order to make the time length from start to stop of the scrolling of symbols equal to a certain time length.

In another example of the control, after a spin of a certain time length is performed, the speed of movement of each symbol may be re-calculated such that the symbols corresponding to the next-spin scheduled stop positions can be stopped in the symbol display region 4, the re-calculation being performed while maintaining the ratio (in the example shown in FIGS. 49A to 52C, 2:5) of the speed of movement of the top symbol to the speed of movement of each of the other symbols or while adopting a different ratio or an equal ratio.

It may be also conceivable to, after performing a spin of a certain time length, cause the symbols corresponding to the next-spin scheduled stop positions to be stopped in the symbol display region 4 by adjusting the speed of movement of one or more particular symbols or by adjusting the number of symbols.

It may be also conceivable to additionally perform processing that causes the symbols of the symbol array to virtually move at a speed obtained by calculation while the twenty top symbols are displayed in rotation in the symbol display region 4, to make adjustment so as to cause the symbols corresponding to the next-spin scheduled stop positions to be stopped in the symbol display region 4 after elapse of a certain time length, as will be described with reference to FIGS. 53 and 54.

Figure 53:
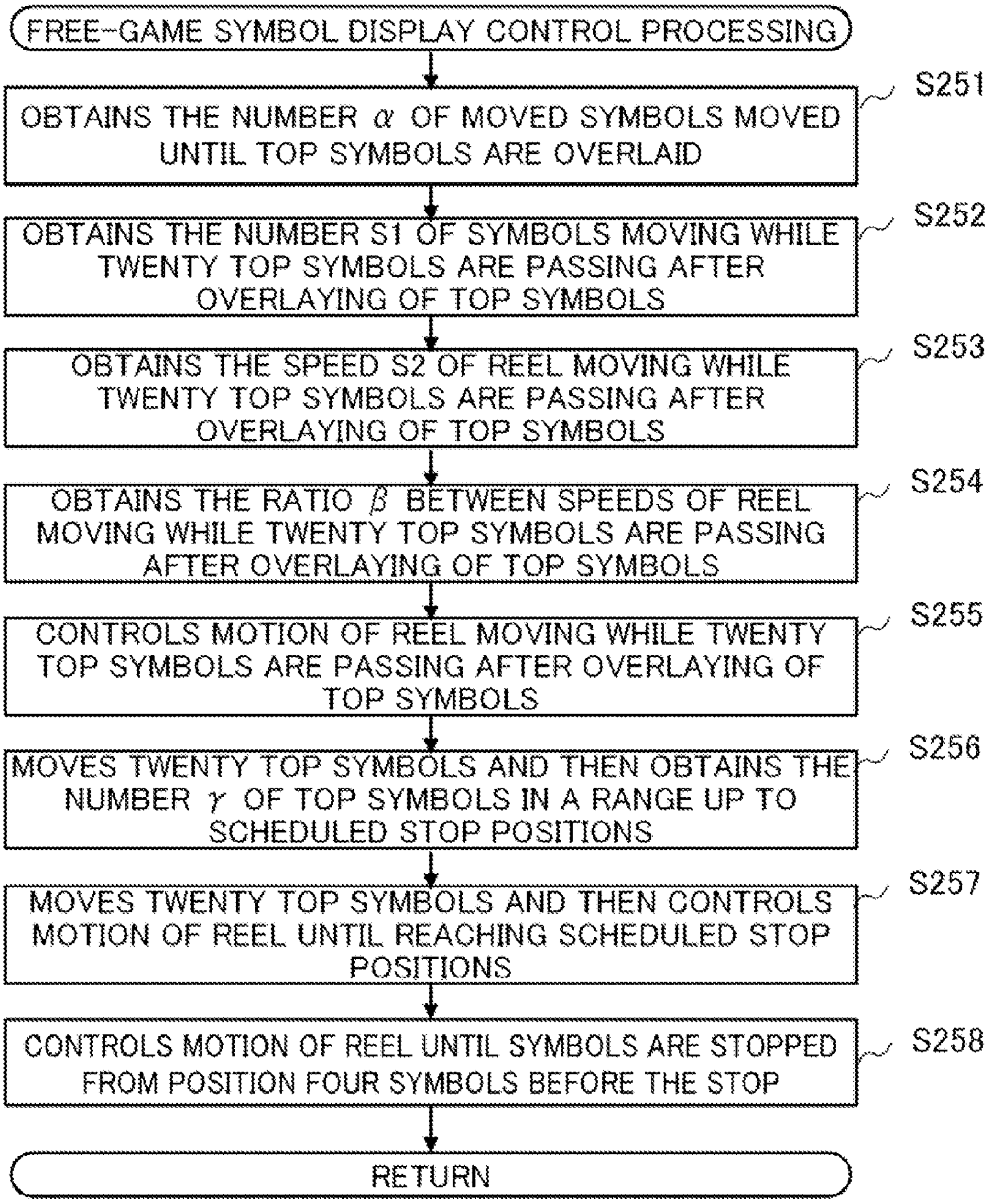
FIG. 53 shows a flowchart of the symbol display control.
Figure 54:
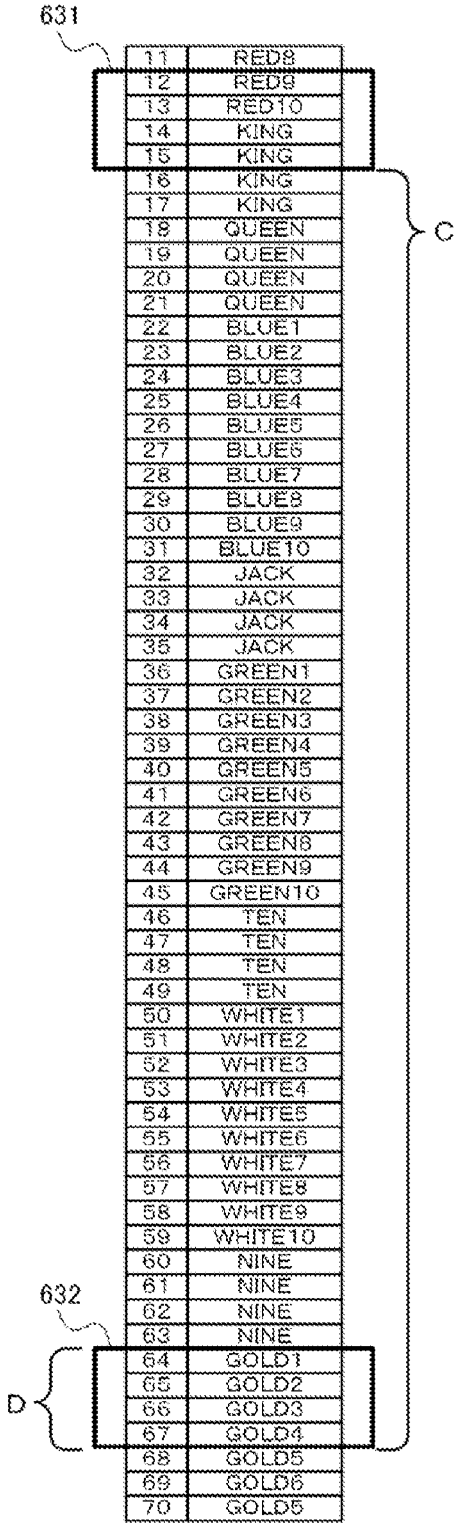
FIG. 54 is a diagram for explanation of an example of the symbol display control.

Next, with reference to FIGS. 53 and 54, another specific example of the free-game symbol display control processing is described. Herein, the description is given with focus on the first reel. FIG. 53 is a flowchart showing the symbol display control processing for the first reel in a certain spin. FIG. 54 shows a symbol array of the first reel for the certain spin.

First, a presupposition is as follows. In a case where there is one or more top symbols in the symbol display region 4, the speed of movement is 6 dots/fps (referred to as A), while in a case where there is no top symbol in the symbol display region 4, the speed of movement is 15 dots/fps (referred to as B) (here, fps is 1/60 seconds).

In the following, the processing is described along the flowchart shown in FIG. 53. The number α of moved symbols is obtained (step S251). The number α of moved symbols means the number of symbols that are moved from previous-spin stop positions 631 (see FIG. 54; for example, symbols of "RED9" (code number 12) to "KING" (code number 15)) until twenty top symbols are overlaid (appeal rewriting is conducted). In this example, α=2 is obtained, because appeal rewriting of the top symbols on the actual reel is conducted after particular symbols (for example, two symbols ("RED9" and "RED10") stopped in the upper region and the upper central region of the symbol display region 4 are scrolled upward and disappear out of the symbol display region 4 (in other words, after the scrolling advances by two symbols).

When there is a top symbol in the symbol display region 4, the symbol moves at a speed of 6 dots/fps. When there is no top symbol in the symbol display region 4, the symbol moves at a speed of 15 dots/fps. In this example, there is no top symbol in the symbol display region 4, and therefore the symbol moves at a speed of 15 dots/fps.

Subsequently, the number of symbols that, after overlaying of top symbols provided by appeal rewriting, virtually move while the twenty top symbols (1840 dots assuming that one symbol includes 92 dots) are passing, is calculated based on the following expression (step S252). In the expression, C represents the number of symbols in a range from the symbol arranged immediately below the previous-spin stop positions 631 (the symbol arranged below the lower region of the symbol display region 4) to the lower one (the symbol arranged in the lower region of the symbol display region 4) of the symbols arranged in the next-spin scheduled stop positions 632 (see FIG. 54; for example, symbols of "GOLD1" (code number 64) to "GOLD4" (code number 67) which are top symbols); D represents the number of top symbols in a range from the symbol arranged immediately below the previous-spin stop positions 631 to the lower one of the symbols arranged in the next-spin scheduled stop positions 632 (see FIG. 54); and X represents the number of symbols that are added as moving symbols.

$$S1=C+X-(D\times B/A)-\alpha \qquad \text{(Expression 1)}$$

Applying the expression to this example results in S1 as follows. Here, it is assumed that X is 30, but this is not limiting. Various values can be set to X.

$$S1=52+30-(4\times 15/6)-2=70$$

Subsequently, the speed of virtual movement of the reel that, after overlaying of top symbols provided by appeal rewriting, is caused while the twenty top symbols are passing is calculated based on the following expression (step S253). In the expression, E represents a time length having elapsed before the top symbols are overlaid, and E=α/B≅0.13 is obtained.

$$S2=\text{the number of dots included in one symbol}\times S1/(\text{the number of top symbols}\times A-E) \qquad \text{(Expression 2)}$$

Applying the expression to this example results in S2 as follows.

$$S2=92\times 70/(20\times 6-0.13)\cong 53.7\ \text{dots/fps}$$

Subsequently, the ratio between speeds of virtual movement of the reel that, after overlaying of top symbols by appeal rewrite, is caused while the twenty top symbols are passing is obtained (S254). To be more specific, a ratio between two speeds of movement, each of which is an integer, is obtained so as to achieve the above-obtained speed of 53.7 dots/fps as a whole.

Here, one speed of movement is represented by H, and the other speed of movement is represented by I (=H+1). The ratio can be obtained based on the following expression.

$$H\times\beta+I\times(100-\beta)=53.7 \qquad \text{(Expression 3)}$$

Applying the expression to this example results in 53×β+54×(100β)=53.7, resulting in β=0.3.

Therefore, movement at a speed of 53 dots/fps occupies 30%, and movement at a speed of 54 dots/fps occupies 70%. More specifically, 1940 dots (the total number of dots included in the twenty top symbols)/6 (dots/fps)≅306.6667 fps. Therefore, 30% of 306.6667 is moved at a speed of 53 dots/fps, and remaining 70% is moved at a speed of 54 dots/fps.

Subsequently, motion of the reel that, after overlaying of top symbols provided by appeal rewriting, virtually moves while the twenty top symbols are passing is controlled (step S255). To be more specific, 306.6667 fps is divided into two sections, and a control is performed so as to cause the movement at a speed of 53 dots/fps in one section while causing the movement at a speed of 54 dots/fps in the other section. A time length for the movement at a speed of 53 dots/fps is 306.6667×0.3=92.00001 fps. A time length for the movement at a speed of 54 dots/fps is 306.6667×0.7=214.66669 fps. Here, if the time periods for the movements in both sections are rounded to the nearest integers, the sum of the time periods exceeds 306.6667. Therefore, both of the time periods are adjusted such that both of their values are rounded down to an appropriate integer.

Accordingly, in this example, the movement at a speed of 53 dots/fps is performed for a time length of 92 fps while the movement at a speed of 54 dots/fps is performed for a time length of 214 fps.

Then, after the twenty top symbols provided by appeal rewriting are moved at a speed of 6 dots/fps, the number γ of top symbols in a range immediately above the upper one of the next-spin scheduled stop positions 632 (in a range up to the symbol arranged above the upper region of the symbol display region 4) is obtained (step S256). In this example, $\gamma=4$ is assumed.

Then, after twenty top symbols provided by appeal rewriting are moved at a speed of 6 dots/fps, motion of the reel until reaching the symbol arranged above the next-spin scheduled stop positions 632 (the symbol above the upper region of the symbol display region 4) is controlled (step S257).

In the following first period, symbols are moved at a speed of B (15 dots/fps), and in the following second period, symbols are moved at a speed of A (6 dots/fps).

$$\text{first period}=(X-4-\gamma)\times 92/B=(30-4-4)\times 92/15=134.9\text{ fps}$$

$$\text{second period}=\gamma\times 92/A=4\times 92/6=61\text{ fps}$$

Each of the periods is rounded to an appropriate integer. That is, in a time length (first period) of 135 fps, symbols are moved at a speed of 15 dots/fps, while in a time length (second period) of 61 fps, symbols are moved at a speed of 6 dots/fps.

Then, motion of the reel moving until symbols are stopped and displayed is controlled from the position four symbols before the stop (step S258). In this example, the speed is reduced through predetermined speed reduction processing, and the symbols corresponding to the next-spin scheduled stop positions 632 are stopped in the symbol display region 4. In another possible control, different types of speed reduction processing may be adopted depending on the scheduled stop positions.

Next, with reference to FIG. 55, an example of symbol rewriting is described. FIG. 55 shows an example of a rewritten frame definition table. In the free game, the symbol array of each video reel 3 is scrolled in the symbol display region 4 in the direction reverse to the scrolling direction employed in the base game, that is, in the direction from the lower region to the upper region of the symbol display region 4. At that time, use of the program of the base game undesirably makes the symbol rewriting visible to the player. Therefore, a control is performed so as to prevent the symbol rewriting from being visible, by individually specifying the position of a rewritten frame for each symbol (for each code number of the symbol array).

In the rewritten frame definition table shown in FIG. 55, the code number of a to-be stopped symbol and a rewritten frame number corresponding to the code number are set for each video reel. The code number of a to-be stopped symbol indicates the code number of the symbol arranged in the uppermost one of the scheduled stop positions (the symbol to be stopped in the upper region of the symbol display region 4). The rewritten frame number indicates a timing for rewriting from a previous-spin video reel into a next-spin video reel. The rewritten frame number corresponds to the number of frames from the start of rotation.

For each video reel, a rewriting program refers to a corresponding rewritten frame number in accordance with a scheduled stop position of a symbol, and conducts rewriting into the next-spin video reel at a timing indicated by the referenced number.

<Effect for Consecutive Symbols>

Next, with reference to FIGS. 56A to 57B, an effect produced for consecutive symbols in the base game and the free game is described. According to this effect, when consecutive symbols in vertical sequence contribute to a line payout, the consecutive symbols are displayed in a coupled state or an animation thereof is displayed. Symbols to which this effect is applied are symbols (picture symbols) showing figures of characters, etc. and animations. In the base game, for example, the symbols to which this effect is applied are symbols shown in FIGS. 4A to 4D for which graphical presentation of dragon is made (symbols of "GOLD", "RED", "BLUE", "GREEN", and "WHITE"). In the free game, the symbols to which this effect is applied are symbols of "GOLD1" to "GOLD10" shown in FIGS. 5A to 5C. It may be also acceptable to apply this effect only to a particular symbol among picture symbols.

Figure 56A:
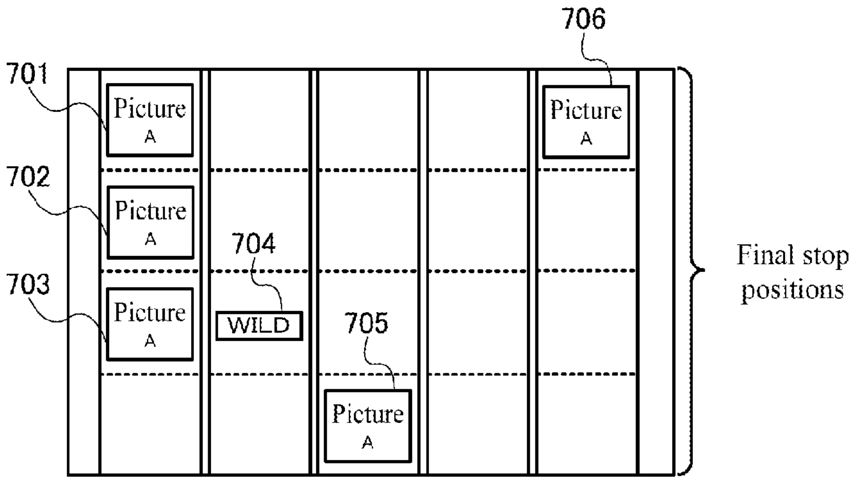
FIGS. 56A and 56B are diagrams for explanation of an effect produced for consecutive symbols.
Figure 56B:
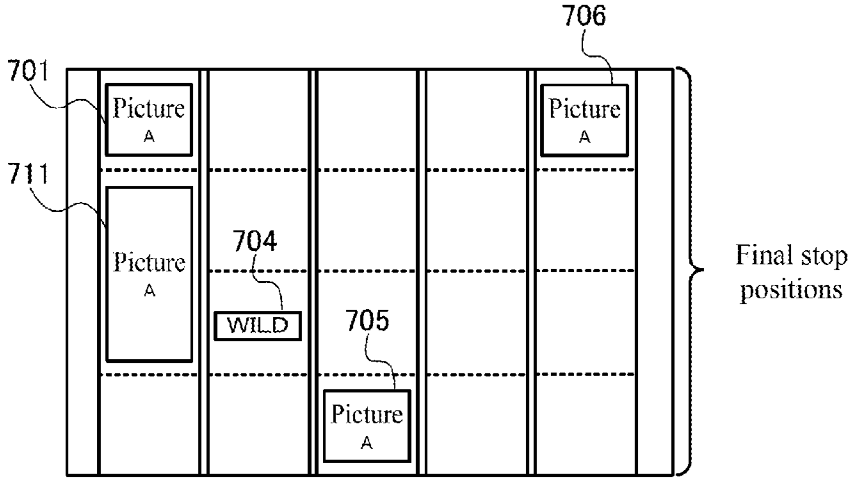

FIG. 56A shows symbols of each video reel 3 stopped in the symbol display region 4. It is assumed that picture symbols 702, 703, and 705 which are identical symbols are arranged on winning lines that provide line payouts. In this case, an effect (for example, displaying with an animation or displaying with blinking) is not individually produced for the picture symbols 702 and 703 which are consecutive symbols. Instead, these picture symbols are coupled and their display regions are coupled into a single display region. An effect of displaying an animation is produced in the single display region (coupled display region) obtained by the coupling. FIG. 56B shows a state where the picture symbols 702 and 703 are coupled into a coupled picture symbol 711. In the coupled display region where the picture symbol 711 is arranged, for example, an animation of dragon is displayed. The coupled display region has an area twice as large as the area of the picture symbol 702 and the area of the picture symbol 703. Therefore, the animation having a larger size can be displayed more dynamically. Additionally, this can give variety to display of the game. Moreover, such an effect enables the player to be more explicitly informed of occurrence of a line payout associated with the picture symbol.

Patterns of coupling picture symbols include not only the pattern of two consecutive symbols having a sequence of two symbols as shown in FIG. 56B but also patterns of three consecutive symbols and four consecutive symbols, and the like. In accordance with such consecutive symbols or a single symbol, corresponding data (data for displaying a picture corresponding to the symbol or symbols) is selected. Such data is included in the effect content definition file shown in FIG. 8B.

The picture symbol 705 shown in FIG. 56A is arranged on a winning line that provides a line payout, but not continuous with any other identical symbol in the symbol display region 4. Therefore, unlike the picture symbols 702 and 703, the picture symbol 705 is displayed with an animation as a single symbol without being coupled. In this case, the animation can be displayed in coordination with the display of the animation of the picture symbol 711. For example, a control is performed such that behavior of the animation of the picture symbol 705 and behavior of the animation of the picture symbol 711 are identical, similar, or correlated to each other.

The picture symbol 701 is identical to and continuous with the picture symbols 702 and 703, but not arranged on any winning line that provides a line payout. Therefore, the picture symbol 701 is not coupled with the picture symbols 702 and 703, and not displayed with an animation, either. A picture symbol 706 is a symbol (picture A) identical to the picture symbols 701, 702, and 703, but not arranged on any winning line that provides a line payout. Therefore, the picture symbol 706 is not coupled, and not displayed with an animation, either. A "WILD" symbol 704 is not a picture symbol, and therefore the effect is not applied thereto. The above-described effect, however, may be produced if substitution of the "WILD" symbol 704 with a picture symbol results in satisfaction of a requirement for coupling.

Figure 57A:
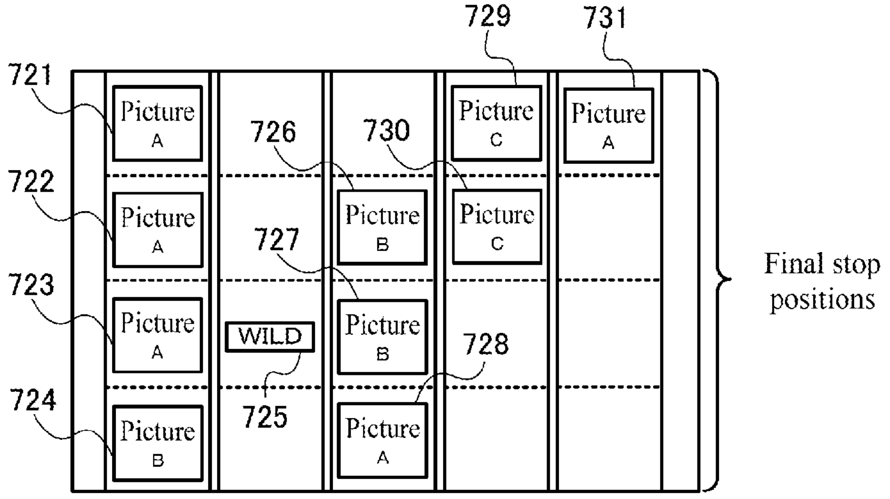
FIGS. 57A and 57B are diagrams for explanation of effects produced for consecutive symbols.
Figure 57B:
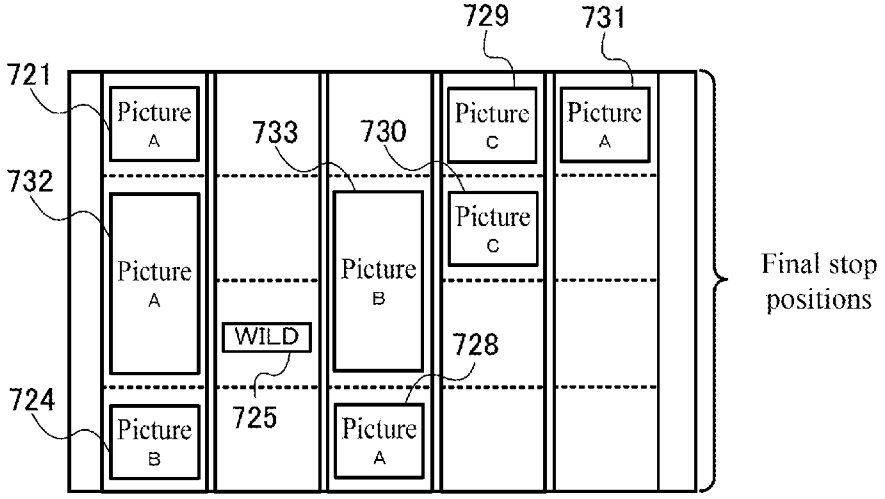

FIGS. 57A and 57B show another example of symbols of each video reel 3 stopped in the symbol display region 4. This example shows a case where a plurality of kinds of symbols (symbols of picture A and symbols of picture B) contribute to line payouts.

FIG. 57A shows symbols of each video reel 3 stopped in the symbol display region 4. It is assumed that picture symbols 722, 723, and 728 which are identical symbols (symbols of picture A) are arranged on winning lines that provide line payouts. It is also assumed that picture symbols 724, 726, and 727 which are identical symbols (symbols of picture B) are arranged on the winning lines that provide the line payouts. In this case, an effect (for example, displaying with an animation or displaying with blinking) is not individually produced for the picture symbols 722 and 723 which are consecutive symbols. Instead, these picture symbols are coupled and their display regions are coupled into a single display region. An effect of displaying an animation is produced in the single display region (coupled display region) obtained by the coupling. FIG. 57B shows a state where the picture symbols 722 and 723 are coupled into a coupled picture symbol 732. In the coupled display region where the picture symbol 732 is arranged, for example, an animation of dragon corresponding to the picture A is displayed. The coupled display region has an area twice as large as the area of the picture symbol 722 and the area of the picture symbol 723. Therefore, the animation having a larger size can be displayed more dynamically. Additionally, this can give variety to display of the game. Moreover, such an effect enables the player to be more explicitly informed of occurrence of a line payout associated with the picture symbol.

Likewise, an effect (for example, displaying with an animation or displaying with blinking) is not individually produced for the picture symbols 726 and 727 which are consecutive symbols. Instead, these picture symbols are coupled and their display regions are coupled into a single display region. An effect of displaying an animation is produced in the single display region obtained by the coupling. FIG. 57B shows a state where the picture symbols 726 and 727 are coupled into a coupled picture symbol 733. In the display region where the picture symbol 733 is arranged, for example, an animation of dragon corresponding to the picture B is displayed. This display region has an area twice as large as the area of the picture symbol 726 and the area of the picture symbol 727.

Such an effect enables an animation to be displayed more dynamically, and additionally can give variety to display of the game. Moreover, such an effect enables the player to be more explicitly informed of occurrence of a line payout associated with the picture symbol.

Similarly to the case shown in FIGS. 56A and 56B, patterns of coupling picture symbols include patterns of two consecutive symbols, three consecutive symbols, four consecutive symbols, and the like. In accordance with such consecutive symbols or a single symbol, corresponding data (data for displaying a picture corresponding to the symbol or symbols) is selected. Such data is included in the effect content definition file shown in FIG. 8B.

The picture symbol 728 shown in FIG. 57A is arranged on a winning line that provides a line payout, but not continuous with any other identical symbol (picture A) in the symbol display region 4. Therefore, unlike the picture symbols 722 and 723, the picture symbol 728 is displayed with an animation as a single symbol without being coupled. In this case, the animation can be displayed in coordination with the display of the animation of the picture symbol 732. For example, a control is performed such that behavior of the animation of the picture symbol 728 and behavior of the animation of the picture symbol 732 are identical, similar, or correlated to each other.

Likewise, the picture symbol 724 shown in FIG. 57A is arranged on a winning line that provides a line payout, but not continuous with any other identical symbol (picture B) in the symbol display region 4. Therefore, unlike the picture symbols 726 and 727, the picture symbol 724 is displayed with an animation as a single symbol without being coupled. In this case, the animation can be displayed in coordination with the display of the animation of the picture symbol 733. For example, a control is performed such that behavior of the animation of the picture symbol 724 and behavior of the animation of the picture symbol 733 are identical, similar, or correlated to each other.

A picture symbol 721 is a symbol (picture A) identical to and continuous with the picture symbols 722 and 723, but not arranged on any winning line that provides a line payout. Therefore, the picture symbol 721 is not coupled with the picture symbols 722 and 723, and not displayed with an animation, either. A picture symbol 731 is a symbol (picture A) identical to the picture symbols 721, 722, and 723, but not arranged on any winning line that provides a line payout. Therefore, the picture symbol 731 is not coupled, and not displayed with an animation, either.

Picture symbols 729 and 730 are identical symbols (picture C) and continuous with each other, but not arranged on any winning line that provides a line payout. Therefore, the picture symbols 729 and 730 are not coupled, and not displayed with an animation, either. A "WILD" symbol 725 is not a picture symbol, and therefore the effect is not applied thereto. The above-described effect, however, may be produced if substitution of the "WILD" symbol 725 with a picture symbol results in satisfaction of a requirement for coupling.

In a case where a plurality of kinds of symbols (picture A and picture B) are displayed with animations as illustrated in this example, a control may be performed so as to display the animations of the plurality of kinds of symbols in coordination with each other. Such coordination of animations is also applicable to a case where an animation corresponding to consecutive symbols is displayed in association with each one of a plurality of kinds of symbols (picture A and picture B). Furthermore, in a case where an animation corresponding to consecutive symbols and an animation corresponding to a single symbol are displayed in association with one and the other of a plurality of kinds of symbols (picture A and picture B), respectively; the above-described coordination of animations may be applied to all of the consecutive symbols and the single symbol, or may be applied to a combination of parts of these symbols.

While the effect for consecutive symbols has been described with reference to FIGS. 56A to 57B, such an effect may be produced only in the free game or only in the base game.

Thus, it is seen that the objects of the present invention are efficiently obtained, although it should be readily apparent to those having ordinary skill in the art that changes and modifications can be made to the invention without departing from the spirit and scope of the invention as claimed. Hence, it should be appreciated that variations of the gaming machine may be made, used and sold, and yet be within the spirit and scope of the claims.

Thus, it is seen that the objects of the present invention are efficiently obtained, although modifications and changes to the invention should be readily apparent to those having ordinary skill in the art, and these modifications are intended to be within the spirit and scope of the invention as claimed.

What is claimed is:

1. A gaming machine that determines a payout based on symbols rearranged, the gaming machine comprising:

a plurality of reels each having a plurality of symbols provided on an outer surface thereof; and a controller that controls a first game in which the plurality of reels are rotated and stopped to rearrange the plurality of symbols in a display region of a first display, the controller programmed to execute the processing of:

(1-1) determining symbols to be rearranged, by a first lottery;

(1-2) when the rearranged symbols satisfy a first condition, performing a control of starting a second game;

(1-3) in the second game, determining symbols to be rearranged, by a second lottery; and (1-4) in the second game, rotating and stopping the plurality of reels, and when a particular symbol moves through the display region, performing a control of making the particular symbol move at a speed lower than the other symbols;

wherein the processing of (1-4) includes the processing of (1-4-1) regardless of a symbol array preset for each reel, replacing the symbol array with the particular symbols consecutively displayed in rotation in the display region, and performing such a control as to make to-be stopped symbols stopped in the display region within a predetermined time period by selecting symbols to be displayed in rotation.

2. The gaming machine according to claim 1, wherein the processing of (1-4-1) includes the processing of:

(1-4-1-1) generating a plurality of data domains based on which symbols to be displayed in the display region are managed, and performing such a control as to avoid the consecutive particular symbols being managed in different data domains; and (1-4-1-2) when rotating the plurality of reels, coupling the plurality of data domains sequentially.

3. The gaming machine according to claim 1, wherein the processing of (1-4-1) includes the processing of (1-4-1-3) after starting rotation of the plurality of reels, performing such a control as to display a predetermined number of symbols included in the symbol array and then displaying the particular symbols, and determining the value of the predetermined number by lottery for each reel.

4. The gaming machine according to claim 1, wherein the processing of (1-4-1) includes the processing of (1-4-1-4) based on a presupposition that the particular symbol is moved at a speed lower than the other symbols, selecting symbols to be displayed in rotation from a symbol array preset for each reel so as to cause the particular symbols obtained as a result of the replacement to be displayed in rotation and so as to make the to-be stopped symbols stopped in the display region after elapse of a certain time length since start of rotation of the plurality of reels.

5. The gaming machine according to claim 4, wherein in the processing of (1-4-1-4), processing of selecting the symbols to be displayed in rotation is conducted in accordance with positions of previously stopped symbols and positions of the to-be stopped symbols, or conducted using a predetermined algorithm.

6. The gaming machine according to claim 4, wherein in the processing of (1-4-1-4), the certain time length is adjusted each time the plurality of reels are spun.

7. The gaming machine according to claim 3, wherein in the processing of (1-4-1-3), processing of determining the value of the predetermined number for each reel by lottery is conducted with different weights applied to different reels.

8. A gaming machine that determines a payout based on symbols rearranged, the gaming machine comprising:

a plurality of reels each having a plurality of symbols provided on an outer surface thereof; and a controller that controls a first game in which the plurality of reels are rotated and stopped to rearrange the plurality of symbols in a display region of a first display, the controller programmed to execute the processing of:

(1-1) determining symbols to be rearranged, by a first lottery;

(1-2) when the rearranged symbols satisfy a first condition, performing a control of starting a second game;

(1-3) in the second game, determining symbols to be rearranged, by a second lottery; and (1-4) in the second game, rotating and stopping the plurality of reels, and when a particular symbol moves through the display region, performing a control of making the particular symbol move at a speed lower than the other symbols;

wherein the processing of (1-4) includes the processing of (1-4-3) upon display of the particular symbol in the display region, displaying a video on a second display, and when the particular symbol is stopped or passing through the display region, quitting or removing the video, the video is set for each reel in which the particular symbol is displayed, or a content of the video corresponding to a case where the particular symbol is stopped is set differently from a content of the video corresponding to a case where the particular symbol is passing through.

* * * * *